(12) United States Patent
Lewis et al.

(10) Patent No.: US 11,862,894 B1
(45) Date of Patent: Jan. 2, 2024

(54) ELECTROMECHANICAL CONNECTOR

(71) Applicant: Lunar Energy, Inc., Mountain View, CA (US)

(72) Inventors: Erica Viola Lewis, Portland, OR (US); Tanner Bruce DeVoe, Fremont, CA (US)

(73) Assignee: Lunar Energy, Inc., Mountain View, CA (US)

( * ) Notice: Subject to any disclaimer, the term of this patent is extended or adjusted under 35 U.S.C. 154(b) by 0 days.

(21) Appl. No.: 17/945,662

(22) Filed: Sep. 15, 2022

Related U.S. Application Data

(60) Provisional application No. 63/245,010, filed on Sep. 16, 2021.

(51) Int. Cl.
| | |
|---|---|
| *H01R 13/52* | (2006.01) |
| *H01R 13/405* | (2006.01) |
| *H01M 50/262* | (2021.01) |
| *H01M 50/296* | (2021.01) |
| *H01M 50/24* | (2021.01) |

(52) U.S. Cl.
CPC ........ *H01R 13/5202* (2013.01); *H01M 50/24* (2021.01); *H01M 50/262* (2021.01); *H01M 50/296* (2021.01); *H01R 13/405* (2013.01); *H01R 13/5216* (2013.01)

(58) Field of Classification Search
CPC .............. H01R 13/405; H01R 13/5202; H01R 13/5216; H01M 50/24; H01M 50/296; H01M 50/262
USPC .......................................................... 439/519
See application file for complete search history.

(56) References Cited

U.S. PATENT DOCUMENTS

| | | | | |
|---|---|---|---|---|
| 5,766,026 | A * | 6/1998 | Cooper ............... | F15B 13/0892 361/736 |
| 6,305,975 | B1 * | 10/2001 | Steiner ............... | H01R 13/5202 174/18 |
| 6,664,678 | B2 * | 12/2003 | Shimizu ............... | H01R 13/521 310/71 |
| 9,444,177 | B2 * | 9/2016 | Tsai .................... | H01R 13/5219 |
| 9,893,452 | B2 * | 2/2018 | Wagman ................ | H01R 43/20 |
| 10,205,270 | B2 * | 2/2019 | Lu ....................... | H01R 13/5202 |
| 10,263,381 | B2 * | 4/2019 | Kallman .............. | H01R 13/521 |
| 10,320,101 | B2 * | 6/2019 | Brogan .............. | H01R 13/6598 |
| 10,396,486 | B2 * | 8/2019 | de Chazal .......... | H01R 13/4362 |
| 10,804,047 | B2 * | 10/2020 | Cha ......................... | H04M 1/02 |
| 10,991,931 | B2 * | 4/2021 | Yamamoto ............... | H01G 9/26 |
| 11,189,955 | B2 * | 11/2021 | Aoki ...................... | H01R 13/42 |
| 11,258,216 | B2 * | 2/2022 | Hitchcock .............. | H01R 13/52 |
| 2005/0245982 | A1 * | 11/2005 | Kast ................... | H01R 13/5216 607/36 |
| 2012/0034507 | A1 * | 2/2012 | Harada .................. | B60L 58/26 429/120 |
| 2012/0121966 | A1 * | 5/2012 | Kim .................... | H01M 50/512 429/158 |
| 2013/0288530 | A1 * | 10/2013 | Zhao ................... | H01M 50/503 439/627 |

(Continued)

*Primary Examiner* — Abdullah A Riyami
*Assistant Examiner* — Vladimir Imas
(74) *Attorney, Agent, or Firm* — Van Pelt, Yi & James LLP

(57) ABSTRACT

An energy module storage module cap includes a plate. It further includes a power output terminal about which the plate is molded. It further includes an auxiliary pin about which the plate is molded. It further includes a gasket disposed on the plate.

17 Claims, 50 Drawing Sheets

(56) References Cited

U.S. PATENT DOCUMENTS

| | | | |
|---|---|---|---|
| 2015/0236326 A1* | 8/2015 | Kim | H01M 50/507 |
| | | | 429/159 |
| 2021/0044052 A1* | 2/2021 | Takahashi | H01R 13/5202 |
| 2021/0157019 A1* | 5/2021 | Shen | H01R 33/92 |
| 2022/0216643 A1* | 7/2022 | Liao | H01R 13/5202 |
| 2022/0338359 A1* | 10/2022 | Ramirez Ortiz | H01R 13/405 |
| 2022/0407272 A1* | 12/2022 | Page | H01R 13/5219 |

\* cited by examiner

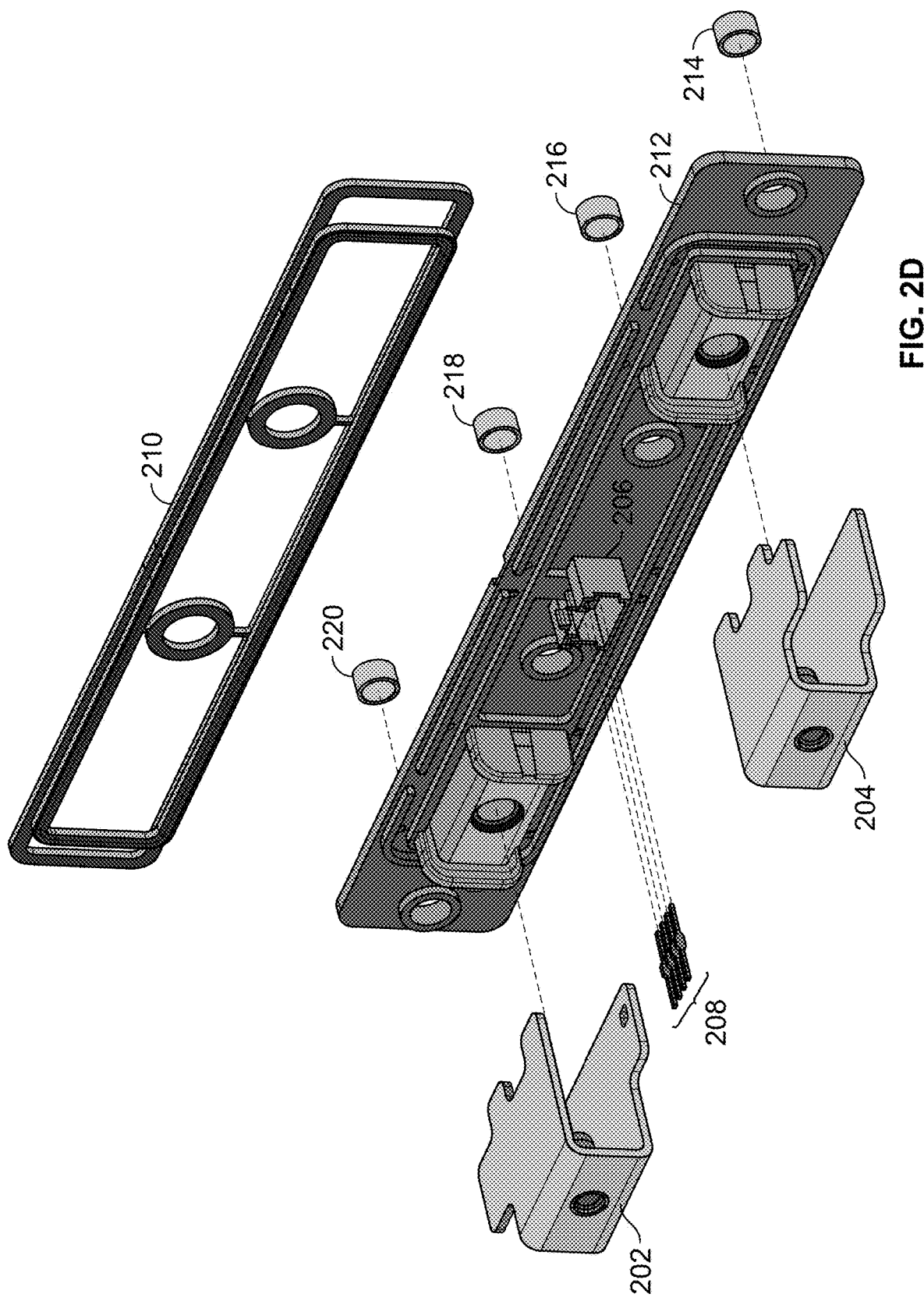

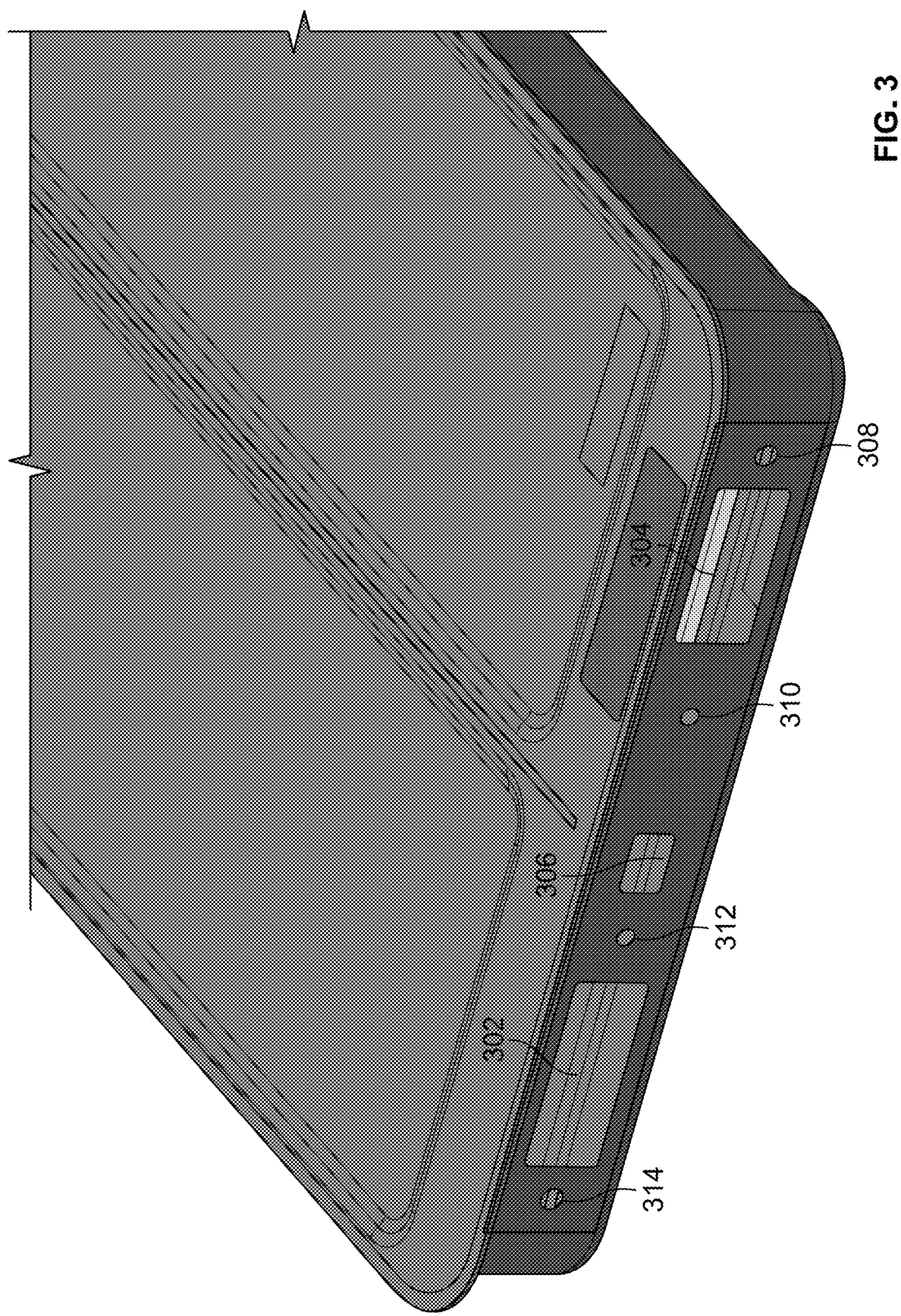

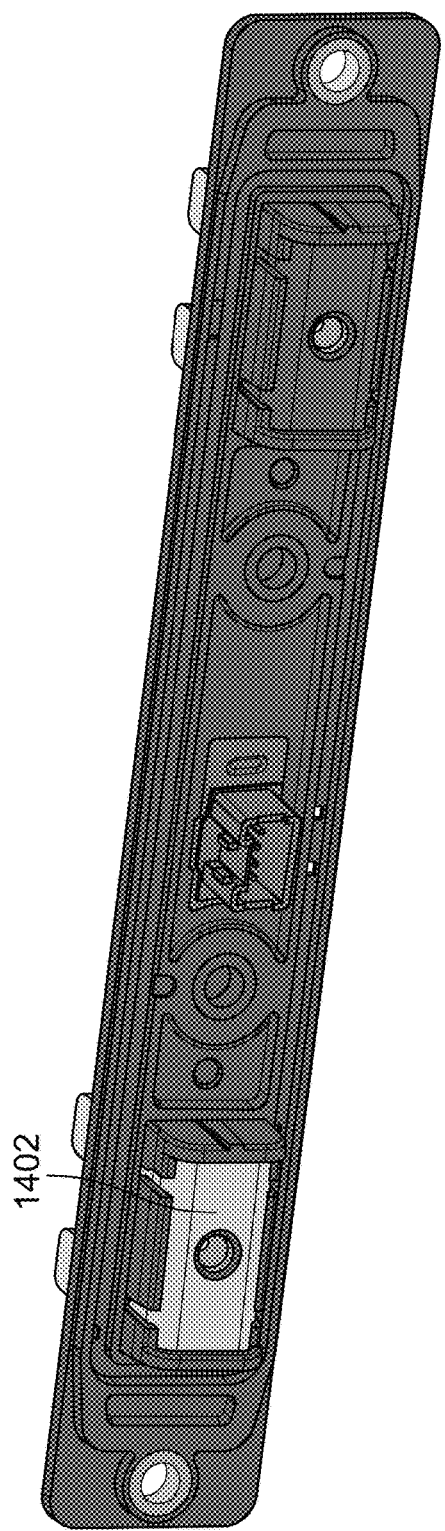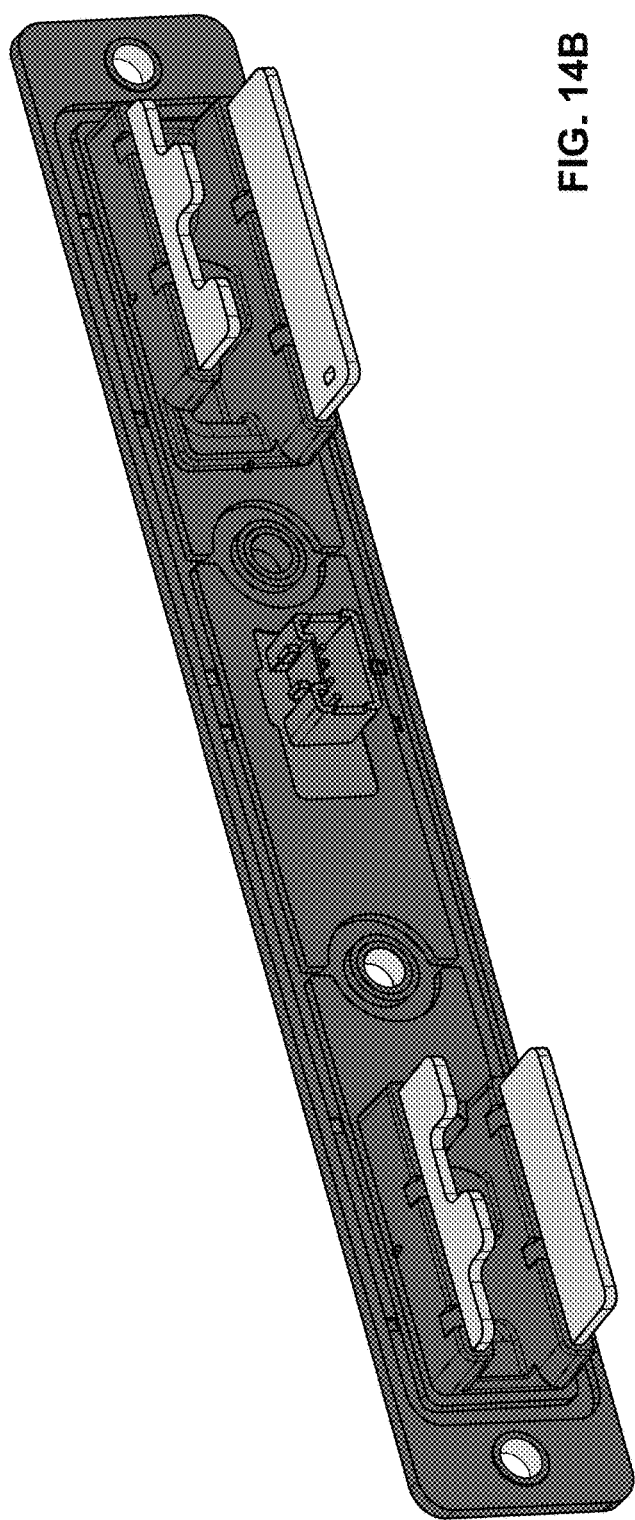
FIG. 14A
FIG. 14B

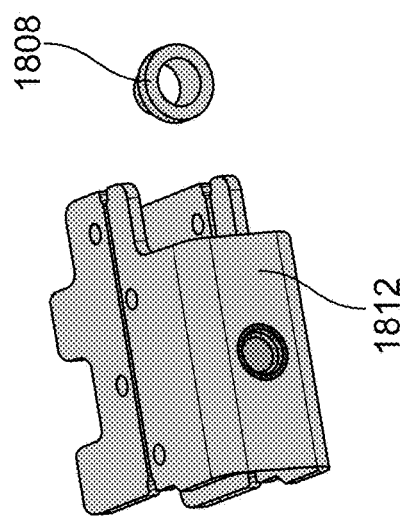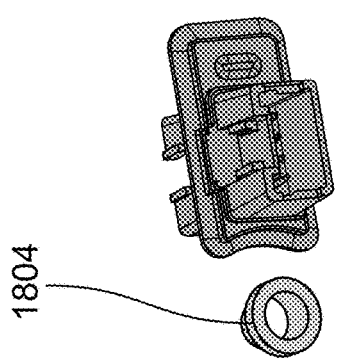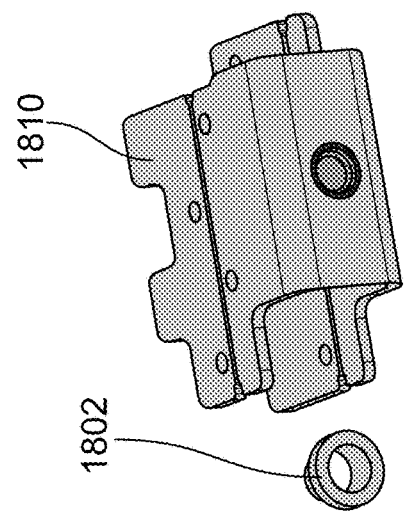
FIG. 18A
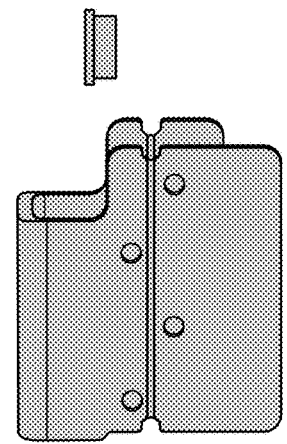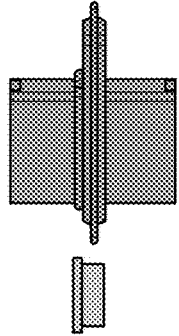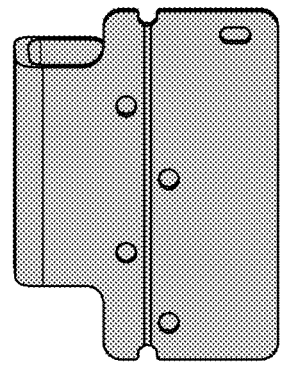
FIG. 18B

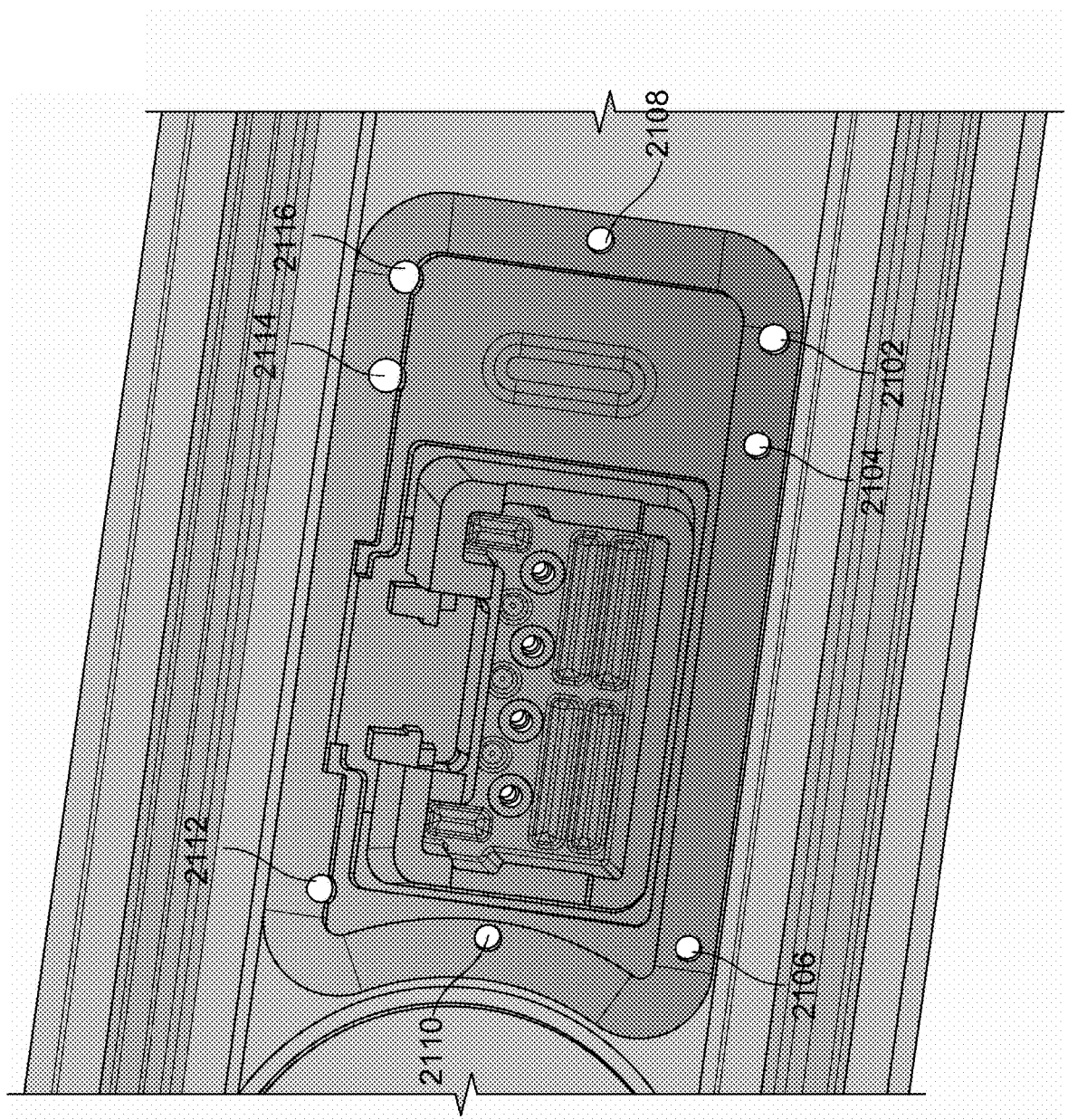

ELECTROMECHANICAL CONNECTOR

CROSS REFERENCE TO OTHER APPLICATIONS

This application claims priority to U.S. Provisional Patent Application No. 63/245,010 entitled ELECTROMECHANICAL CONNECTOR filed Sep. 16, 2021 which is incorporated herein by reference for all purposes.

BACKGROUND OF THE INVENTION

Battery systems must provide isolation and sealing of internal battery cells, while also allowing for electrical connection into and out of the sealed chambers that hold such battery cells. Simultaneously providing both sealing and electrical pathways can be challenging.

BRIEF DESCRIPTION OF THE DRAWINGS

Various embodiments of the invention are disclosed in the following detailed description and the accompanying drawings.

FIG. 2D illustrates an embodiment of an exploded view of the face plate component.

FIG. 3 illustrates an embodiment of a portion of a sub-module.

FIGS. 14A-14D illustrates an embodiment of a plate with electromechanical connector.

FIGS. 18A-18B illustrate embodiments of a process for manufacturing a connector plate over a set of components and a molded electromechanical connector.

FIGS. 21A and 21B illustrate an embodiment of an electromechanical connector including perforations.

DETAILED DESCRIPTION

Figure 1:
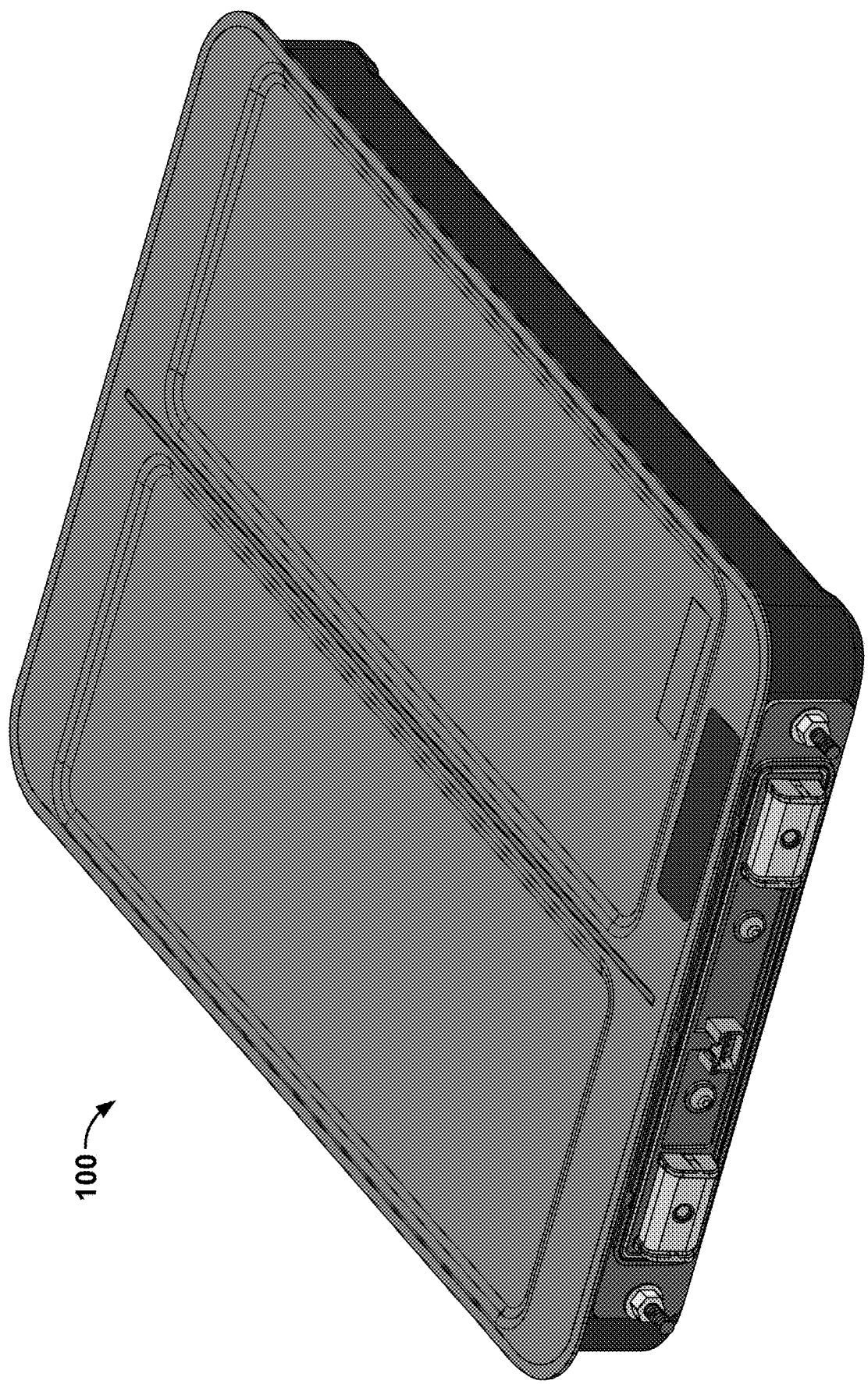
FIG. 1 illustrates an embodiment of a sub-module.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Existing configurations for constructing a battery system for home or grid scale use have various pros and cons:

For example, among existing configurations that use Li-ion battery cells for storing electrical energy, there exists an ever present risk that any single cell may have a critical failure that leads to thermal runaway Managing a cell that has tripped into thermal runaway is a non-trivial challenge.

The event results in nearly all the mass of a single cell to undergo an exothermic chemical reaction that raises the temperature of that cell from ~100 C to >1000 C in a matter of seconds.

The same chemical reaction produces an excessive amount of superheated gases that must escape the energy storage system.

In some embodiments, to improve upon existing battery system configurations and manage thermal runaway events, a battery design (also referred to herein as a "submodule") is used that isolates all battery cells within a battery system into, in some embodiments, groups of no more than 2 cells In some embodiments, the isolation of these cells provides enough thermal resistance from one cell to the next to prevent thermal propagation beyond the single bay of two cells.

In some embodiments, the isolation of these cells may present electrical challenges by fully encapsulating each pair of cells inside of a sealed box or enclosure.

Described herein are embodiments of techniques for ensuring the submodule cells remain isolated (sealed) within their respective chambers while simultaneously providing electrical pathways to carry power, signal, and data into and out of the sealed chambers.

Example Embodiments

Example Embodiment 1: In some embodiments, an electromechanical connector that can pass power into and out of the cells while also providing an IP68 seal to the container:
  includes busbars capable of handling high density current into and out of the submodule
  includes gasket geometry that seals the plate against the openings in the submodule wall
  provides additional electrical ports for the independent measurement of voltage and temperature at one or more nodes along the battery system
  provides fastening architecture that is similarly used to ensure an effective seal is produced at all locations where the submodule container has an opening Example Embodiment 2: In some embodiments, an electromechanical connector is designed that can be used as a subassembly insert on the larger electromechanical assembly referenced above
  In some embodiments, this electromechanical connector fits within the constraints of the container and power lines as defined by the minimum container size, driven in some embodiments by the thickness of the cells as stacked within a single container
  In some embodiments, the electromechanical connector provides sufficient electrical isolation so as to comply with the standards set forth by regulatory bodies; i.e. designed to withstand full system voltages of up to 300V
  In some embodiments, the electromechanical connector provides sufficient electrical conductivity so as to allow for balancing currents to be fed into the battery system through this connector
  In some embodiments, the electromechanical connector provides a minimum of two lines (feeds and returns) as required for the installation of a plurality of thermistors upon the interior of each battery cell container
    In some embodiments, lines of this nature may be combined with additional returns (voltage change) and only one feed (ground) so as to minimize additional leak points and space required
  In some embodiments, the electromechanical connector may provide features that can be overmolded during a subsequent insert mold application
    In some embodiments, features may melt/converge with the injection resin during the subsequent insert molding process, so long as the exterior profile dimensions after the fact remain unchanged. In some embodiments, the tooling is configured to change the external profile dimensions.
  In some embodiments, the electromechanical connector provides for duplicated mating connector plugs to be applied to both sides of the same receptacle
    In some embodiments, the inverse may also be true, wherein the plug is double ended and the receptacle is duplicated for mating purposes
  In some embodiments, the electromechanical connector provides a latching mechanism on both sides of the signal input/output so as to create a strong mechanical retention of any mating connector throughout the product lifecycle
  In some embodiments, the electromechanical connector is manufacturable at high volume and out of a readily available, and in some embodiments recycled, polymeric compound, ceramic compound, or any other insulating material as appropriate.
  In some embodiments, the electromechanical connector includes independent sealing features to further facilitate the IP68 isolation of cells interior to the containers and the surrounding environment Example Embodiment 3: A cable harness that mates with the smaller electromechanical connector referenced above that is plugged into the connector One embodiment of the small electromechanical assembly is an off the shelf connector that is capable of:
  1. Measuring voltages at every location within a collection of containers (in some embodiments, each container is connected to one another in series, and with 'central' nodes that cannot be accessed from outside of each container)
  2. Measuring the temperature at a plurality of the coldest and hottest locations of each container (e.g., in hottest and/or coldest locations in a container)
  3. Supplying balancing current to designated nodes throughout the series connection of cells/containers
  4. Having mating plug/receptacle features that in some embodiments are exactly or substantially the same on both sides of the connector
  5. In some embodiments, fitting within the height of two battery cells stacked atop one another
  6. In some embodiments, high temperature resistant insulator or an insulator that is compatible with an insert mold that will be injected around this connector In some embodiments, the embodiment identified above facilitates a long term path of creating a single, full turn-key solution for the top level electromechanical design identified as in Embodiment 1 above.

One example iteration of Embodiment 1 is one in which the power carrying busbars/connectors are deformed, scored, or modified in a material fashion so as to create positive-pressure interference fit of overmolded resin, thereby further preventing leaks.

An example alternative to Embodiment 2 is to use a contactless-connector to pass signal and current across an insulator without introducing a risk of leak path.

Embodiment 2 Example Iterations/Concepts

Example Baseline assumption: use of standard pins and socket electrical connections may lead to greater risk of leaking or harder time positioning.

Example Iteration 1: use a PCB (printed circuit board) with through-holes and pads that are touched off against by pogo-pins on the plugs Example Iteration 1.1: use deflecting formed contacts for touching off on the PCB pads In another embodiment, a PCB with mechanically connected pins is used as the plug component that is used to create embodiment 1.

In another embodiment, use of a PCB with mechanically connected pins and additional location features constitutes the entirety of Embodiment 2 for inclusion in Embodiment 1. In some embodiments of this instance, the location features may be electrically insulating. In some embodiments, for this embodiment, the location features may be electrically conducting.

with pins.

In another embodiment, the PCB has mechanically connected sockets that mate

In some embodiments, the pins and or sockets attached to the PCB are electrically connected to the PCB.

In some embodiments, the PCB is made of a flexible circuit board.

The following are additional embodiments and details regarding electromechanical connectors.

Additional Embodiments

FIG. 1 illustrates an embodiment of a sub-module. In this example, and as described above, the sub-module encapsulates a pair of cells (also referred to herein as pouches) inside of a sealed enclosure.

Figure 2A:
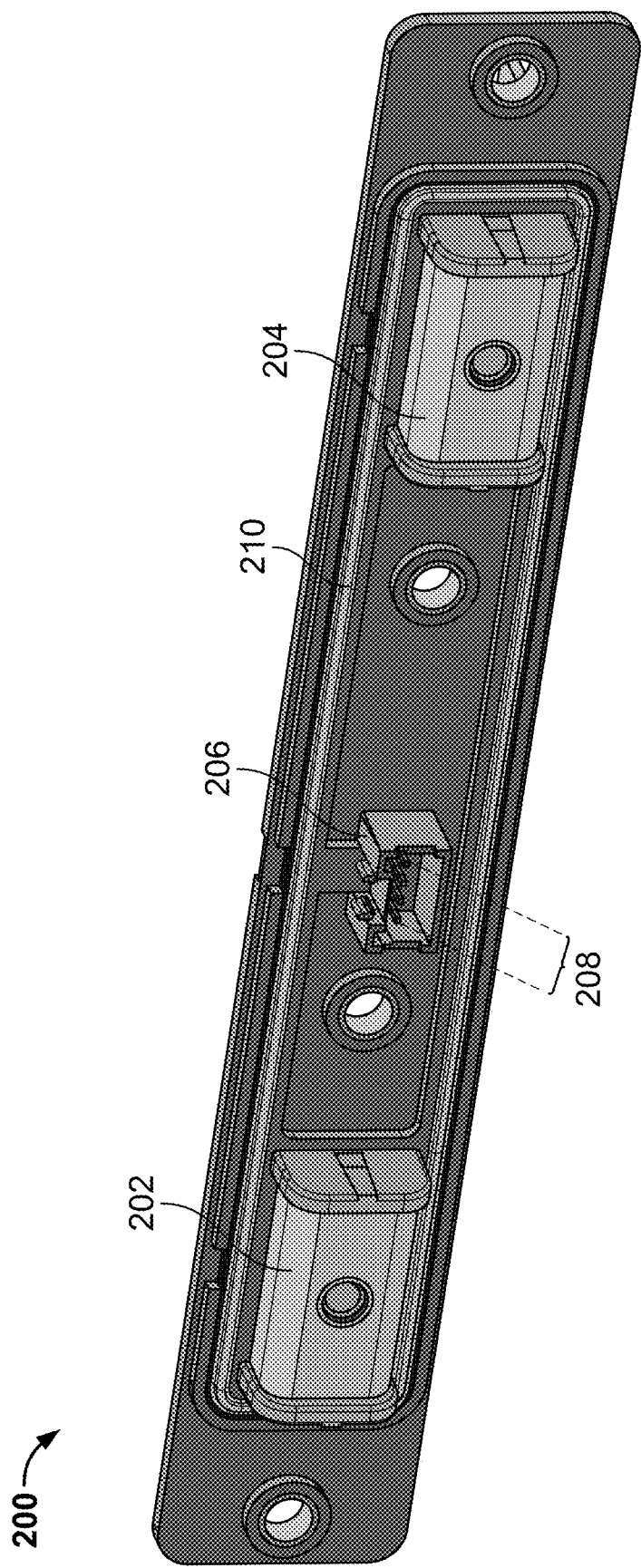
FIG. 2A-2C illustrate embodiments of an electromechanical connector plate of a sub-module.

FIG. 2A illustrates an embodiment of an electromechanical connector plate 200 of a sub-module. The face of the connector plate includes power connectors 202 and 204, where power is carried through the power connectors into and out of the battery cells. In some embodiments, the connector plate 200 is integrated into a larger power transfer system for a battery management system. In some embodiments, the connector is linear.

In some embodiments, the connector plate component 200 fits over one end of the sub-module, "capping" one end of the enclosure. The other end of the enclosure of the sub-module may be sealed with another cap. In some embodiments, the plate is a closing, sealing component to the assembly of the sub-module. Further details regarding fastening of the connector plate to the face of a submodule are described below.

In some embodiments, the plate component form factor carries power into and out using metal inserts 202 and 204 (which may be connected to busbars) directly to the cells. In some embodiments, the face plate also includes an electromechanical port 206. Further details regarding the port 206 are described below.

In some embodiments the connector plate is fastened linearly in place (as opposed for example, in a circular fashion or using flanges around a connector). As one example, the plate 200 fits over the cutouts in the face of the sub-module enclosure as shown in the example of FIG. 3, providing both connection points, while also sealing the sub-module. For example, as shown in the embodiment of FIG. 3, the can/enclosure of the sub module includes cutout holes 302-308 for fastening the connector plate to the bulkhead passthrough of the face of the sub-module, as well as passthroughs for the electrical signal (e.g., passthrough 306 for connector 206) and for power (302 and 304 for power connectors 202 and 204, respectively). Further details regarding fastening of the connector plate 200 to a submodule enclosure are provided below.

Continuing with the example of FIG. 2A, in some embodiments, the electromechanical port 206 includes pins 208. In some embodiments, the pins are used to carry signals into/out of the sub-module. In some embodiments, at least some of the pins (e.g., middle two pins) are used for measuring the temperature using instrumentation in the inside of the sub-module to ensure safety of the battery system. As one example, the temperature sensing is performed using thermistors.

In some embodiments, at least some of the pins (e.g., outer two pins) are used for balancing battery cells and their voltages. These pins may be used to actively measure the voltage of the cells. In some embodiments, these pins also supply the cells balancing currents. For example, in some embodiments, two of the pins are connected to two different ends of a battery cell in the sub-module. In some embodiments, the balancing current pins are spaced as far apart as possible (e.g., as the two outermost pins). In some embodiments, the pins for current balancing are also used to simultaneously measure the voltage. In some embodiments, the voltage measuring pins are separated from the circuit including metal portions/power connectors 202 and 204. In some embodiments, the voltage sensing pin simultaneously, based on its connection to a sensor network inside the sub-module, also allows for current to flow into the battery cell (or through another pin, such as an outer pin). Those currents are then used to appropriately ensure that every parallel set of batteries (e.g., throughout an entire stack of sub-modules) are maintained at the same voltage level as other battery cells within the stack.

As described above, the sub-module is designed to handle battery cells in a manner that effectively manages thermal runaway events. In some embodiments the connector plate component 200 functions to facilitate such thermal management by allowing electrical signals to pass into and out of the sub-module, both from a power side, as well as a balancing current side, for example via the electromechanical connector 206. In some embodiments, connector 206 is designed into a mold for the connector plate 200.

Figure 2B:
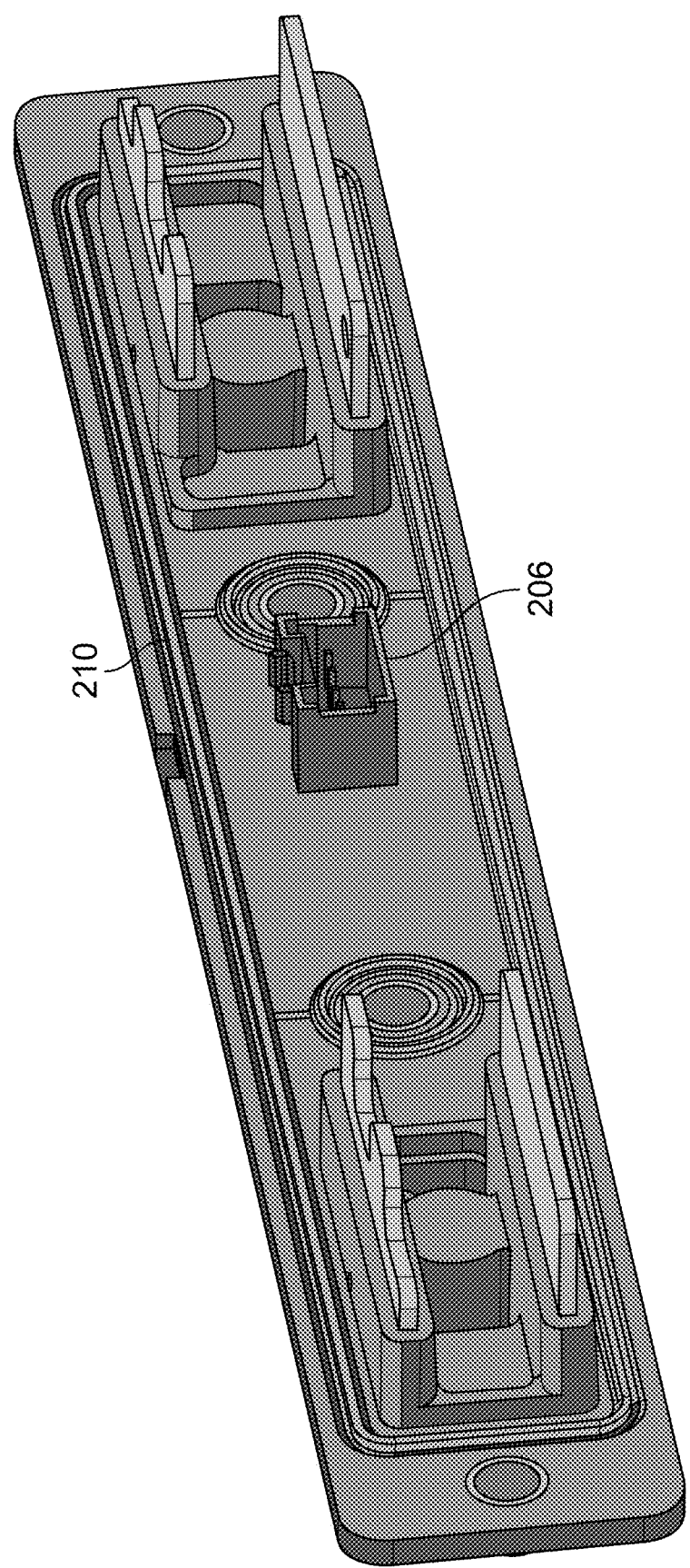

FIG. 2B illustrates an embodiment of a connector plate for a sub-module. A rear view of plate 200 is shown in the example of FIG. 2B. In this example, connector port 206 is the same material on both sides as a bulkhead pass-through connector. As shown in this example, the connector 206 is an example of a bulkhead connector that is double ended. In some embodiments, the receptacle 206 mates to a plug. In some embodiments, the connector 206 is plugged into the same way on both sides of the plate.

Figure 2C:
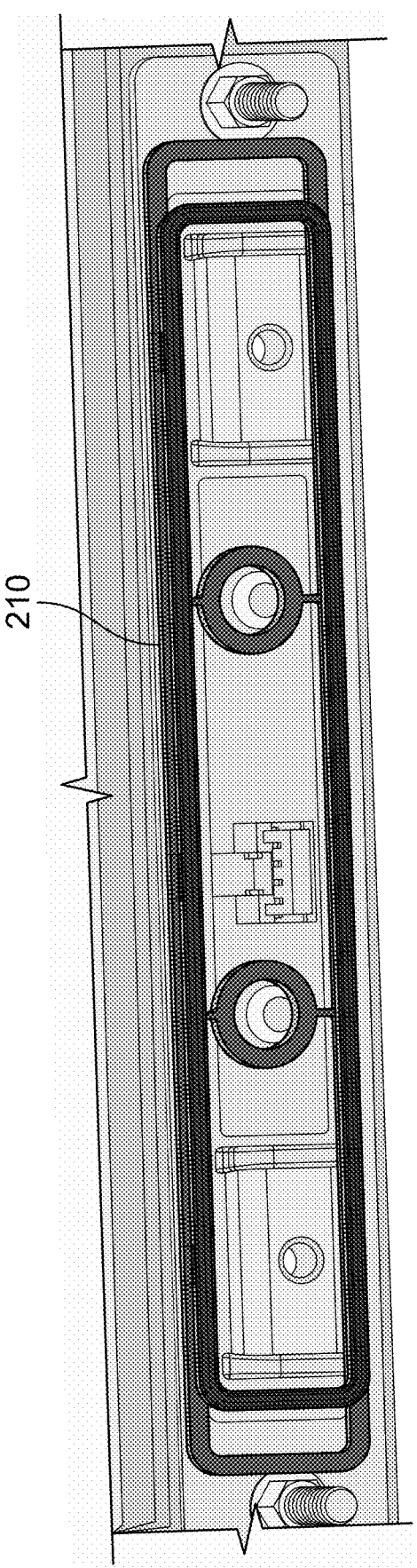

As shown in this example, the connector plate is an example of a linear connector that is able to carry currents for a battery system (e.g., via the busbars), while simultaneously providing the ability to obtain balancing currents, voltage sensing, temperature instrumentation out of a sub-module, etc. without causing leakage. In some embodiments, gasket 210 is used to prevent leakage. An example of gasket 210 isolated is shown in FIG. 2C.

In some embodiments, the connector 206 includes a double ended receptacle that may be overmolded with the rest of the plate assembly 200. In some embodiments, portions 202, 204, and the connector 206 are inserts during the manufacturing process, where the plate is injected over the inserts, and the gasket is then overmolded. In some embodiments, the face connector plate is built as a full turnkey part.

In some embodiments, as used herein, for injection molding, there are three types or categories. One example is straight injection molding where a plastic part is manufactured that does not have anything else associated with it, until it is introduced into a next level subassembly or top level assembly. Another example is insert-molded parts. This includes having components such as metal or plastic components that are inserted into the tool to manufacture the (electromechanical) assembly as a whole. Here, polymer is molded around those inserts. An overmold includes using a piece that has already been injection molded once before, which is inserted into a tool that is configured to shut off on that plastic piece and mold a different plastic over it, whether that is a gasket or a different resin altogether with a different color. In overmolding, there is an existing injection molded piece on top of which more material is being molded.

The following is one embodiment of manufacturing the connector plate 200. Connector 206 is molded. The connector 206 is used as an insert for an insert mold. The remaining portion of the plate 200 (minus the gasket) is molded around the connector, as well as the metal inserts 202 and 204. An overmold is then performed to include the gasket 210. In another embodiment, manufacturing of the connector plate 200 in its entirety is made by a tool, eliminating the middle step of first manufacturing the connector 206 as an insert. In various embodiments, the gasket is adhered in place (e.g., with a sticker), or placed without an adhesive between the connector plate and the pass-through wall.

Figure 13:
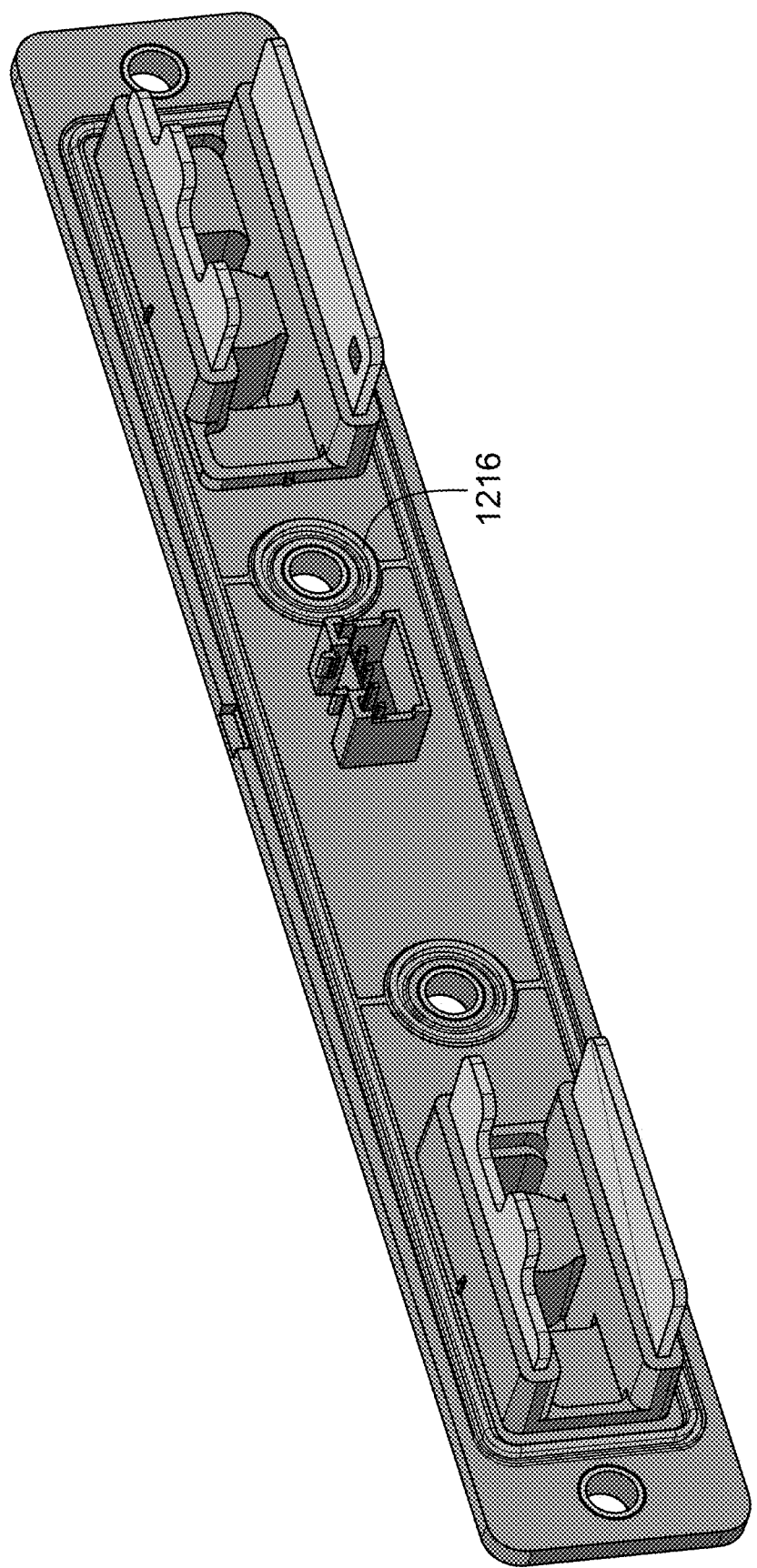
FIG. 13 illustrates an embodiment of a view of a connector plate.
Figure 14C:
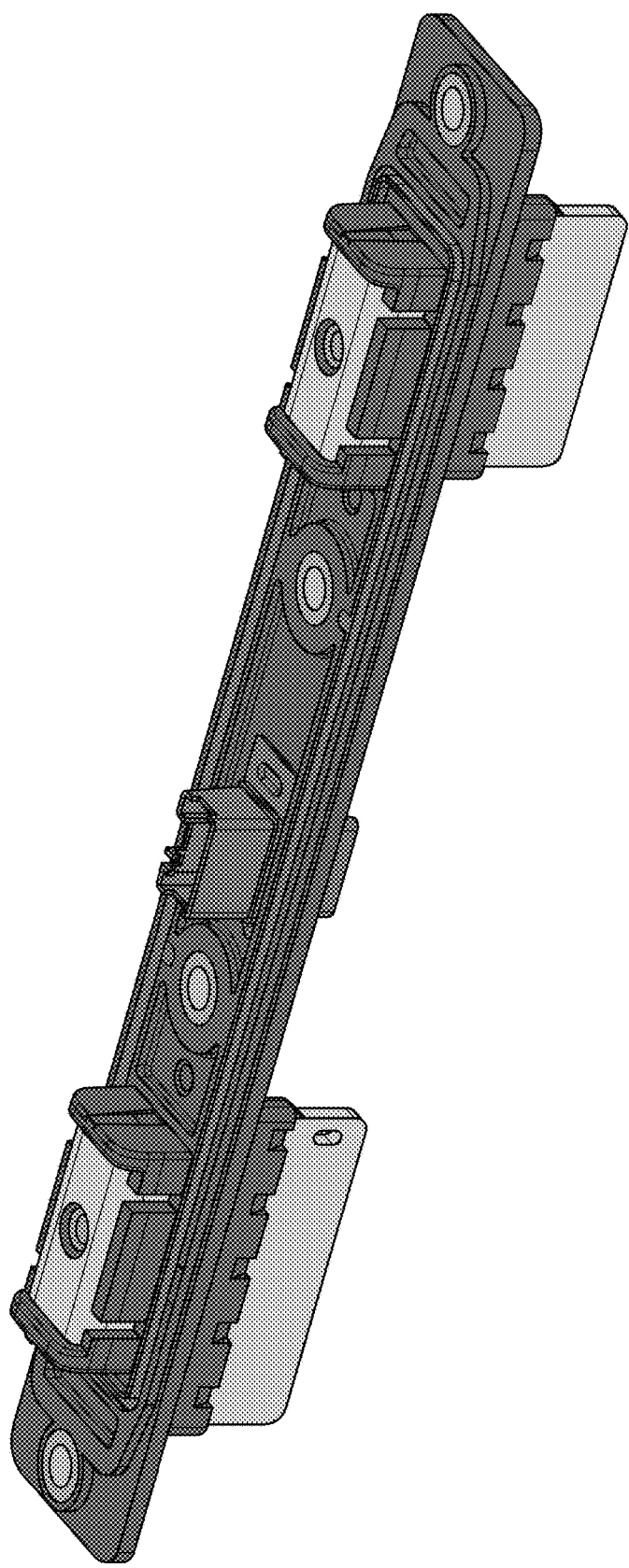
Figure 14D:
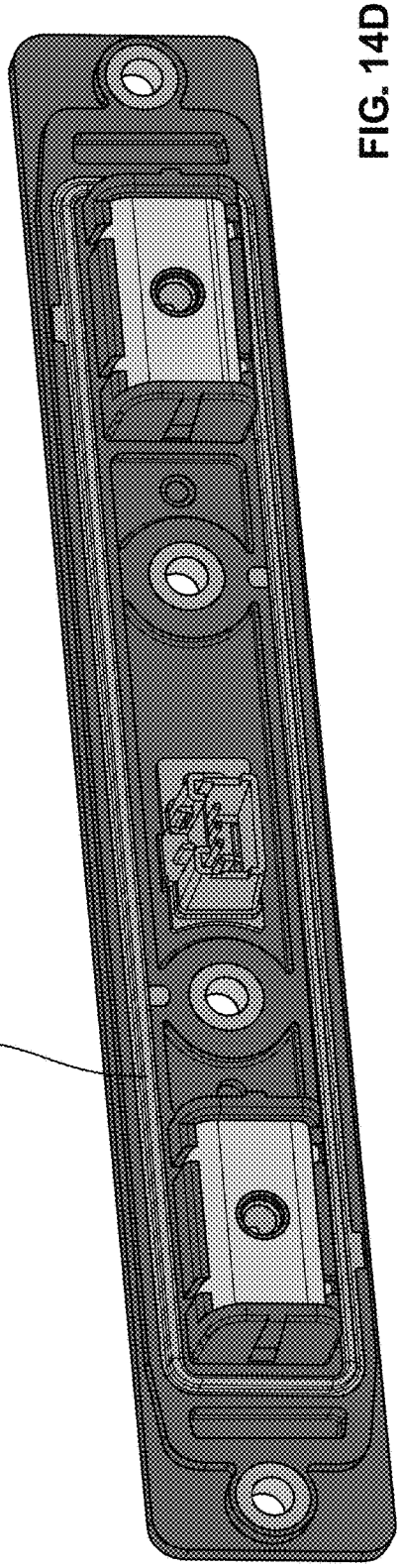

FIG. 2D illustrates an embodiment of an exploded view of the face plate component 200. In some embodiments, manufacturing starts with an empty tool into which parts 202, 204 (power connectors), and pins 208 are inserted. Compression limiters 214-220 are also included (embodiments of compression limiters are described in further detail below) Those parts are inserted into the tool. The tool then molds component 212 (e.g., plastic component) around the inserts (inserted parts 202, 204, 208, and 214-220), where in some embodiments component 212 is molded in a single pass or in one shot. The gasket is then overmolded. As shown in this example, the gasket 210 is overmolded over both sides of the connector plate (as also shown in the examples of FIGS. 2B and 13).

In some embodiments, the receptacle 206 is molded as part of the pass in which component 212 is molded. In other embodiments, receptacle 206 is molded around the pins 208 first, and then the combination of the receptacle/connector with inserted pins, along with the power connectors 202 and 204, is overmolded with component 212 all at once. This allows, for example, the use of arbitrary off-the-shelf connectors. In this example, the connector 206 is used as a subassembly insert that then is included as an interstitial step, which allows for various changes to instrumentation while minimizing changes to the overall connector profile or geometry or design.

In some embodiments, the connector 206 is flanged. In some embodiments, the double-ended connector has a flange geometry for overmolding (rather than for being assembled). This allows the connector to fit within the sub-module, while eliminating leak points (which would be introduced if it were separately assembled). This also allows for integration with the gasket geometry. In some embodiments, the retention feature of the connector 206 is removed from the connector, and is instead incorporated into the overmolded component itself. In some embodiments, laser welding is performed. In some embodiments, rather than having connector 206, the signal lines are incorporated into the geometry of component 212. In this manner, a connection may be made directly from the outside of the module to the inside. By doing so, the requirements for mating force retention of a bulkhead passthrough is eliminated, which allows for a much smaller geometry for the signals carried by the pins 208 that are contained within connector 206 or component 212. With the reduced size, the connector with the pins 208 may be removed, and the signal lines incorporated in parallel with the overall power transfer components (including the metal inserts 202 and 204). This further eliminates and minimizes the number of fasteners, thereby further reducing the number of openings in the sealed container that holds the cells.

In some embodiments, the pins 208 of connector 206 are electrically isolated from higher voltages that may be observed on the energy storage module, thereby reducing the voltage isolation requirements between each of the pins 208. This lowering of the requirement on voltage isolation allows a reduction in the overall size of the connector in some embodiments.

Figure 4:
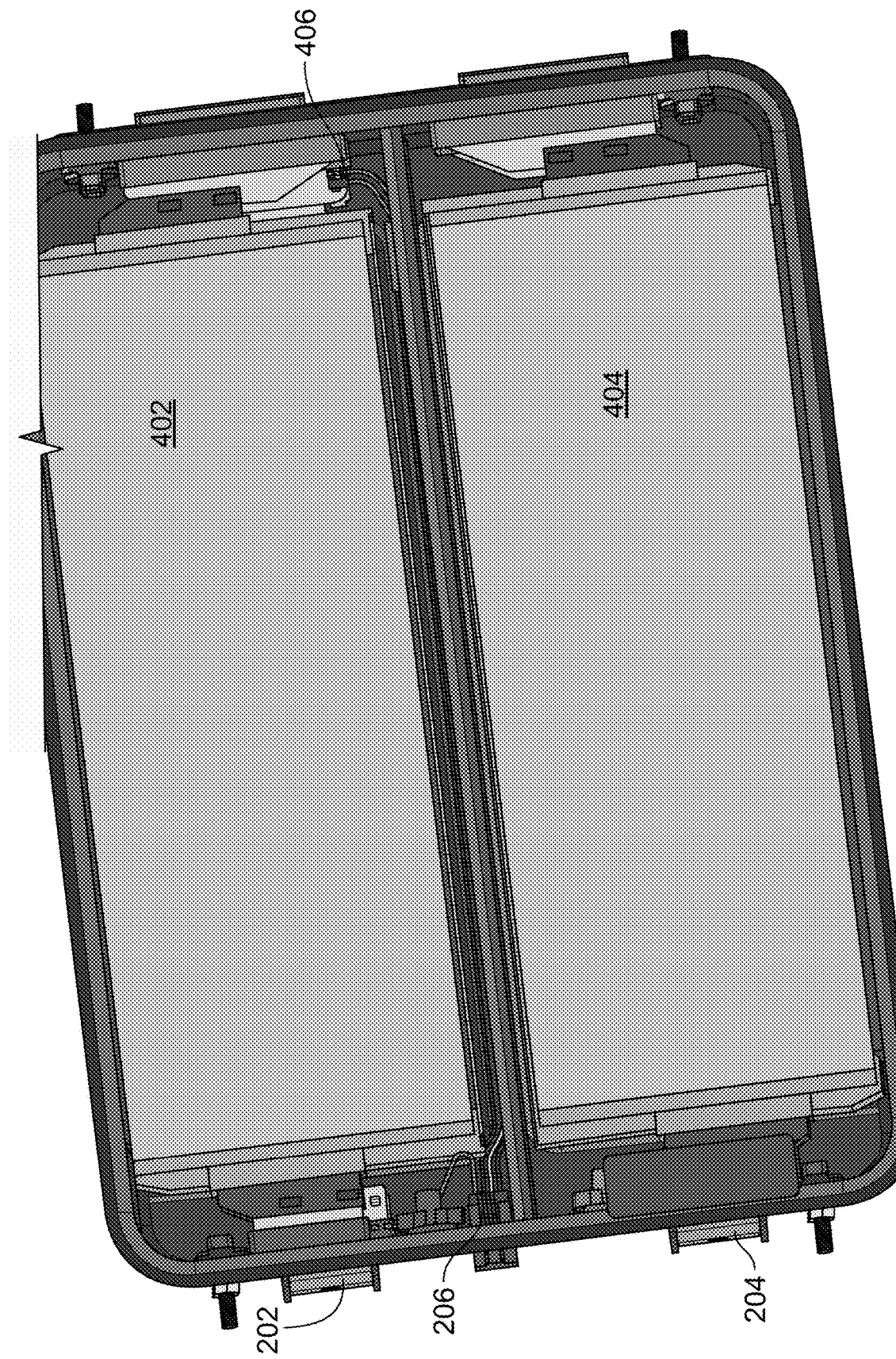
FIG. 4 illustrates an embodiment of a sub-module.

FIG. 4 illustrates an embodiment of a sub-module. A top-down view of sub-module 100 is shown in this example. In this example, the connector plate 200 is installed on the left side of the sub-module. Metal portions 202 and 204 are shown in the example of FIG. 4. Suppose that 50 Amps is running through power connectors 202 and 204. In some embodiments, the battery cells 402 and 404 are series-connected, and the same current will be flowing through them. Suppose that one of the cells drops in voltage lower than other cells or sub-modules. This can cause issues. Similarly, if it becomes too high in voltage, this can also cause an issue.

As described above, in some embodiments, the electromechanical connector port 206 is configured to sense the voltage, for example at location 406. In some embodiments, voltage sensing is connected off of location 202 and the common node across the battery cells, and through that voltage connection, balancing current may also be supplied, for example, up to 150 mA, to offset any internal resistance changes or differential voltages that are observed between one set of cells and the next set of cells (e.g., between battery cells 402 and 404)

Figure 5:
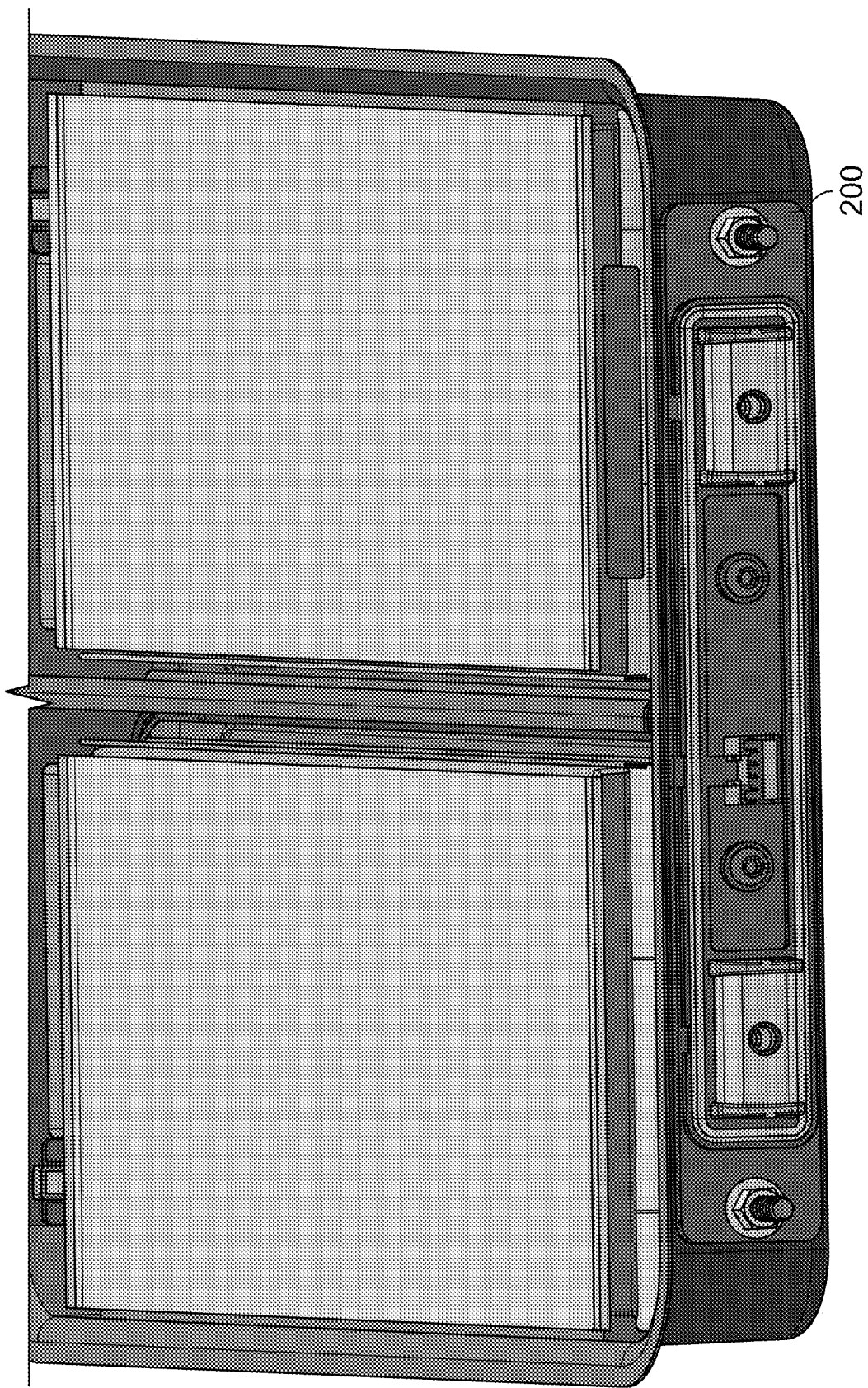
FIG. 5 illustrates an embodiment of a portion of a sub-module.

FIG. 5 illustrates an embodiment of a portion of a sub-module. In this example, the "face" or "terminal side" of the sub-module is shown. Connector plate 200 is shown at the face of the sub-module. In some embodiments, the plate 200 allows the ability to passthrough into/out of the sub-module while still maintaining a level of isolation (e.g., IP68 isolation) within the sub-module. In some embodiments, the connector plate, when fastened, is a water-tight seal connector. In some embodiments, the plate is installed by being bolted into place onto the exterior face of the sub-module. In some embodiments, the plate is installed on the interior face of the sub-module. Further details regarding embodiments of a fastening architecture are described below.

Figure 6:
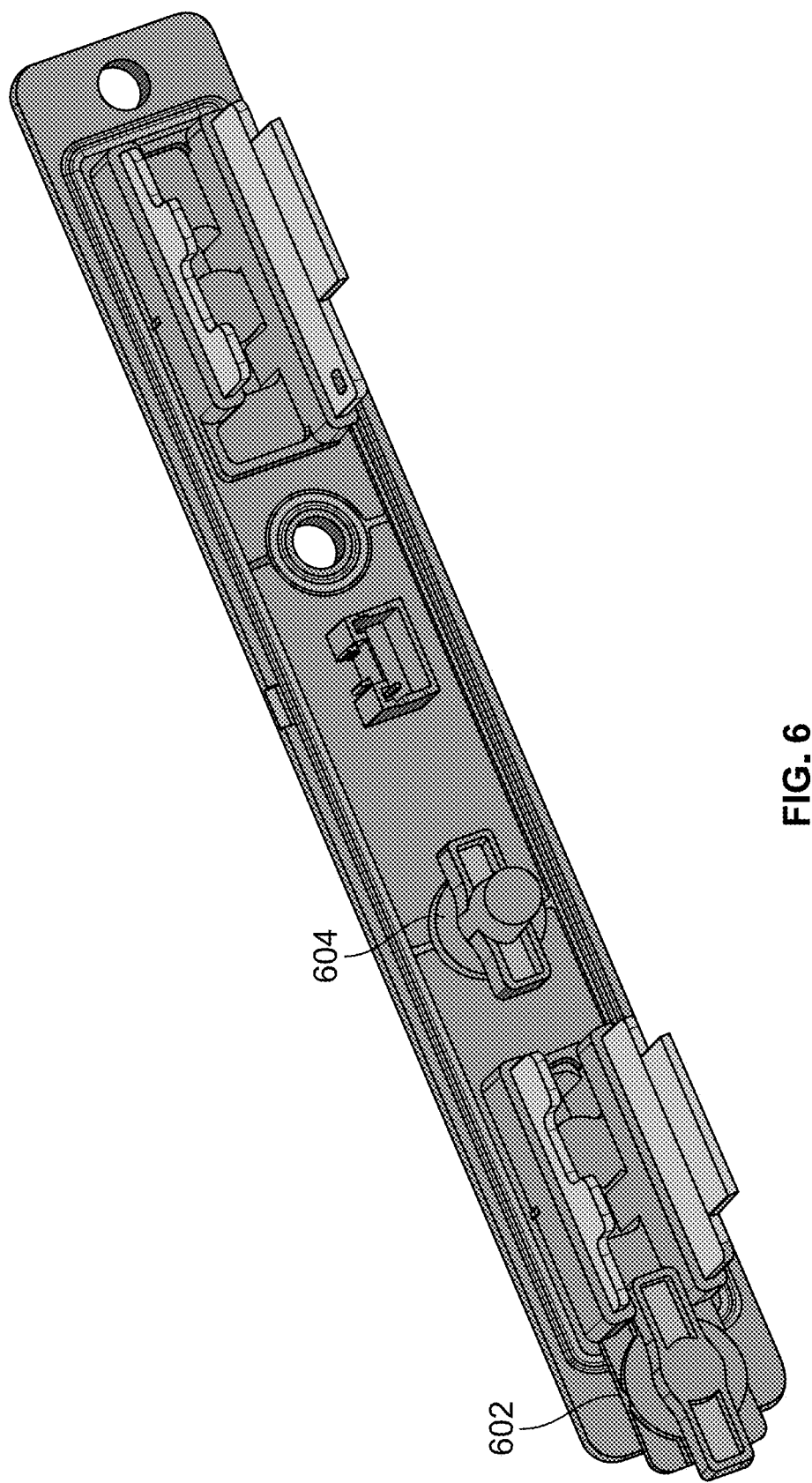
FIG. 6 illustrates an embodiment of a connector plate.
Figure 7:
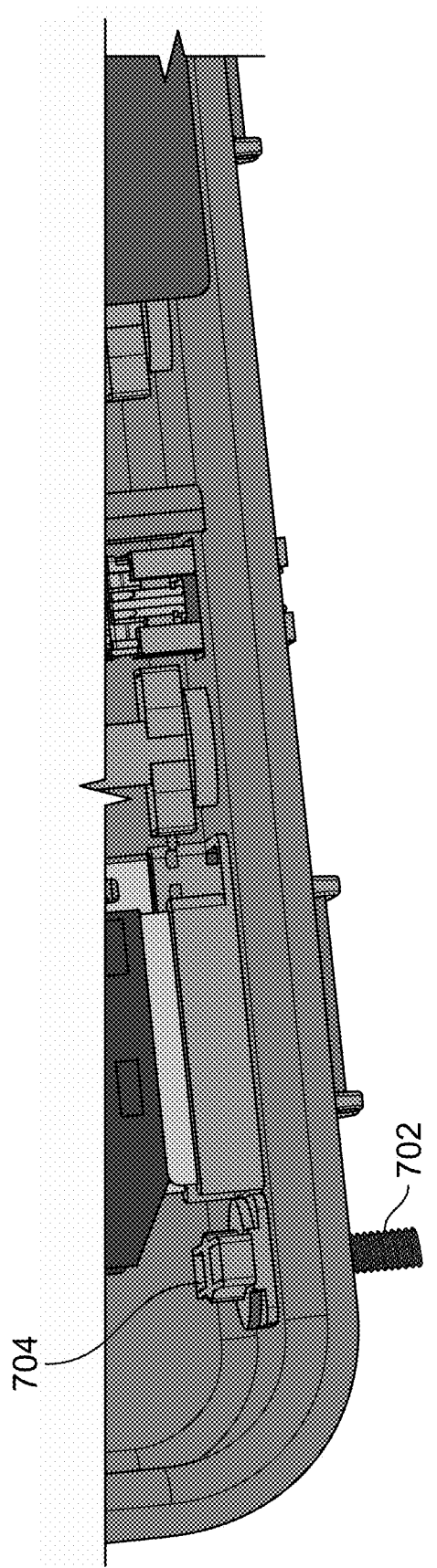
FIG. 7 illustrates an embodiment of a portion of a sub-module.
Figure 8:
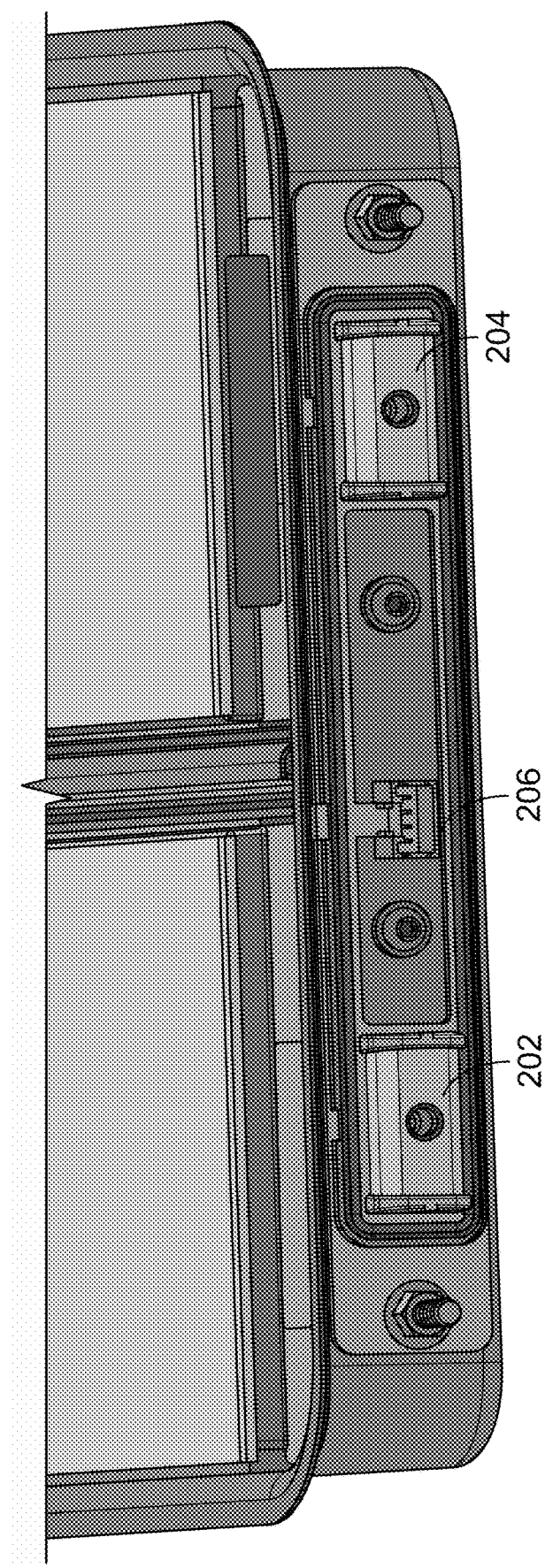
FIG. 8 illustrates an embodiment of a portion of a sub-module with a connector plate.

The following are embodiments of obtaining a functional seal by using fasteners. In some embodiments, the fasteners are overmolded with their own seal geometry. Examples of such fasteners are shown at 602 and 606 of FIG. 6. As shown in the example of FIG. 7, fastener 702, which includes a bolt that goes from the interior to the exterior of the enclosure, is overmolded at 704 with its own seal and is bolted into place. As shown in the example of FIG. 8, in some embodiments, connector 200 has physical fasteners to bolt the connector plate into place on either side of the bulkhead passthrough to create a solid seal, while still being able to pass electrical power and information signal back and forth across the metal barrier (e.g., via the power connectors 204 and 206 and port 206.

In some embodiments, the plate 200 includes two power connectors (e.g., connectors 202 and 204) and a central signal connector (e.g., port 206), which are all integrated into a single part or component. In this example, with the one single connector plate described herein and gasket, a seal is made to the face of the sub-module, where various connections into/out of the sub-module are made through the connector plate 200.

The following are further details regarding embodiments of a fastening architecture. In some embodiments, the fastening architecture of the electromechanical connector 200 ensures that an effective seal is produced at all locations where the submodule container/enclosure has an opening (e.g., at holes 308-314 as shown in the example of FIG. 3).

Figure 9:
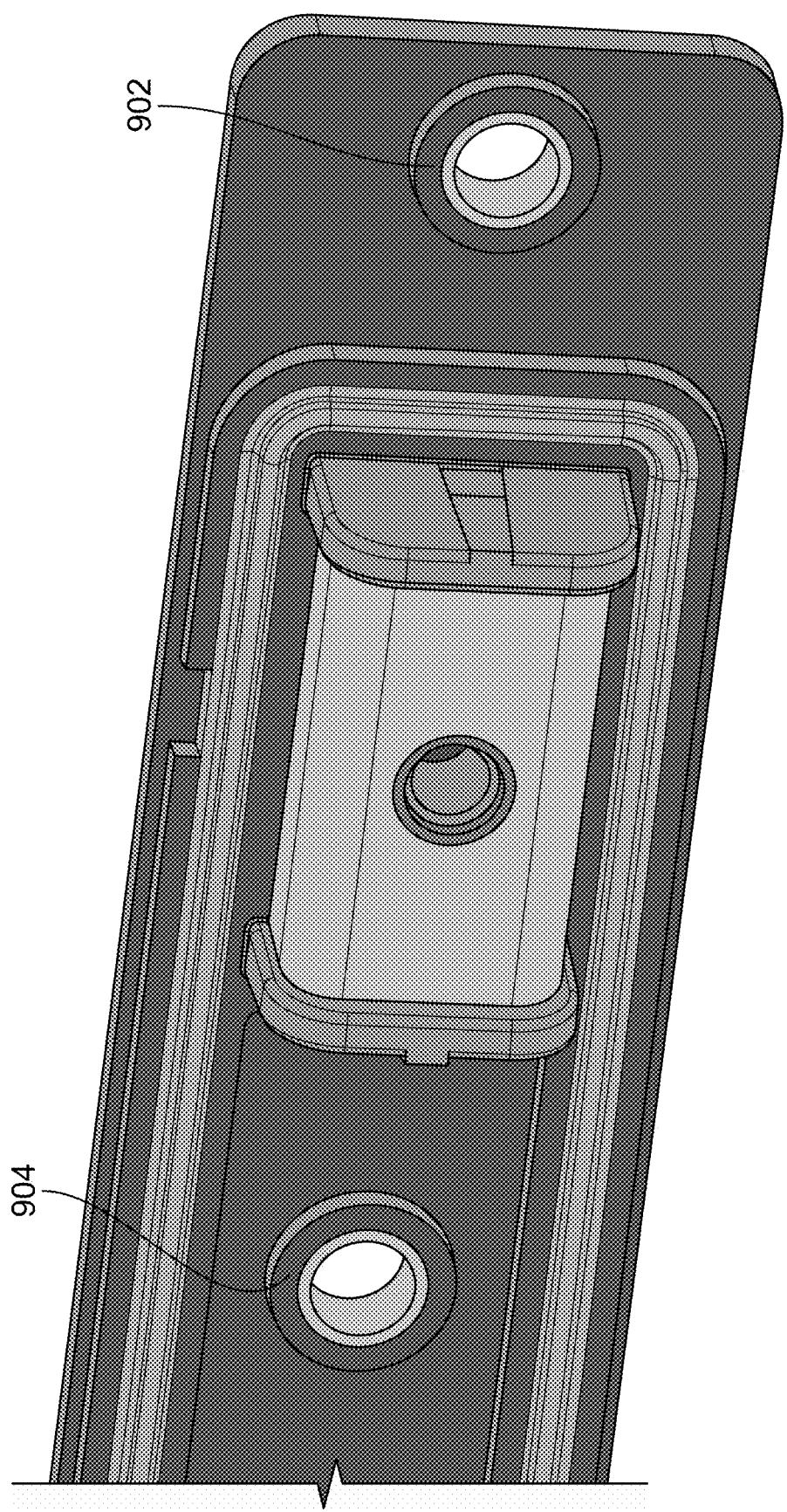
FIG. 9 illustrates an embodiment of a portion of a connector plate.
Figure 10:
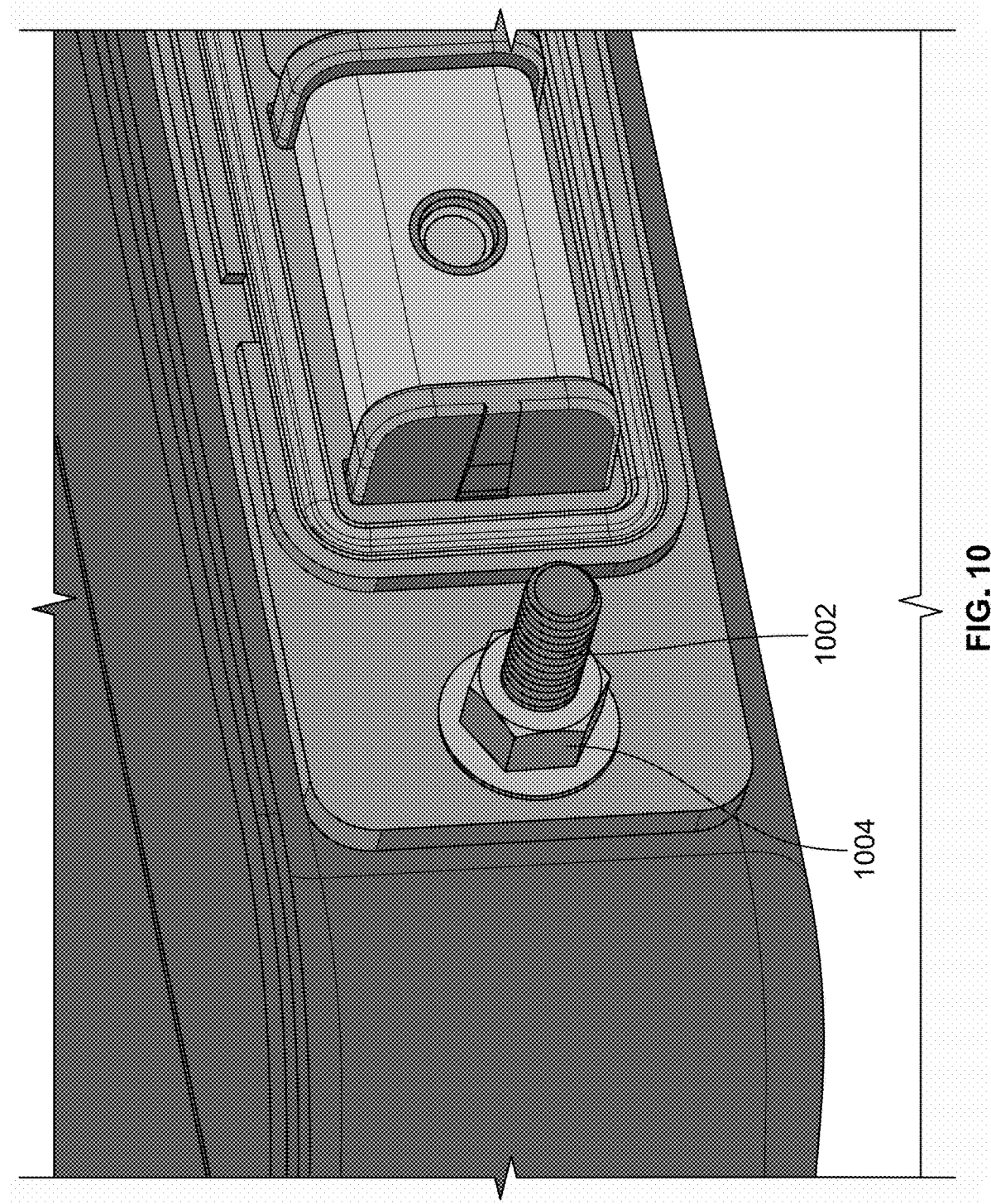
FIG. 10 illustrates an embodiment of a fastener bolt connecting a connector plate and a sub-module.

In the example of FIG. 2D, compression limiters 214-220 are shown. In the example of FIG. 9, a portion of plate 200 is shown. In some embodiments, a compression limiter is insert molded into the opening in the plate at 902 (and similarly at 904 in this example). In some embodiments, the compression limiter is configured to provide a level of interference. In some embodiments, as shown in the example of FIG. 10, when fastening bolt 1002 is put into place, the compression limiter provides a known set separation distance between the bottom face of the nut 1004 and the front face of the plate 200 (the face of the plate that faces away from the enclosure) so that the plastic of the plate is not simply squeezed. In some embodiments, the limiter provides a hard stop. In this way, the torque that is applied is transmitted to a fastened feature. In some embodiments, bolt 1002 is integrated into the module 100 through one or more fastening processes including, but not limited to, resistance welding, clinching, stir-welding, or tack welding.

In some embodiments, the compression limiter is press fit rather than insert-molded. This reduces the number of components included during the molding process. While in some embodiments the compression limiter is press fit rather than insert-molded, a seal may still be provided. The following are further examples and embodiments of providing a seal and reducing leakage.

Figure 11A:
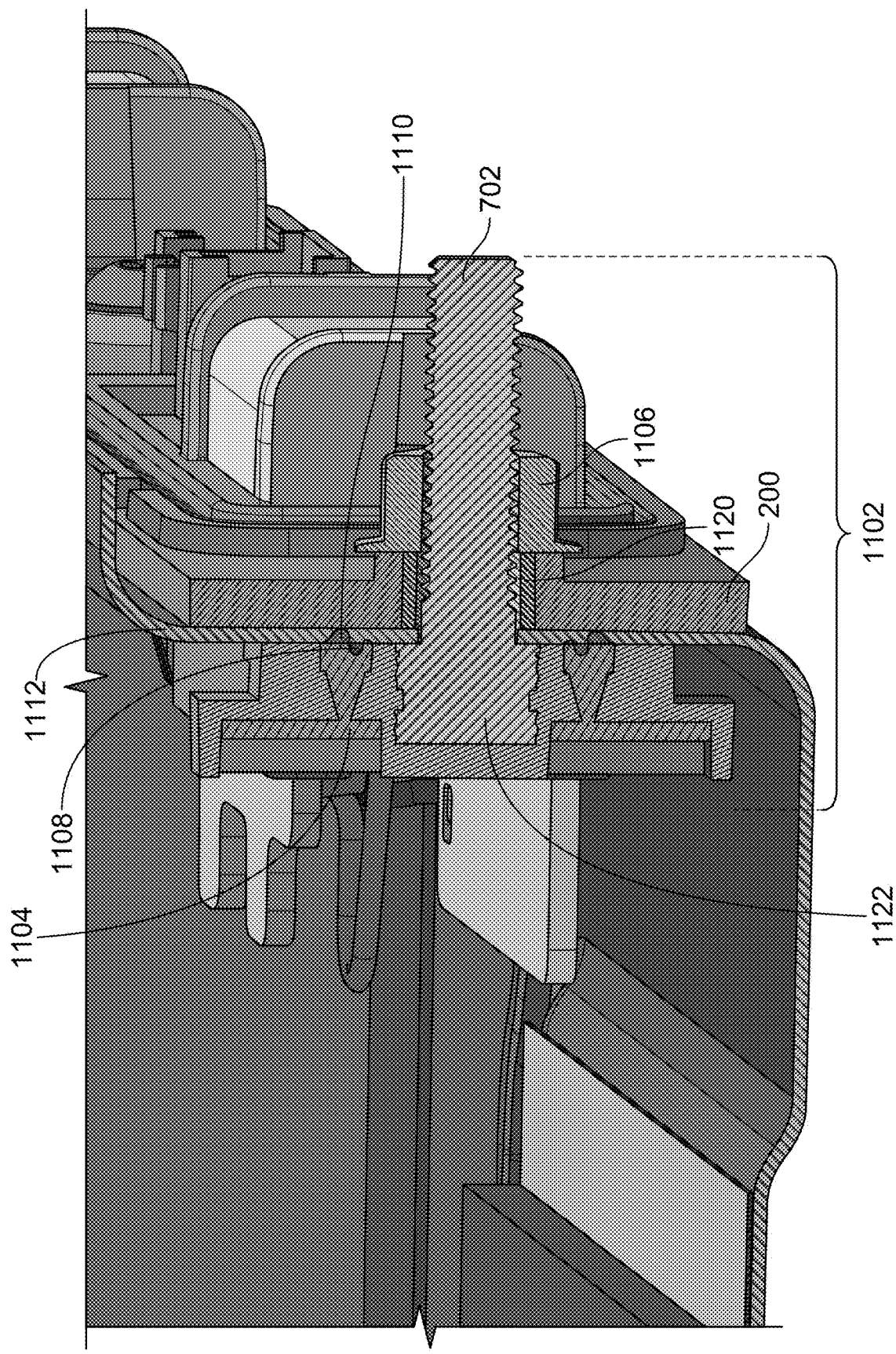
FIG. 11A illustrates an embodiment of a portion of a sub-module. component.
Figure 11B:
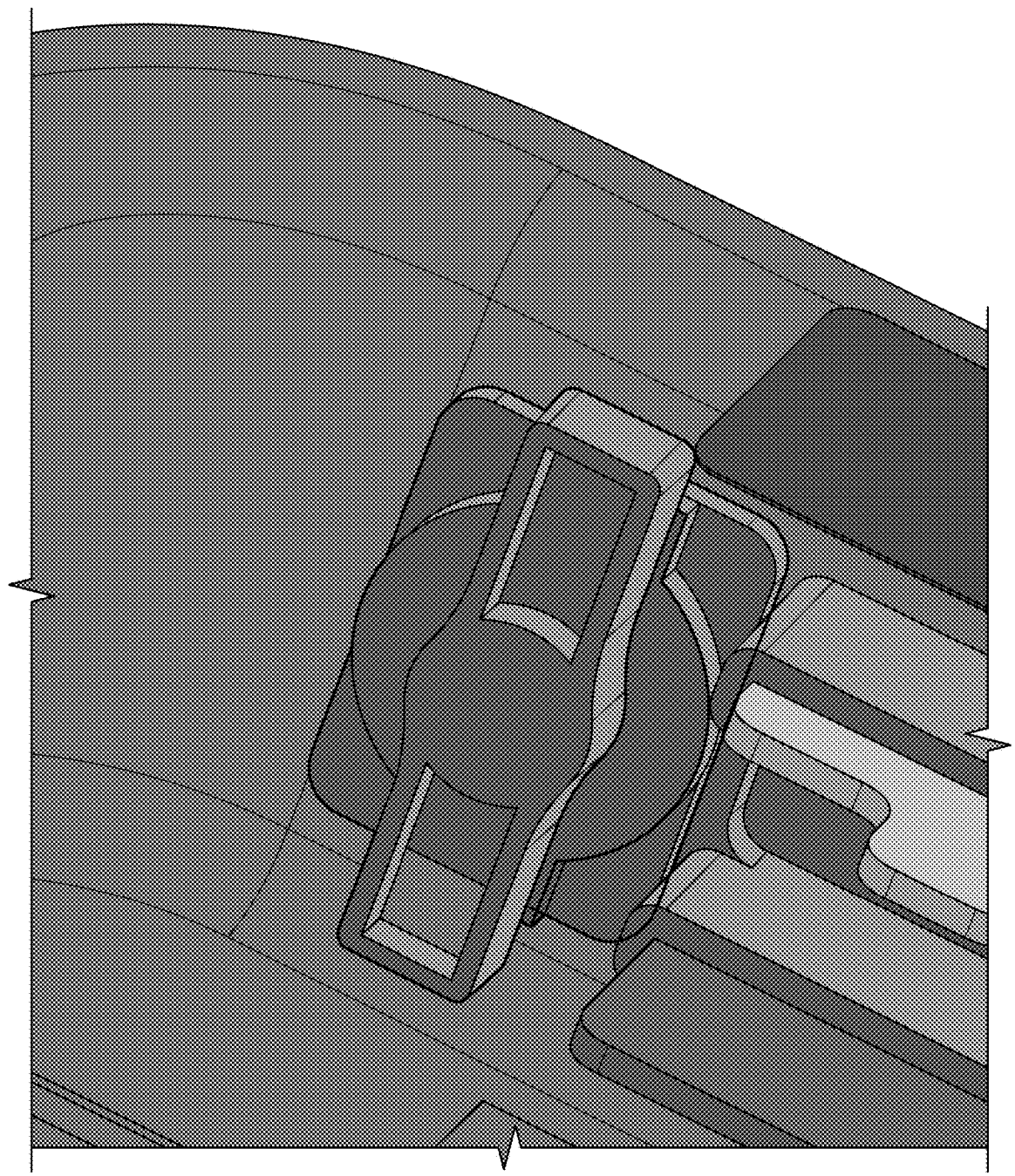
FIG. 11B illustrates an embodiment of a view of an overmolded back

FIG. 11A illustrates an embodiment of a portion of a sub-module. In this example, a cross section of a side view of a front face/terminal-side of a sub-module is shown. Connector plate 200 is shown in this example. In this example, prevention of leakage at the flange bolt 702 is shown. In some embodiments, there is a second bolt on the opposite side of the sub-module (not shown). A cross-section view of the interface for the seal is shown. A back component 1102 including the bolt is shown in this example. In some embodiments, the overmolded component is an M5 stud (e.g., stud/bolt 702) that includes its own gasket overmold 1104. In some embodiments, the gasket overmold uses the same geometry as the gasket overmold 210 of the connector plate 200. FIG. 11B illustrates an embodiment of a view of an overmolded back component. In some embodiments, when assembled (where the connector plate is fastened to the surface of the enclosure's face) in the orientation shown in FIG. 11A, there is interference 1110 between the back component 1102 with the bolt and the surface of the metal enclosure. In some embodiments, there is deformation of the interference portion into a cavity space (e.g., cavity 1108). In some embodiments, the deformation is structured and biased in terms of its orientation such that any pressure observed from within the enclosure attempting to leak out improves the pressure seal. In some embodiments, the deformation is structured and biased in terms of its orientation such that any exterior pressure observed from the environment attempting to leak into the enclosure improves the pressure seal.

Figure 11C:
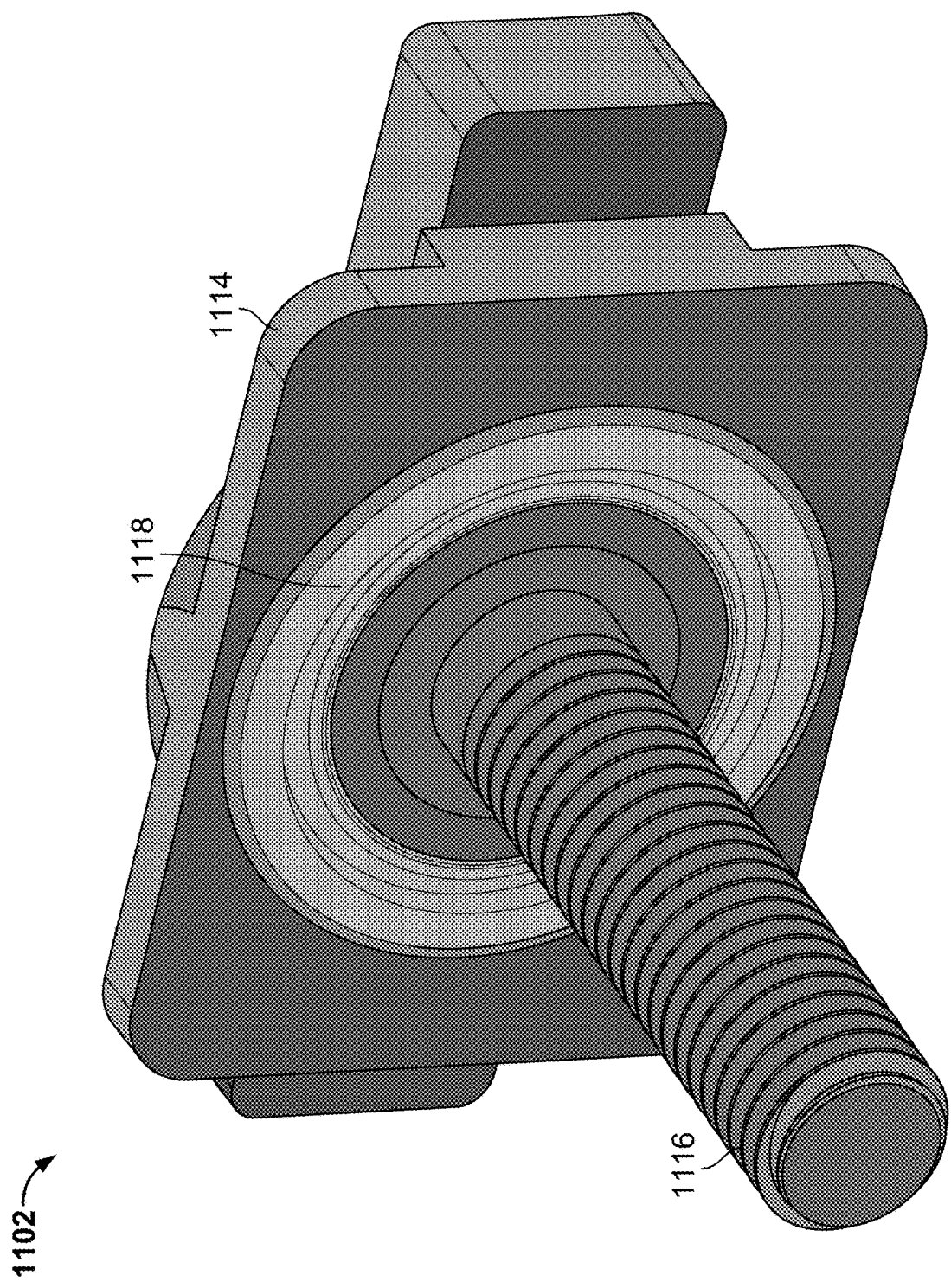
FIG. 11C illustrates an embodiment of a sealing fastener with a bolt.

FIG. 11C illustrates an embodiment of a sealing fastener with a bolt. In this example, a view of back component 1102 with a bolt is shown. As described above, in some embodiments, the component 1102 is overmolded and integrates a bolt. As one example of manufacturing component 1102, plastic 1114 is insert molded around bolt 1116, where a gasket 1118 is then subsequently overmolded. In some embodiments, when fastening the connector plate to the enclosure (e.g., via the holes shown in FIG. 3), component 1102 is then biased against the inside wall of the sub-module enclosure by screwing the nut onto the bolt. In some embodiments, the component 1102 is positively positioned based off of its geometry.

In some embodiments, screwing the nut onto a bolt from one side of the enclosure as shown in FIG. 11A squeezes the connector plate 200 onto the enclosure (face surface 1112 as shown in FIG. 11A).

In the example of FIG. 11A, a cutaway view of a compression limiter is shown at 1120. In various embodiments, the compression limiter serves multiple purposes. As one example, the compression limiter prevents the connector plate (which for example is constructed of plastic) from being squeezed. In some embodiments, the use of the compression limiter facilitates achieving an ideal tension on the bolt to maximize the fastening clamp of the sealing geometry, as well as prevent the bolt from unscrewing due to, for example, vibrations, an earthquake, etc. If there were only the plastic (without the compression limiter), while the correct torque may be reached when the bolt is tightened down, not all of the pressure may be being transferred into the bolt itself. Rather, the pressure would be transferred into compressing the plastic. As the plastic relaxes, the plate would lose that tension. Here, as shown in the example of FIG. 11A, the compression limiter lines up and overhangs the lip of the stud, so that when the stud is bolted down, the bolt head is effectively clamped onto the nut, providing a tight clamp and tension on this portion of the bolt for long term efficacy. In this example, the force is transmitted from the nut to the compression limiter 1120 to the wall of the enclosure (1112) to the head of the bolt, which in some embodiments are all metal parts. This accounts for any relaxation that may occur in the plastic of the connector plate 200. As shown in the example of FIG. 11A, the nut 1106 pressing against the compression limiter provides the needed compression of the gasket to create a seal around that opening.

As shown in this example, the bolts hold the connector plate on a sub-module level. In various embodiments, the bolt (or for example the remaining part of the bolt that sticks out or protrudes from the connector plate) may be used for various other purposes as well. For example, the bolts may provide posts by which to mechanically fasten submodules to each other (e.g., to a frame or rack for stacking submodules).

As shown in this example, the bolts provide compression against the interior surface of the submodule can/enclosure. As shown in the example of FIG. 3, the can/enclosure of the sub module includes cutout holes 308-314 for the fasteners, as well as passthroughs for the electrical signal (e.g., pass through 306) and for power (e.g., 302 and 304). In some embodiments, using the bolt/stud with back component as shown in the example of FIGS. 11A and 11B, a large surface area is provided that ensures the bolt is perpendicular to the enclosure wall. In other embodiments, weld studs, clinch studs, or rivet studs are used. In some embodiments, the head diameter of the stud is optimized to reduce issues in maintaining plainarity or perpendicularity of the bolt to the surface of the enclosure. In some embodiments, the fastener head geometry is biased out of perpendicularity to the fastener axis to control fastener orientation during assembly.

In some embodiments, and as shown in the example of FIG. 3, the plate has four fastening points to fasten to the corresponding holes in the bulkhead passthrough at the face of the submodule and seal that face of the submodule. Other numbers of fastening points may be implemented. An example of fastening at the outer fastening points (e.g., points 308 and 314 of FIG. 3) is shown in the example of FIGS. 11A and 11B. A similar type of fastening is performed at the inner two fastening points (e.g., points 312 and 310 of FIG. 3). Further examples of inner fastening points are shown at 1202 and 1204 in the example of FIG. 12A. The fasteners at 1202 and 1204 provide additional force for fastening or clamping the connector plate 200 to the face of the sub-module enclosure. As shown in the example of FIG. 12A, the power (passed via power connectors 202 and 204) is separated from the signal (via the pins of port 206) with additional fastening features (1202 and 1204) sandwiched in between them, which facilitates maintaining seal efficacy over the long term.

Figure 12A:
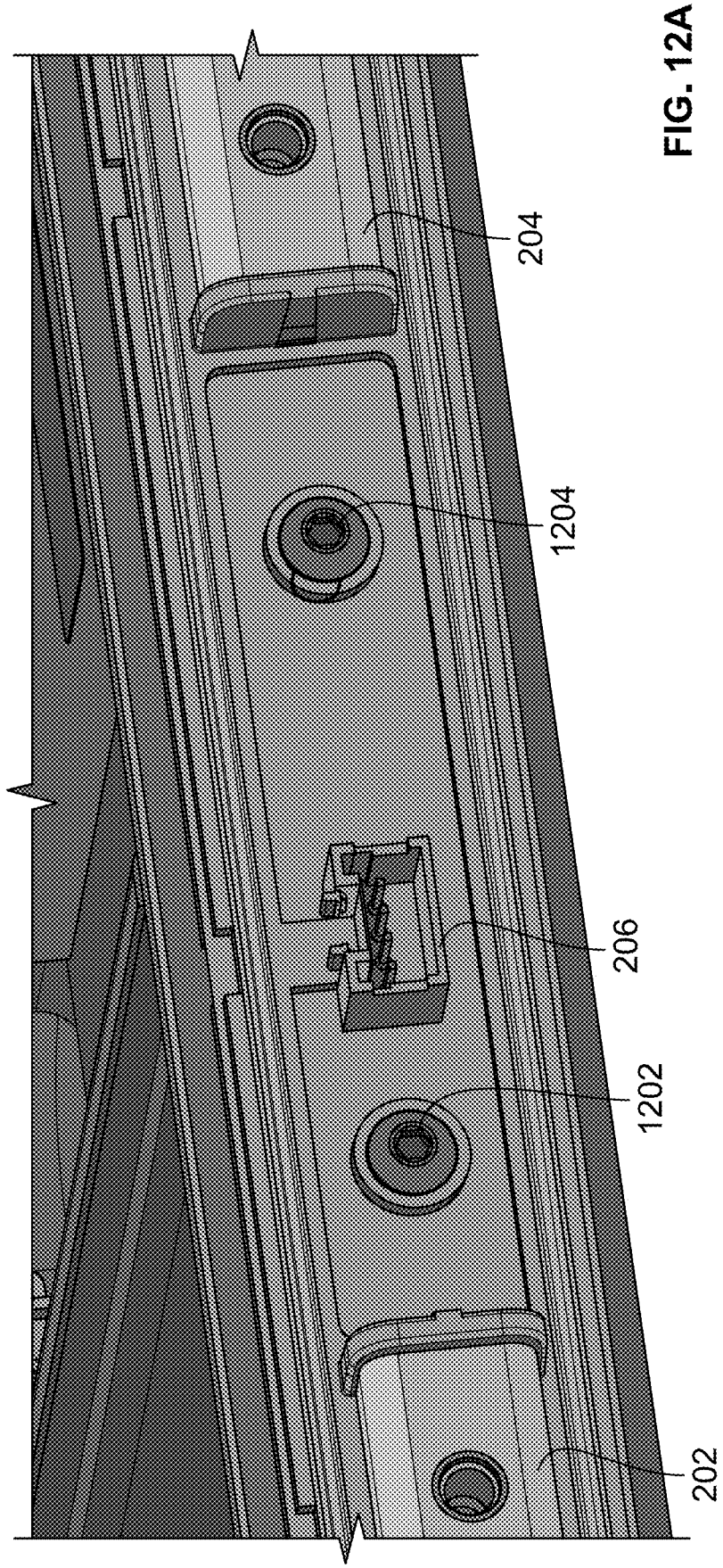
FIG. 12A illustrates an embodiment of fastening points.
Figure 12B:
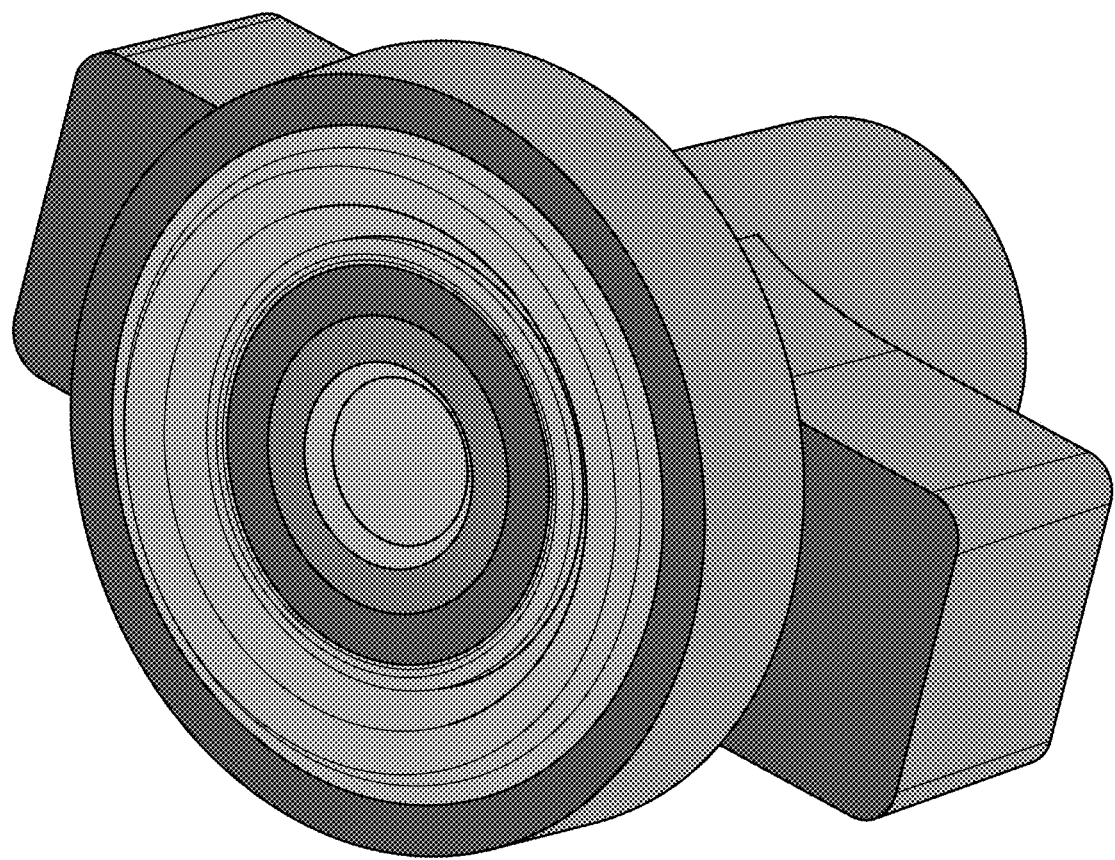
FIG. 12B-12C illustrate an embodiment of a blind nut component.
Figure 12C:
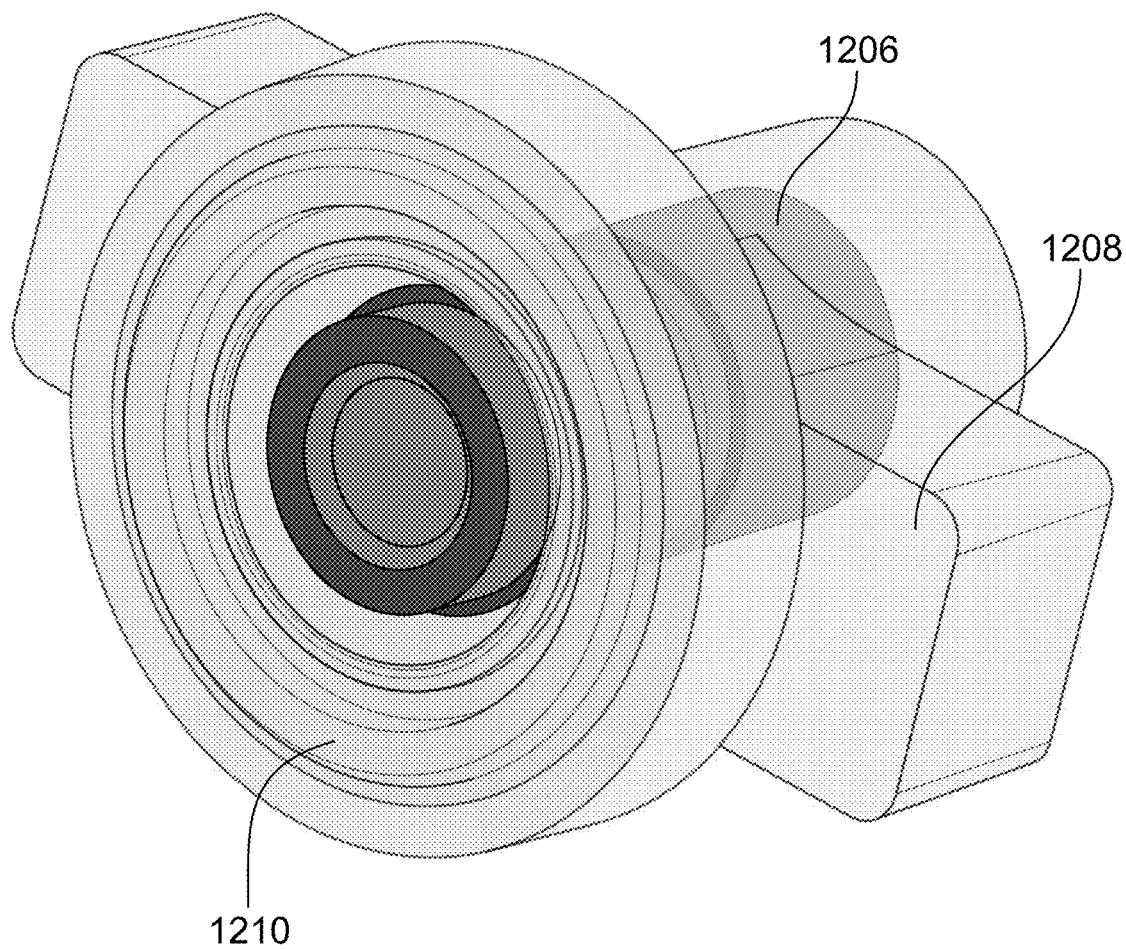
Figure 12D:
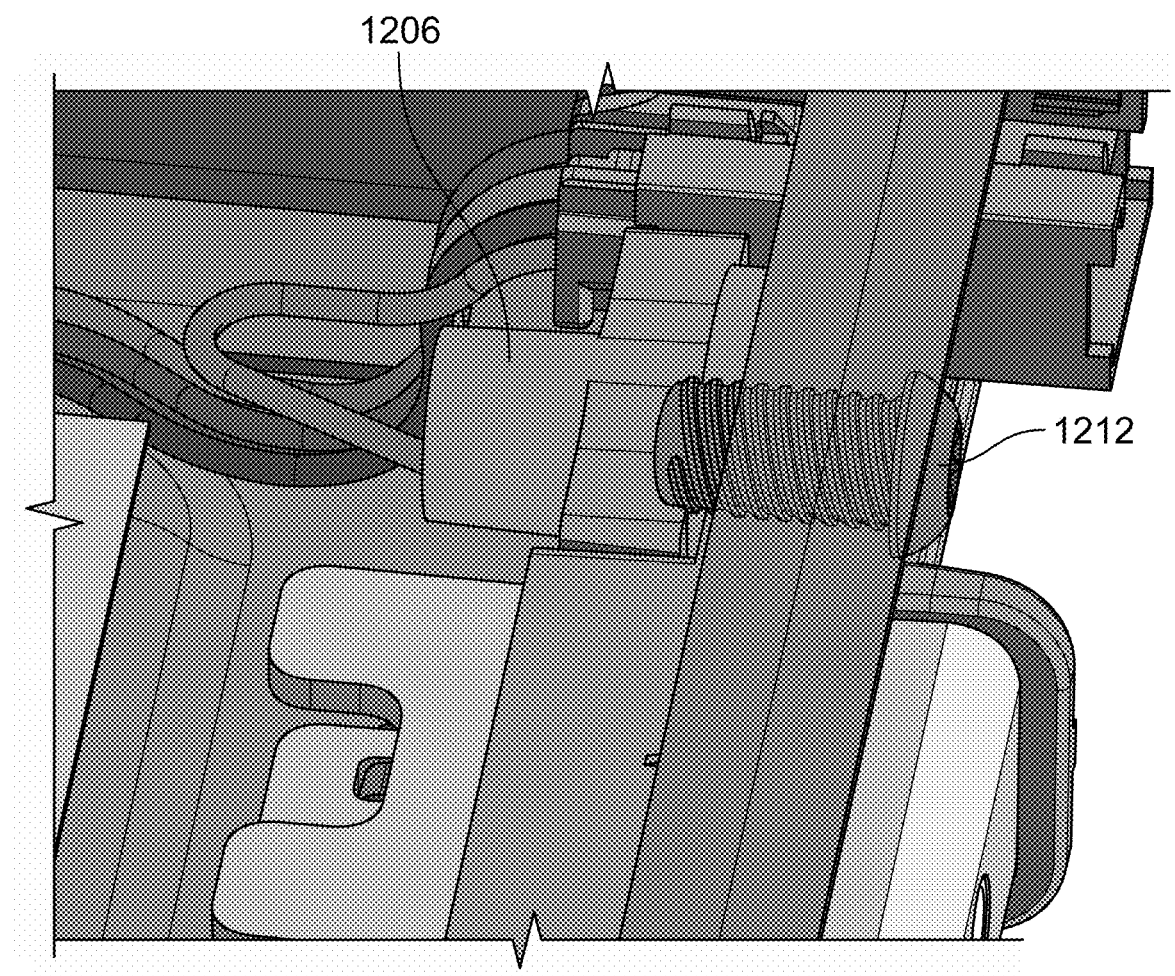
FIG. 12D-12E illustrate an embodiment of a fastening feature.
Figure 12E:
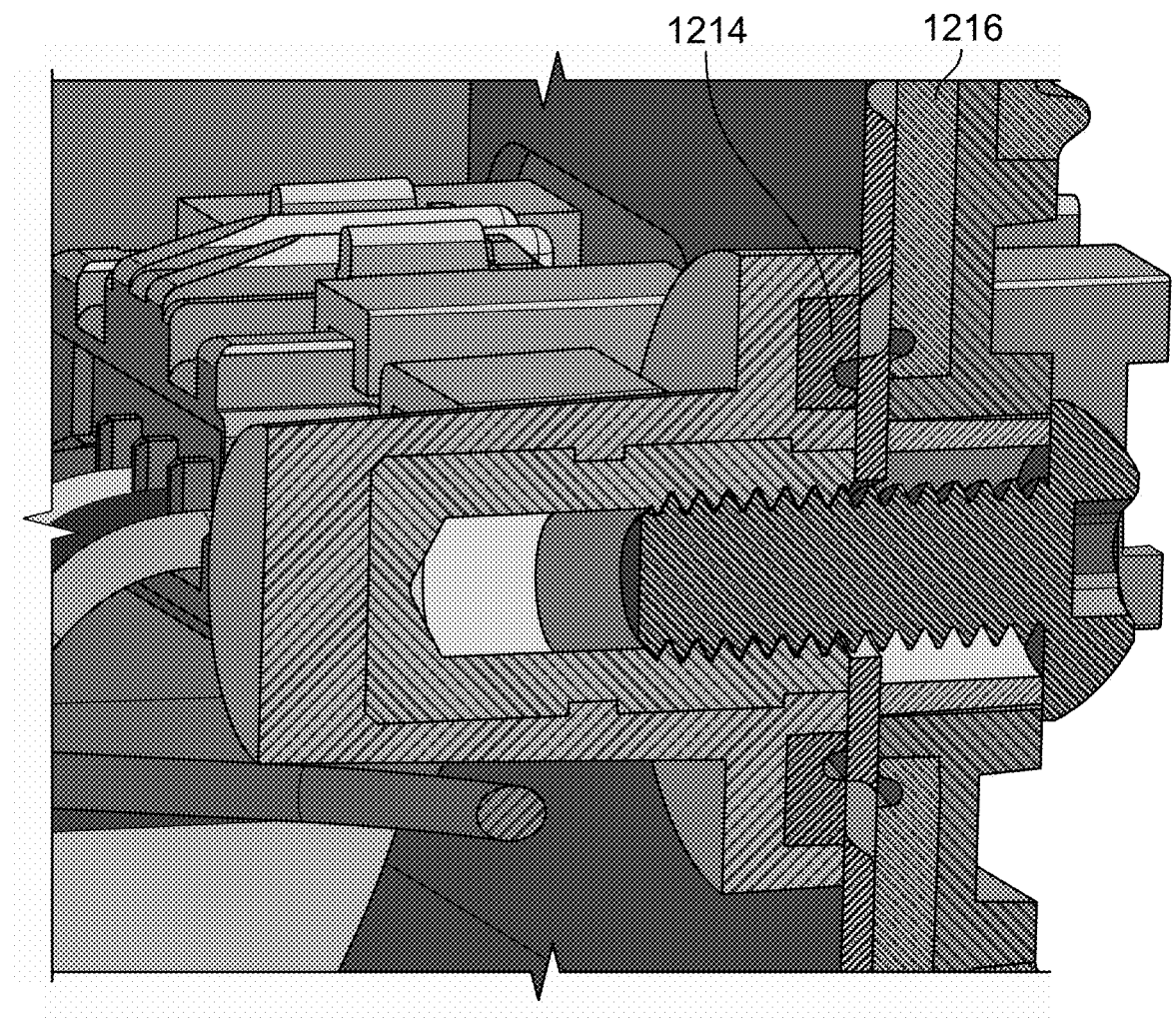

As shown in the example of FIG. 12A, a bolt or screw that goes internally into the enclosure is used, along with a blind nut. In some embodiments, the blind nut is insert-molded then overmolded with a gasket. An embodiment of the blind nut component attached to the interior surface of the enclosure is shown in FIG. 12B. An example of a blind nut is shown at 1206 of FIG. 12C. In some embodiments, blind nut 1206 is placed into a tool, and after it is placed in the tool, it is insert molded within an outer part 1208, where finally it is overmolded with a gasket 1210. FIG. 12D illustrates an embodiment of a fastening feature. As shown in this example, hex bolt 1212 is screwed into the insert-molded blind nut 1206. A cross section of the fastening is shown in FIG. 12E. An example gasket geometry of a nut is shown at 1214. In some embodiments, the fastening shown in the example of FIG. 12E creates a seal around the hole from the interior of the enclosure, preventing leakage out the enclosure. In some embodiments, the gasket on the blind nut component 1216 prevents a fluid flow path from the exterior of the submodule into the submodule.

In some embodiments, seal 1216 is on one face of the connector plate, referred to herein as a "backside" of the connector plate, where the associated face touches the surface of the enclosure when fastened, and this face prevents a fluid flow path into the enclosure. For example, FIG. 13 illustrates an embodiment of a view of a connector plate. In this example, the "backside" of connector plate 200 is shown along with seal 1216. In some embodiments, the gasket 1216 prevents leaks coming in from the outer face of the connector plate, past the compression limiter and the screw and along the face of the plate, through the power connector, and into the enclosure. Here, in this example, the gasket in the center region provides improved seal uniformly on this face. In some embodiments, reinforcements or additional metal components may be added to the connector plate for structural rigidity and to prevent material creepage over time.

Multi-stage Molding of Connector Plate

The electromechanical connector 206 (along with pins 208) may be fairly intricate and complex to form along with the rest of the plate at the same time, as an entire, single assembly. In some embodiments, to ease the manufacturing process, the connector plate/module cap is generated in multiple phases or stages, in which the electromechanical connector is first produced (e.g., with the auxiliary pins), and then placed along the rest of the components of the plate (e.g., sheet metal for inserts for electrical bus connection) and molded together (where, for example, the resin is molded, along with other components, such as compression limiters and power terminals, over the electromechanical connector molded in a previous phase of the manufacturing process). Typically, fabricating components in multiple phases may result in additional issues with leakage paths and structural integrity, as there may be gaps where sub-components meet. This would result in issues with sealing. As will be described in further detail below, the design of the geometry of the electromechanical connector is designed in such a way that upon completion of the multi-stage molding process, the overall plate will have the sealing characteristics of a plate that had been molded in a single piece.

FIGS. 14A-14D illustrates an embodiment of a plate with electromechanical connector. An alternative geometry of a plate such as that shown in FIG. 2 is shown in this example. As shown in this example, the plate includes components similar to that as shown in FIG. 2, such as including multiple power terminals (e.g., power terminal 1402 of FIG. 14A), gasket (e.g., gasket 1404 of FIG. 14D), etc. In some embodiments, the gasket is molded.

In various embodiments, the plate is made out of a variety of materials. For example, thermo-set or reaction set polymers may be used. Thermoplastics may also be used in some embodiments. As one example, a thermos-set or reaction injection molded polymer such as LSR (Liquid Silicone Rubber) is used. In some embodiments, the polymer used is cross-linked or vulcanized. Other types of polymers may be used as appropriate. Ceramics such as graphite may also be used as a gasket material.

FIGS. 15A-15E illustrate views of an embodiment of an electromechanical connector. As shown in these examples, the electromechanical connector (1502) includes various details and features. As described above, in some embodiments, the electromechanical connector is created first, and then molded along with other components (e.g., pins, power terminals, compression limiters, etc.) to form the plate or end cap.

As the plate is generated in multiple stages, the electromechanical connector is designed in a manner such that when it is molded over by the polymer for the plate, a mechanical interlock is formed, along with generation of a fluid seal.

For example, in order to encourage the formation of such a mechanical interlock, the electromechanical connector is designed with a flange (1504). In some embodiments, in order to encourage a seal, the flange is further tapered.

Figure 15A:
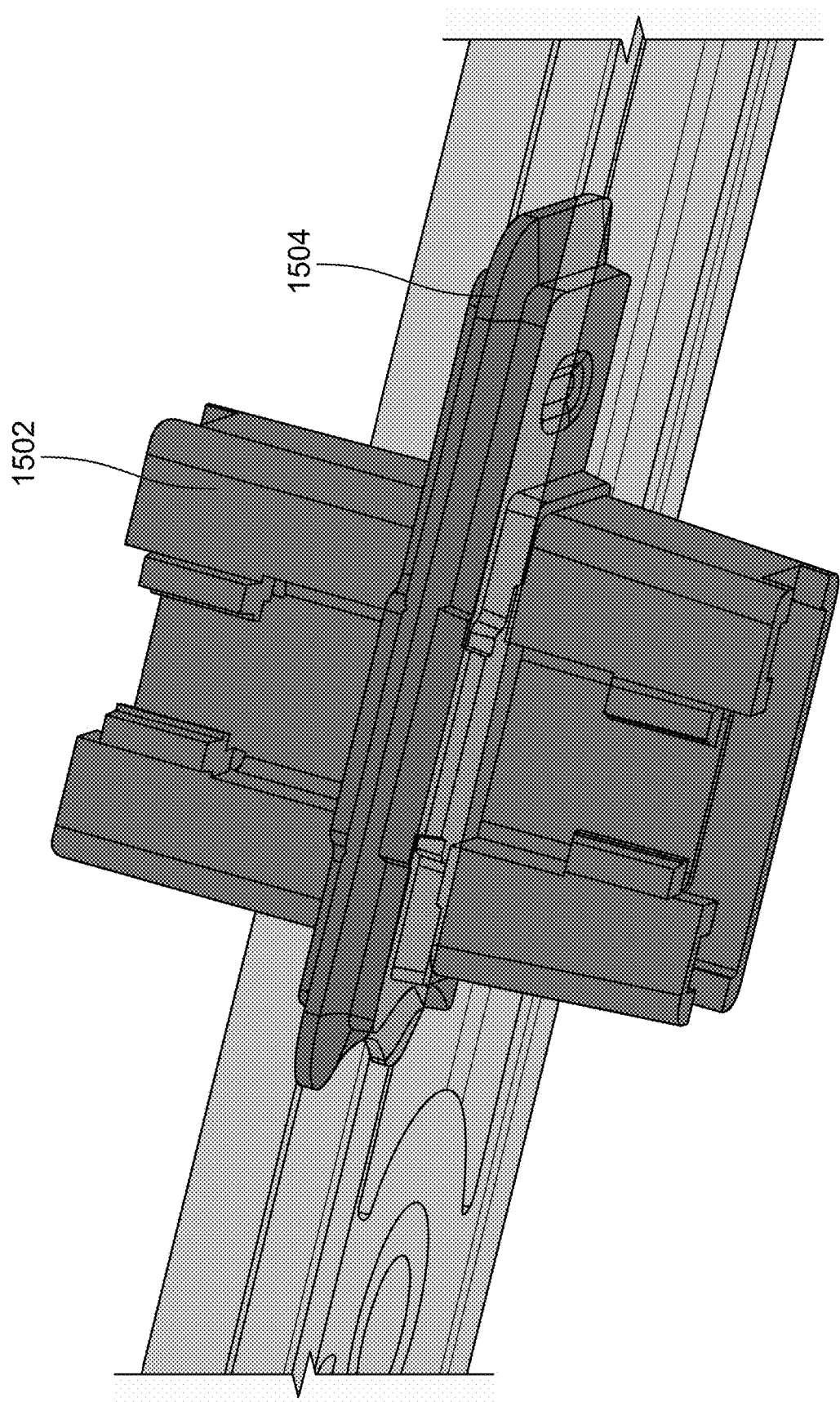
FIGS. 15A-15E illustrate views of an embodiment of an electromechanical connector.
Figure 15B:
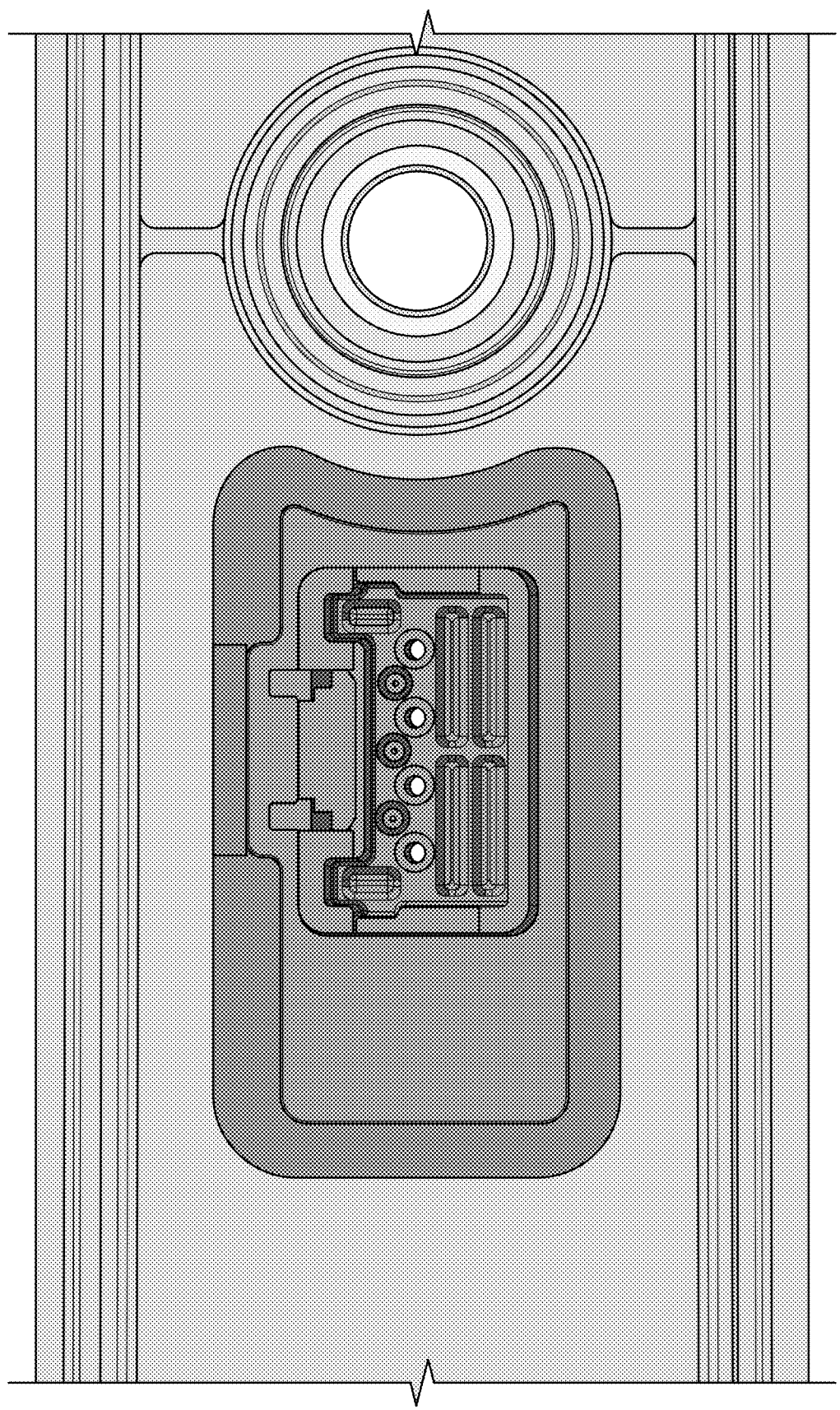
Figure 15C:
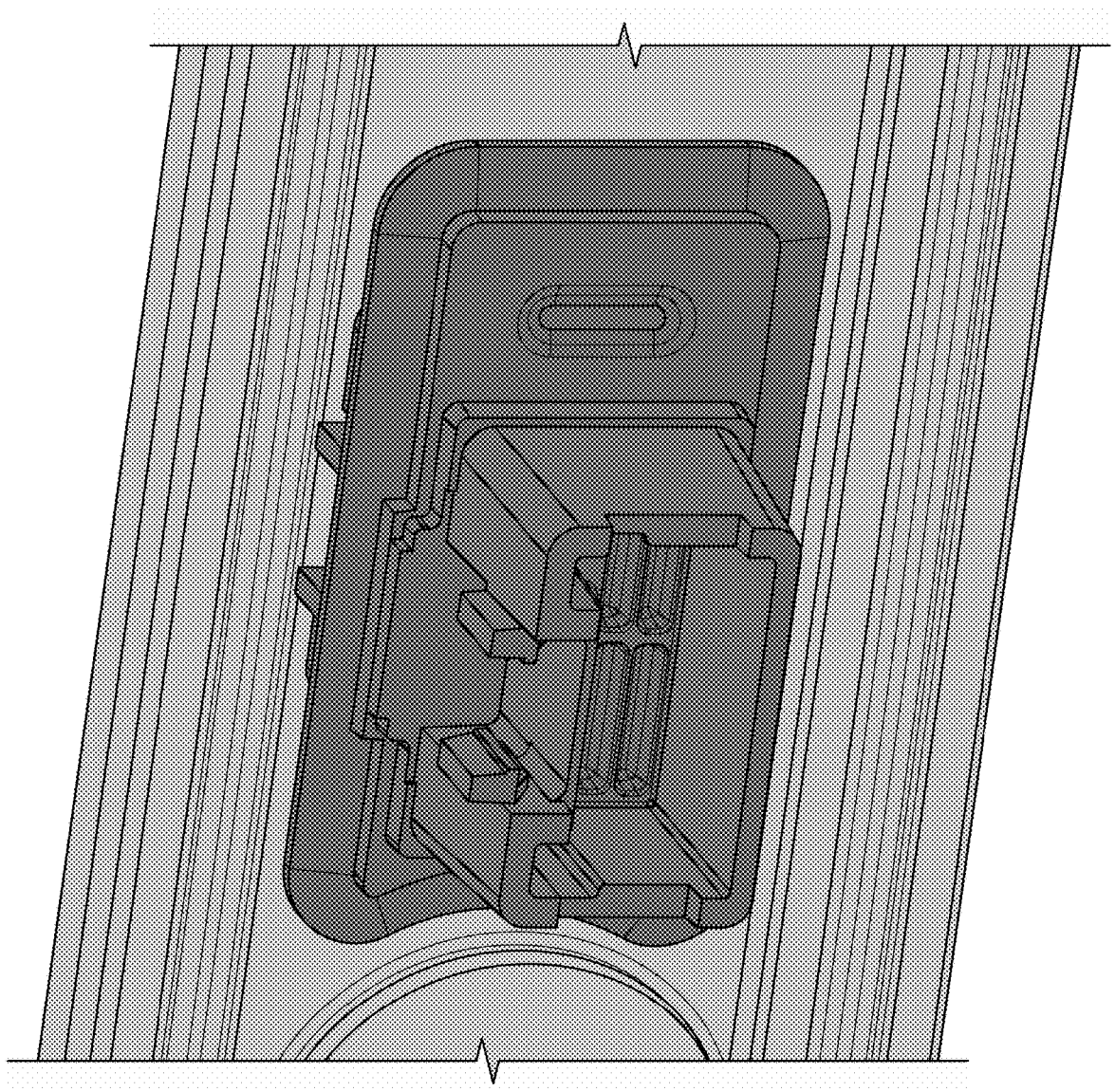
Figure 15D:
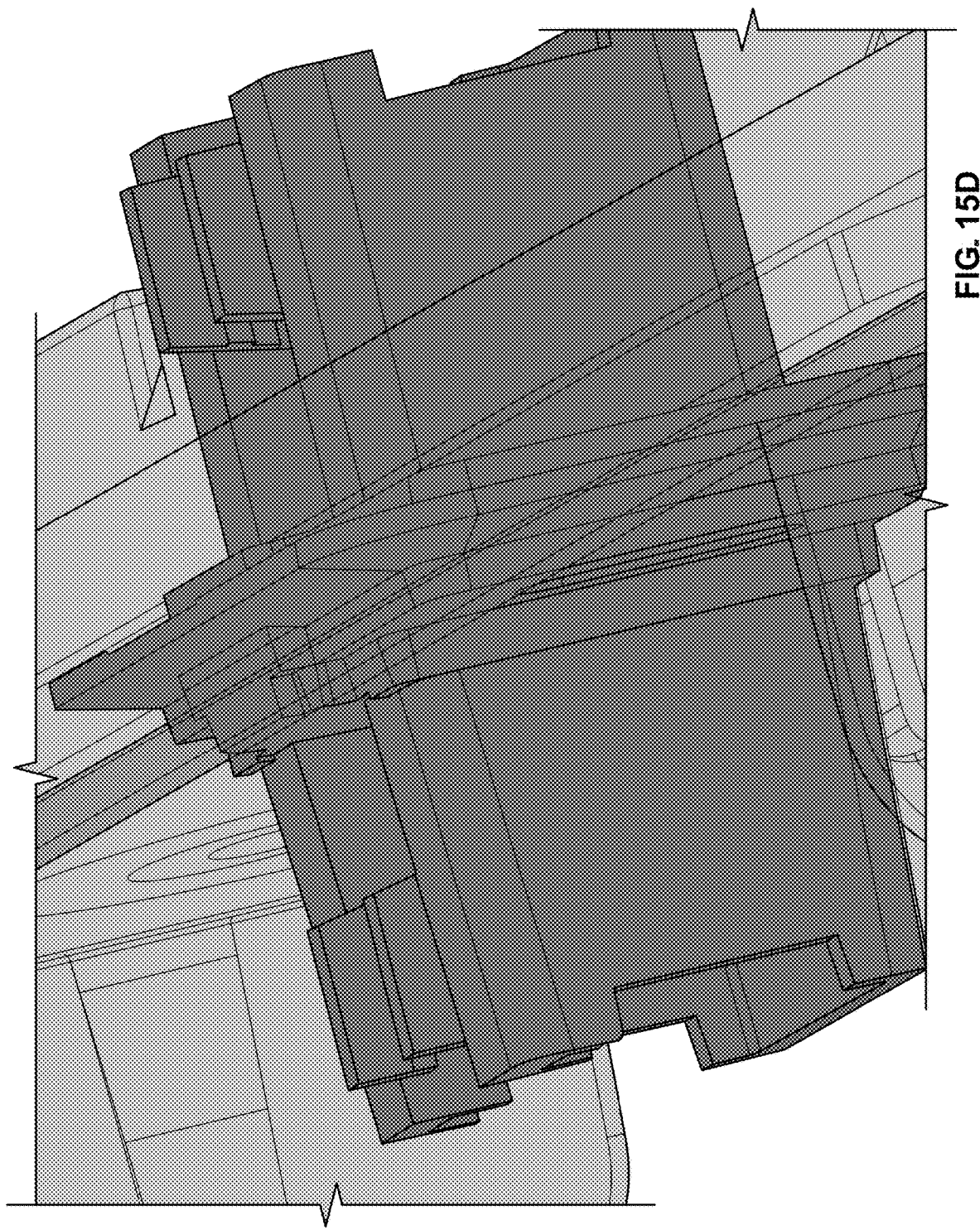
Figure 15E:
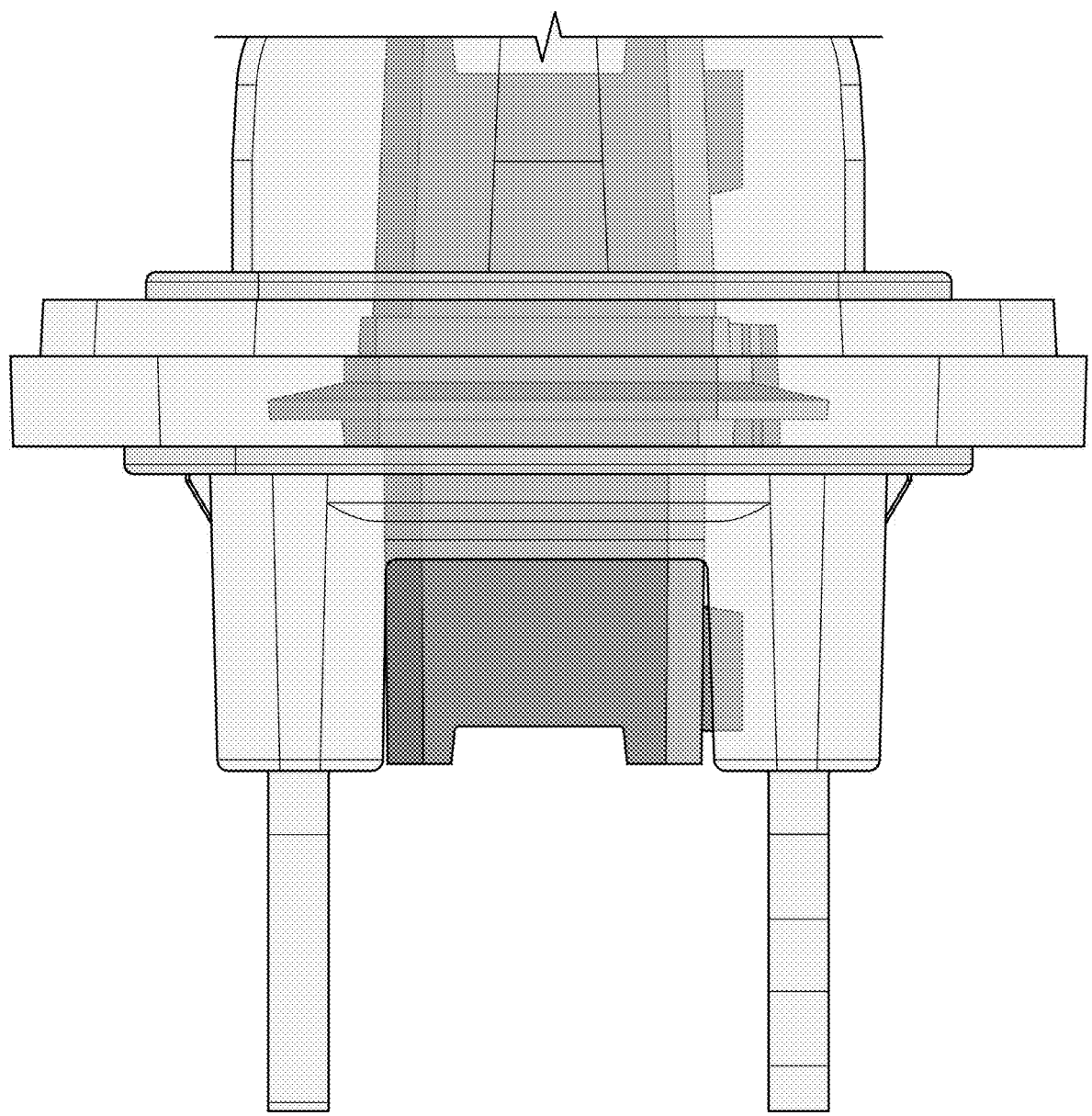

In the example of FIG. 15E, the flange tapers downward. The tapering of the flange allows for the edges to effectively melt during the subsequent stage of the molding process with the resin that fully surrounds the electromechanical connector.

When the electromechanical connector is molded, it is designed to be held by the pins and the rest of the geometry on the top and the bottom (e.g., resin that molds over the flange area) so that when the rest of the assembly is created around the electromechanical connector, a seal is formed based off of the tapered edges of the flange portion of the electromechanical connector melting in preferred locations (e.g., along the edges of the taper) and adhering in its full perimeter to the rest of the assembly that is molded around it.

Figure 16A:
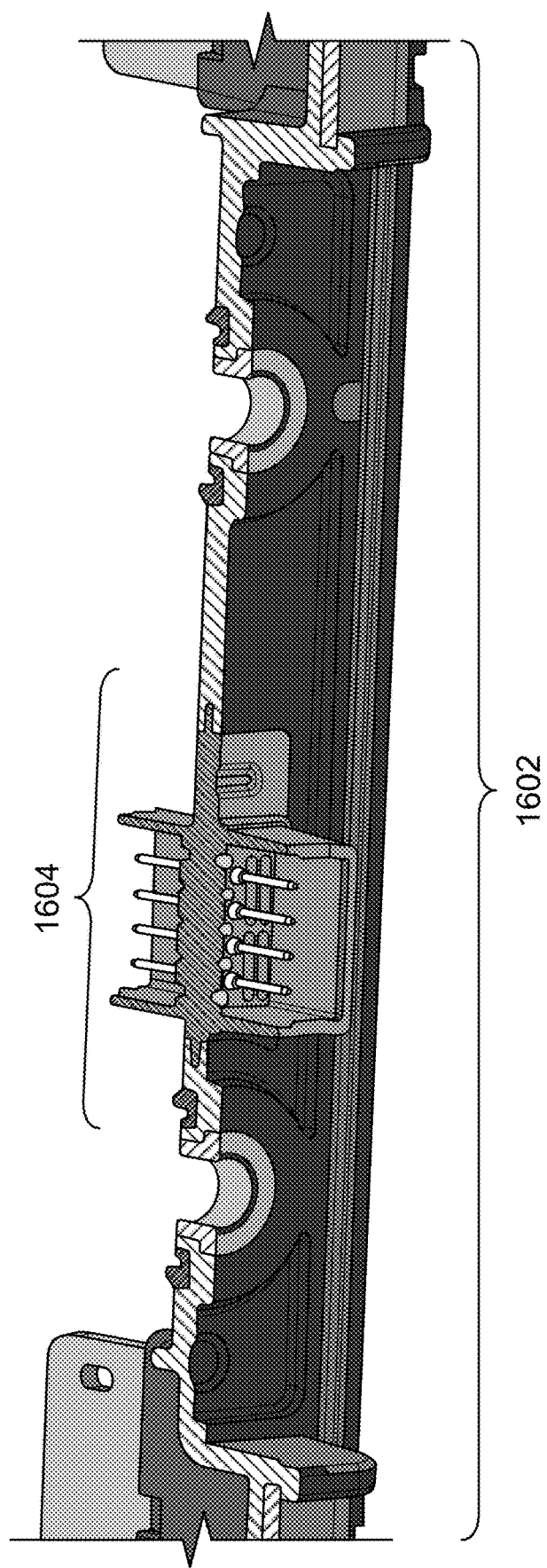
FIG. 16A illustrates an embodiment of a cross-section of a connector plate.
Figure 16B:
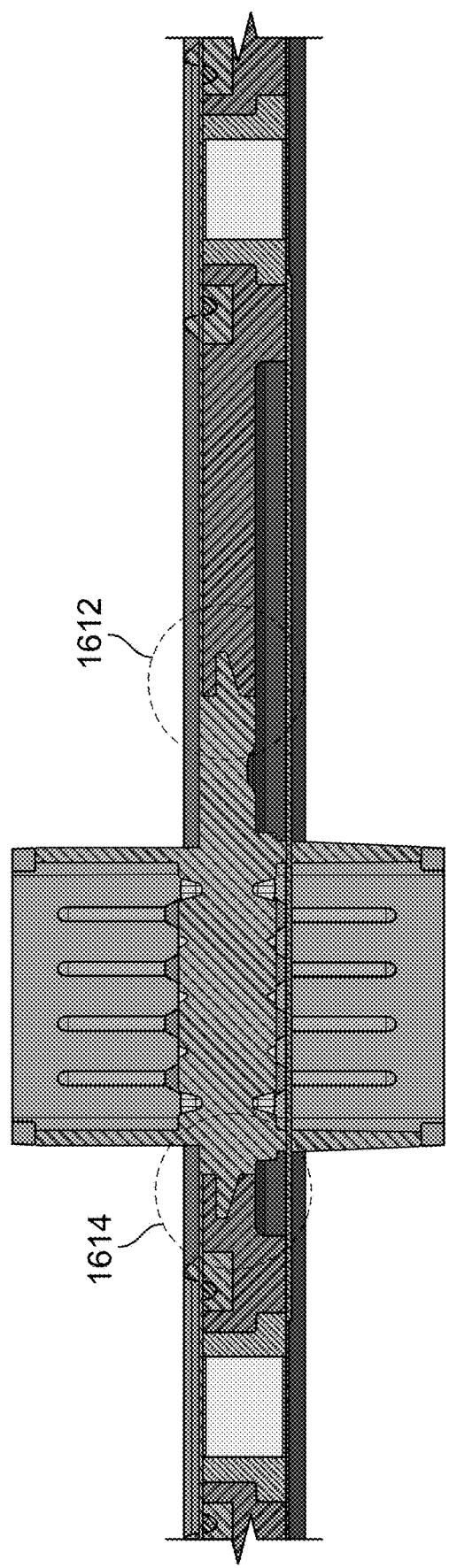
FIG. 16B illustrates a top-down view of a cross section of a connector plate.

FIG. 16A illustrates an embodiment of a cross-section of a connector plate. In this example, a cross-section of electromechanical connector 1604 is shown within the overall connector plate 1602. While for purposes of clarity, the electromechanical connector and remaining assembly are visually distinguished from each other in the example of FIG. 16A, subsequent to the actual molding process, they may be indistinguishable (e.g., after melting). FIG. 16B illustrates a top-down view of the cross section shown in FIG. 16A. As shown in this example, the electromechanical includes a tapered flange, such as that shown at 1612 and 1614, which interface with the resin that is molded over the electromechanical connector. While the boundaries of the flange are visually delineated in this example, when fabricated, the edges of the flange will have melted or fused with the surrounding polymer, in which case the edges of the flange and the surrounding polymer may be indistinguishable from each other. In some embodiments, the mating location between the two polymers may be indistinguishable from an insert or tool parting line.

Figure 16C:
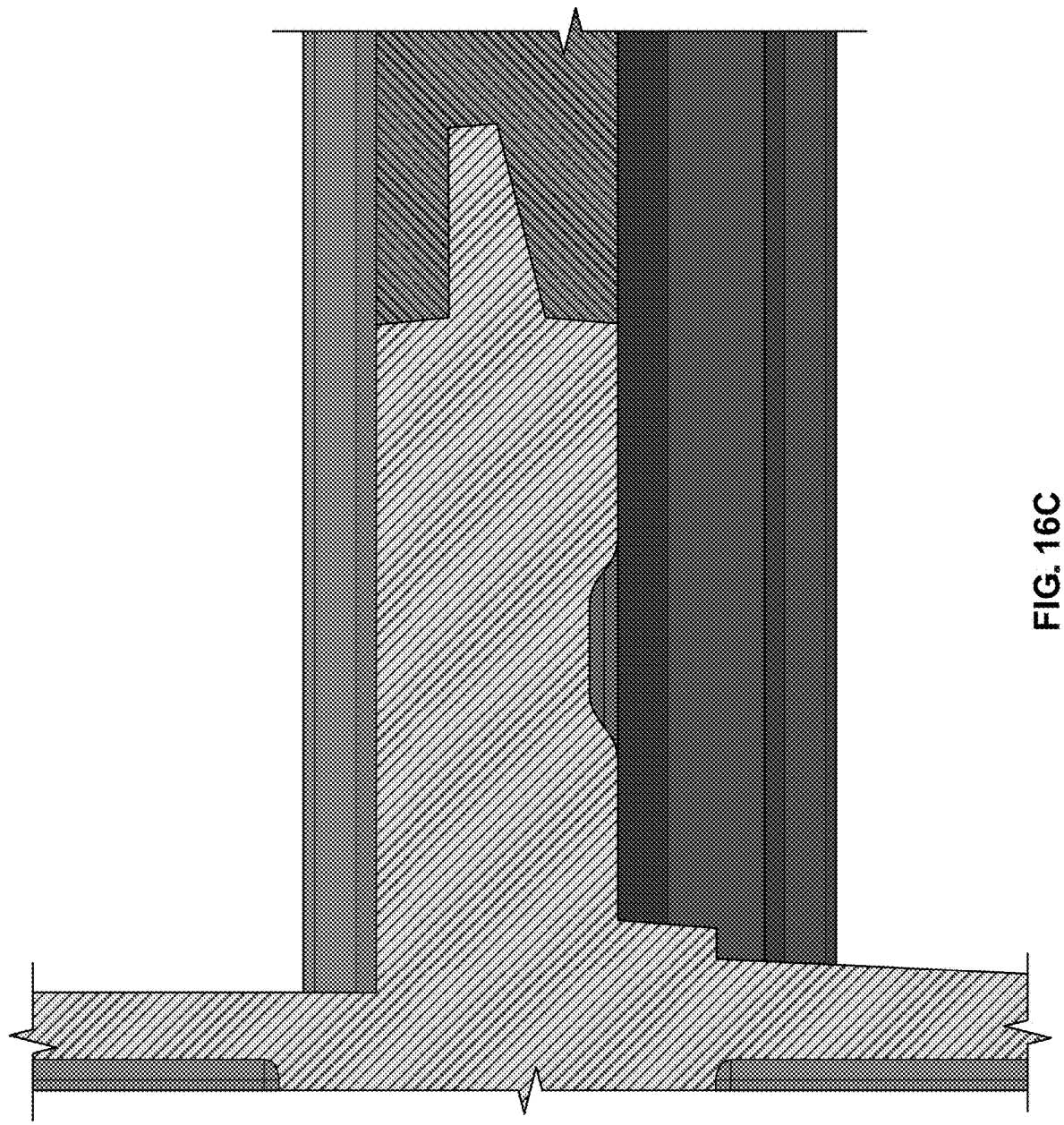
FIG. 16C illustrates an embodiment of a portion of the connector plate.

FIG. 16C illustrates an embodiment of a portion of the connector plate. In this example, FIG. 16C illustrates the interface between the electromechanical connector and surrounding resin (applied at a subsequent stage around the electromechanical connector) shown at 1612 of FIG. 16B. While the flanged geometry provides a physical interlock with the resin that is molded over it, as shown in this example, in order to avoid cracks or gaps (which would be potential leakage paths) between the electromechanical connector and resin molded over the electromechanical connector, the flange is tapered such that it melts or fuses with the resin during the molding process, such that there are no unwelded faces where plastics meet, and it is indistinguishable between the tapered edge of the flange and the surrounding resin subsequent to the molding process. Rather, a single piece of polymer is formed.

In some embodiments, the electromechanical connector is formed first using an insert molding process, where the polymer for the connector is molded over metal components such as the pins. At a next stage, to form an intermediate connector plate, the additional polymer is molded, in a hybrid insert/overmolded process, over the molded electromechanical connector, along with other mechanical connectors, such as the power terminals and compression limiters (where in this example the plastic over the plate is molded over a combination of another molded component and also metal components). In some embodiments, the gasket is then overmolded onto the connector plate (that includes the electromechanical connector) to form a final connector plate.

As described above, during this phase, in which the plastic of the plate is molded over the molded electromechanical connector (molded in a previous phase), the tapered edges of the molded electromechanical connector melt and fuse with the plastic that is being molded over it. By facilitating this full perimeter weld via melting, this allows, along with the gasket, maintaining of a seal for the entire overall connector plate. In this way, an isolation is created for a battery module from the internal environment of the module and the external environment that is outside of the module.

The following is an embodiment of a process for manufacturing a module connector plate.

Figure 17A:
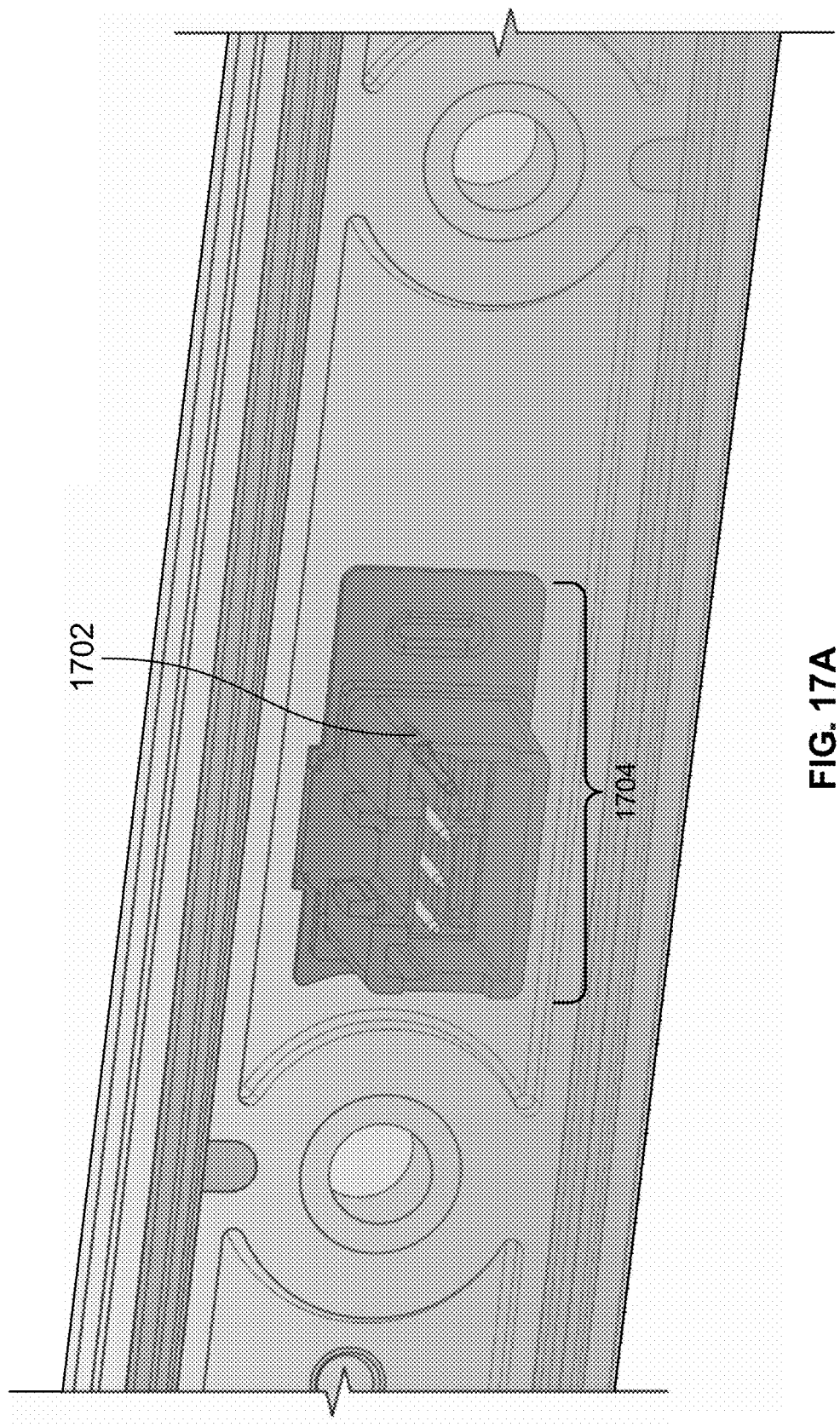
FIGS. 17A-17C illustrate an embodiment of a process for molding an electromechanical connector.
Figure 17B:
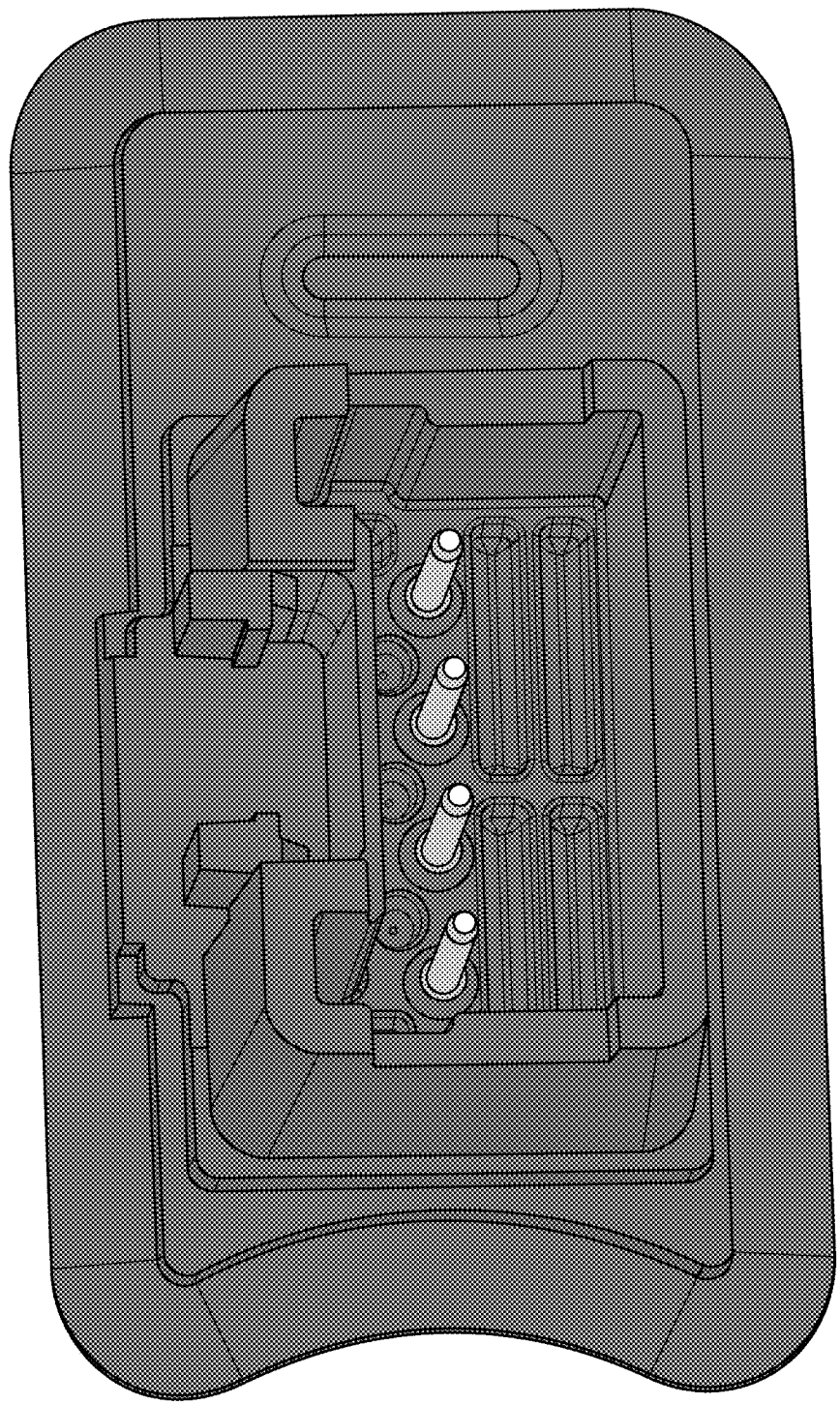
Figure 17C:
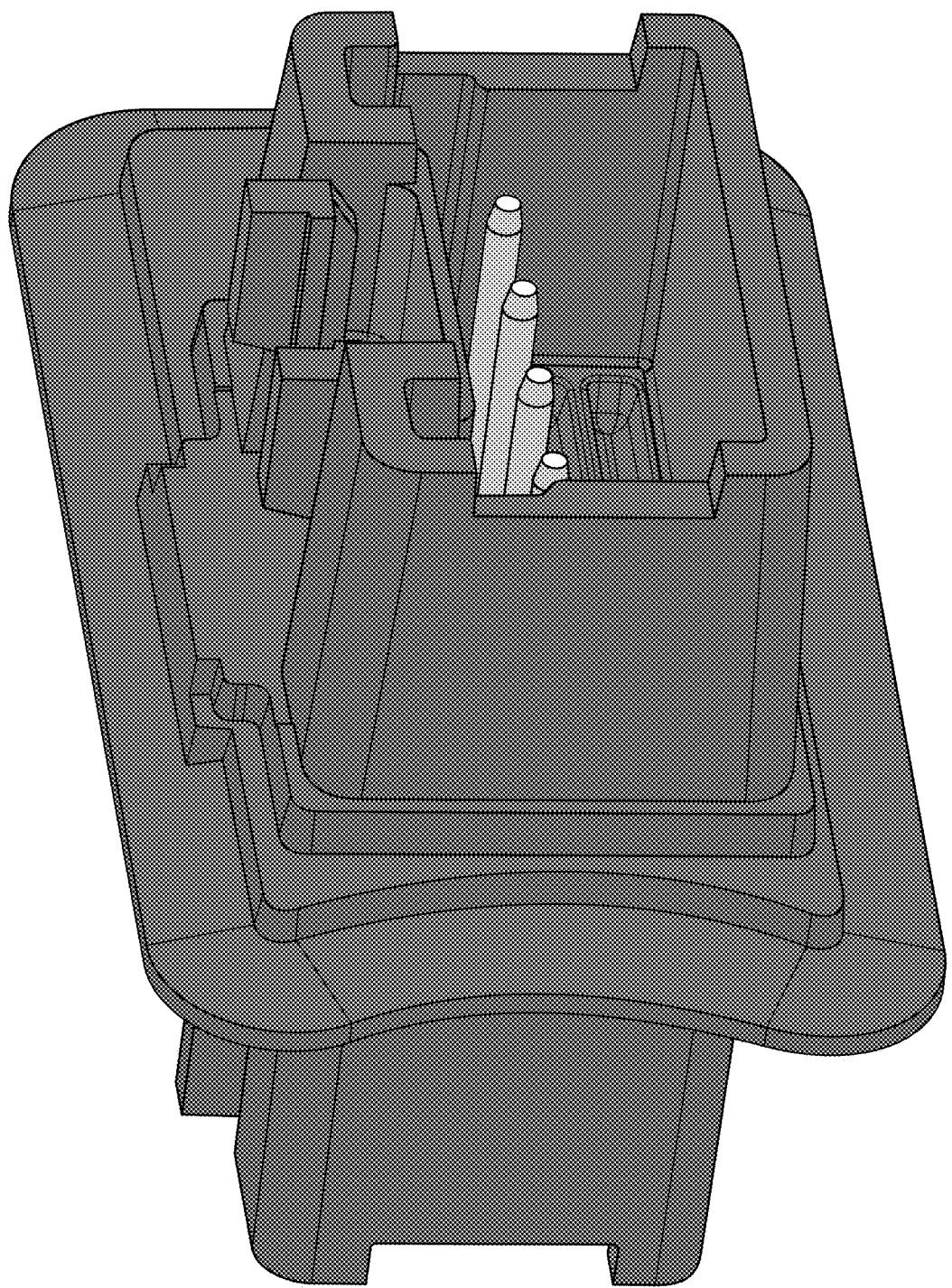

FIGS. 17A-17C illustrate an embodiment of a process for molding an electromechanical connector. The process starts with the pins such as pin 1702. In this example, there are four pins. Other numbers of pins may be used, as appropriate. The four pins are placed into a tool. Polymer is molded over the four pins to create the molded electromechanical connector (1704), and which is also shown in the examples of FIG. 17B and FIG. 17C.

As shown in the example of FIG. 17C, which illustrates an embodiment of a perspective view of the molded electromechanical connector of FIG. 17B, the electromechanical connector is end to end, allowing two plugs of the same type to plug into the electromechanical connector and terminate to one another. Molding the electromechanical connector separately from the rest of the overall connector allows for the complex geometry of the connector, as well as the control and positioning of the pins to be more easily manufactured, as compared to having to mold everything at once with the other components of the connector plate.

For example, in some embodiments, the electromechanical connector includes a retention lock on its backside to prevent the plug from coming out (e.g., during shipping, handling, an earthquake, etc.). The backside retention lock, and the feature that locks underneath it may have a narrow separation. Manufacturing such a geometry may already be difficult for injection molding. For example, molding the electromechanical connector on its own may already be challenging. Attempting to do so while also injection molding the rest of the connector plate may be impractical for some tools. For example, attempting to mold everything at once may result in a high risk of pitting holes, as well as other deficiencies or difficulties. In embodiments of the manufacturing process described herein, the electromechanical connector is separately molded first, where the electromechanical connector is designed in a manner such that when it is combined with other materials in a later stage of the processing, mechanical interlocking and fusing are provided that results in strength and sealing as if the overall connector plate had been created in a single pass. For example, as will be described in further detail below, components such as the electromechanical connector are designed such that when they are overmolded with resin in a latter stage of the manufacturing process, weld lines are fused together, and any gaps between the different parts that are being molded together (which may include plastic-on-plastic molding) are minimized. In some embodiments, the output of the multi-stage manufacturing process described herein is an end cap that has the properties of having been molded in a single pass, such as high structural integrity and sealing.

FIGS. 18A-18B illustrate embodiments of a process for manufacturing a connector plate over a set of components and a molded electromechanical connector. In this phase of manufacturing the connector plate, which is subsequent to the molding of the electromechanical connector, the molded electromechanical connector is placed in a tool along with other components, such as compression limiters (1802, 1804, 1806, and 1808) and power terminals (1810 and 1812), as shown in the examples of FIGS. 18A and 18B. FIG. 18B illustrates an embodiment of an orientation of placement of the components in the tool.

Figure 19A:
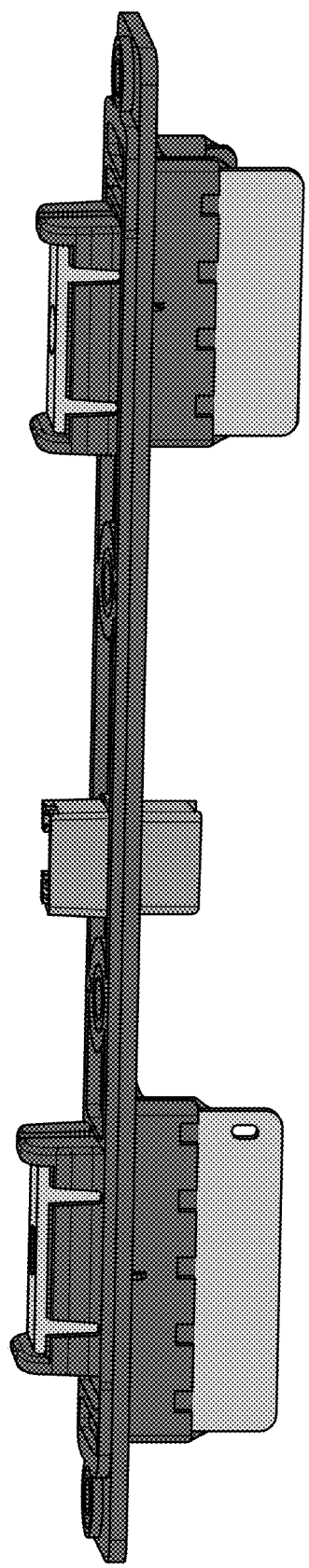
FIGS. 19A-19B illustrate embodiments of a molded connector plate.
Figure 19B:
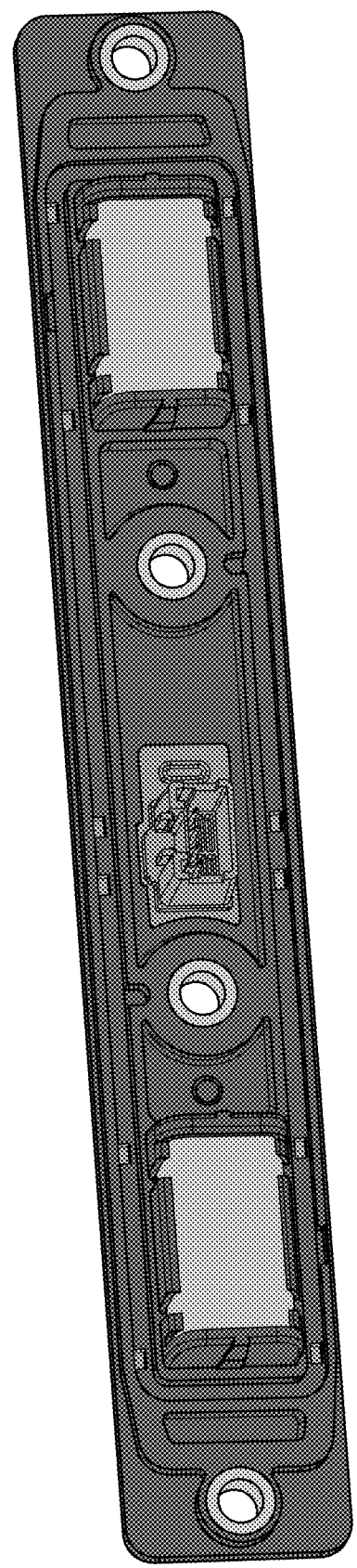

In some embodiments, after the tool closes, injection molding is performed to mold resin over the components shown in FIGS. 18A and 18B. This results in the molded connector plate shown in the examples of FIGS. 19A and 19B.

As described above, the electromechanical connector may have a complex geometry that would make it difficult to be properly created if molded in one piece along with the other components of the module connector plate. Instead, in some embodiments, the plate is manufactured in multiple, individual steps, as described above.

The final connector plate, which is constructed from combining multiple pieces together, in multiple layers, must maintain a high seal. Using the design described herein, a tight seal may be created, even during a multi-stage molding process. For example, using the tapered flange described herein, the interface where the molded electrical connector meets the resin of the connector plate is eliminated by the melting of the tapered edge with the resin that is molded over the electromechanical connector. In this way, gaps are minimized, and leak paths are reduced.

Figure 20A:
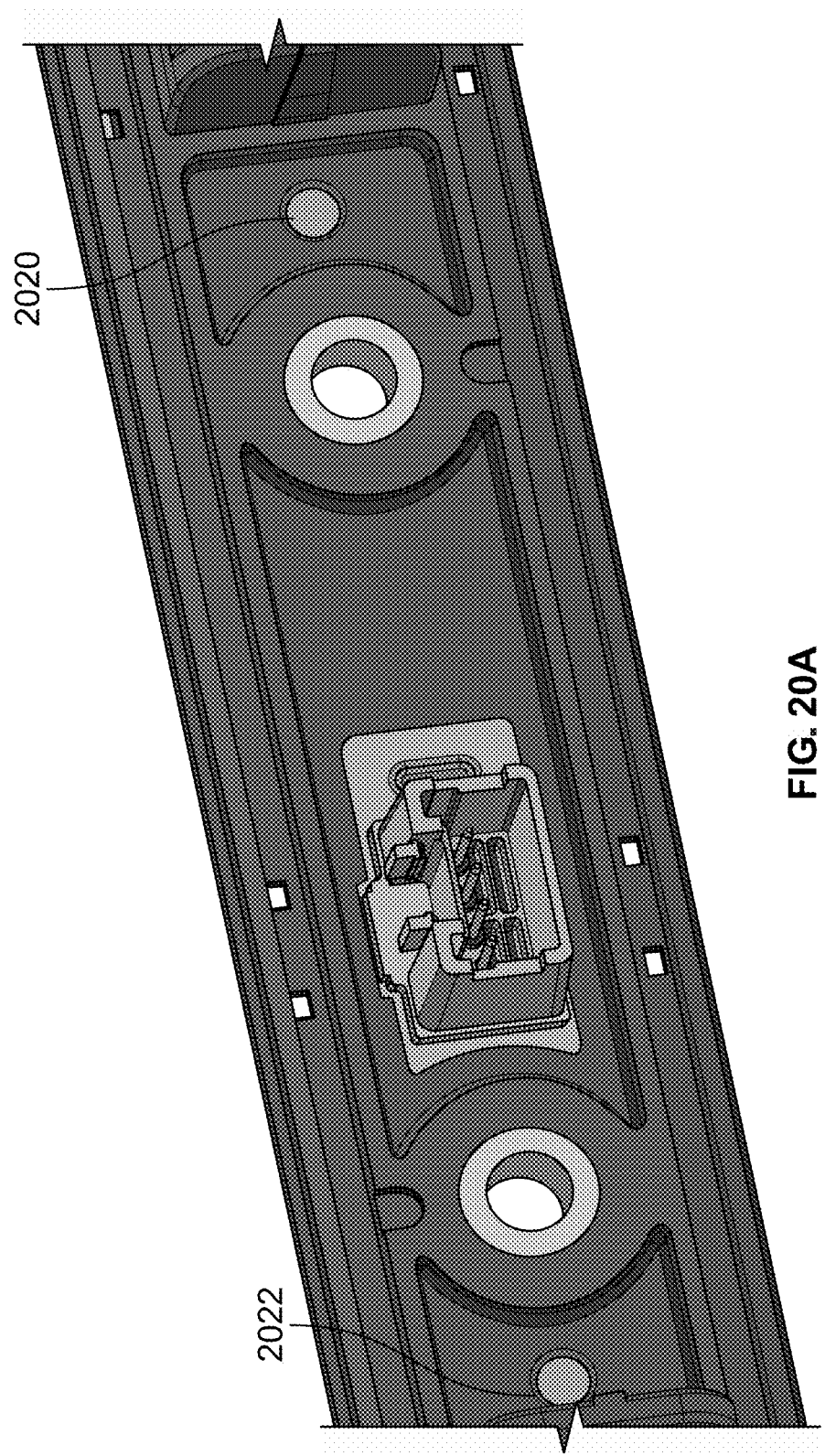
FIG. 20A illustrates an embodiment of a portion of a connector plate.

Further details regarding how the tapered flange facilitates the fusing of the molded electromechanical connector to the surrounding resin are described below. FIG. 20A illustrates an embodiment of a portion of a connector plate. Shown in the example of FIG. 20A are divot 2020 and divot 2022. During the molding of the plate around the electromechanical connector, resin is injected at those points (the divots may be included for cosmetic process, so that during the injection molding process, in which the injection mold tool injects into the center of the divot, when the tool pulls apart, the vestigial portion that is left behind does not protrude above the surface).

This results in two mold fronts, which approach the electromechanical connector from two sides. During this stage of the molding process, this results in two molten plastic fronts spreading outward from the two ports and approaching the electromechanical connector from either side, melting the flanges as they approach each other, and causing them to weld to one another. Here, while the injected plastic is still molten, the two weld fronts come together, melting the flange and fusing the flange with the injected polymer into a single, solid piece. With the fusing, a seal is created to prevent any fluid leakage.

The tapering of the edges of the flange facilitates the fusing described above. In some embodiments, because the electromechanical connector is not heated in the tool, any melting of the edges of the flange would have to rely on the heating caused by the weld fronts. Without the taper, the edges of the flange may be more difficult to melt due to the thermal mass of the flange, resulting in unwelded faces where plastics meet.

Figure 20B:
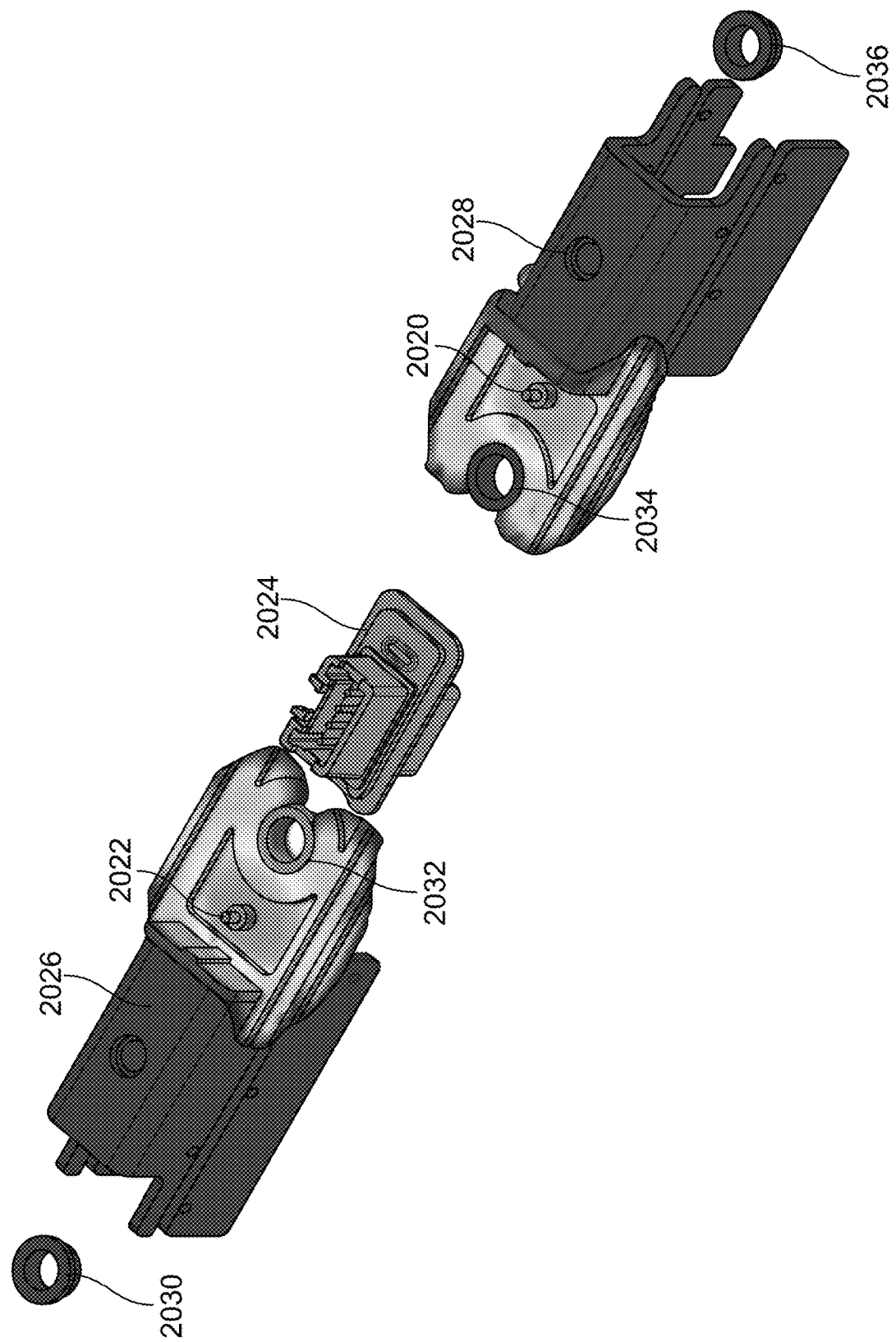
FIGS. 20B-20C illustrate an embodiment of injection molding.
Figure 20C:
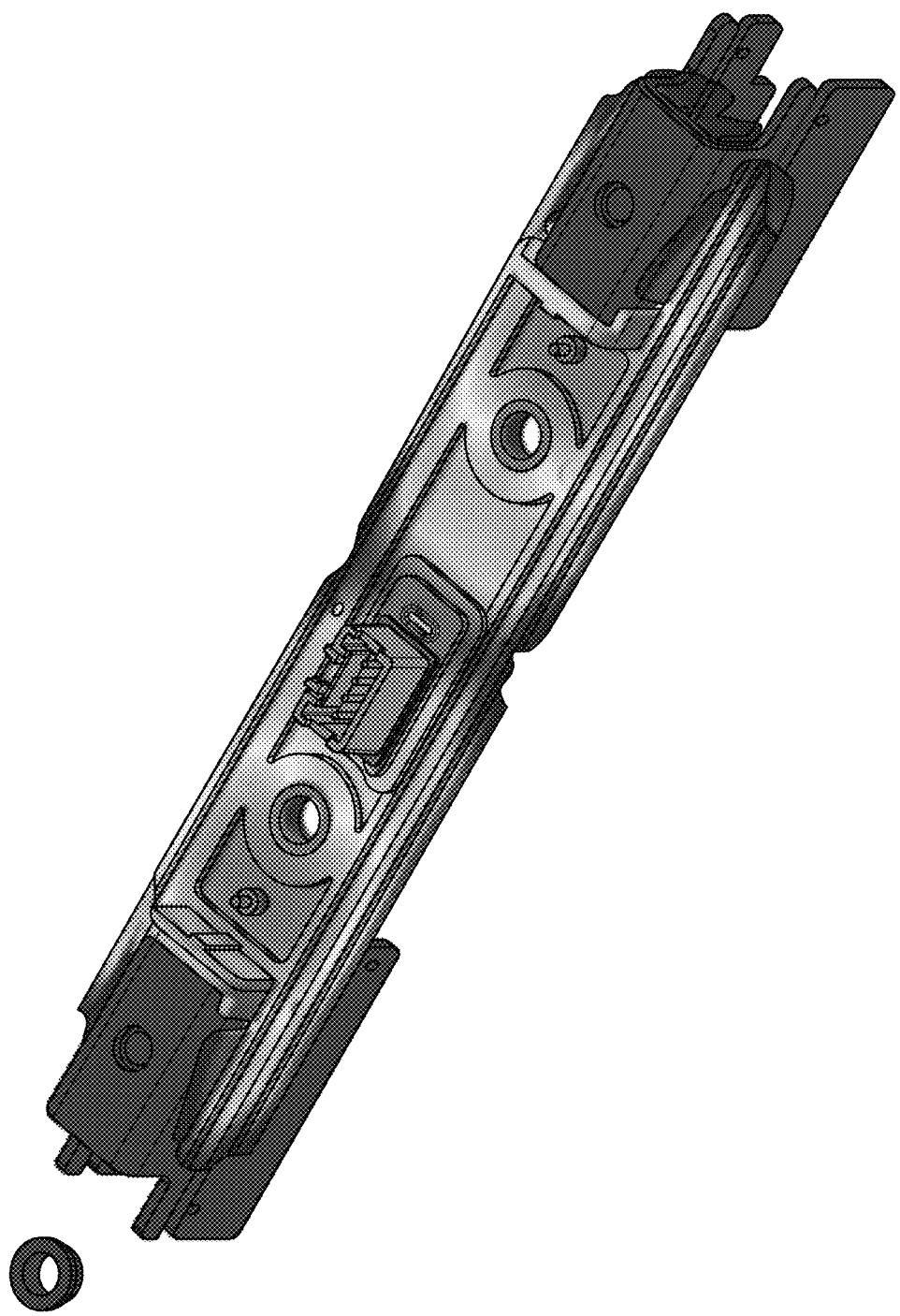

FIGS. 20B-20C illustrate an embodiment of injection molding. In this example, plastic is being molded over components such as the molded electromechanical connector (2024), power terminals (2026 and 2028), and compression limiters (2030, 2032, 2034, 2036). In the example of FIG. 20B, resin is injected at points 2020 and 2022. As it is injected, the resin, which is heated, spreads out from the injection points. In the example of FIG. 20B, the spreading of the fronts towards the electromechanical connector is shown.

As shown in the example of FIG. 20C, as the weld fronts expand, the portions of the weld fronts meeting the tapered edge of the flange melt the plastic of the edges of the flange. If the edge were not tapered, because of the thermal mass of the connector, this may not guarantee fully melting of the entire perimeter of the electromechanical connector's flange during the molding process, making it difficult to ensure that there is a completely hermetic bond between the existing connector and the molding process itself. There would be a higher likelihood that unwelded faces where plastics meet would result, translating to a higher chance of a potential leak path.

The tapered flange described herein increases the likelihood of a hermetic seal and reduces the chance of unwelded faces where plastics meet that are leakage paths. For example, as shown in the example of FIG. 20C, the injected polymer molds over the flange of the electromechanical connector, from both ends. The two molding fronts meet in the center of the plate as they continue to fill out. Where the two fronts fill out over the flange, this area is fairly well heated as there is a significant amount of residual heat from the initial injection molding, where the polymer is fully melted. That heat melts the flange, where because the flange is tapered, there is less thermal mass due to the thinness. With less thermal mass at the tapered perimeter of the flange, there is less specific heat capacity for that flange to absorb heat without melting. The tapered perimeter of the flange then defaults to melting away and fusing with the injected polymer. In some embodiments, the polymers of the electromechanical connector and the overmold are matching polymers to promote fusion/bonding. In other embodiments, the polymers are different or mismatched, but selected such that the polymers mix well when heated, to allow for the creation of strong fusing/bonding.

Thus, the flange of the electromechanical connector described herein facilitates mechanical interlock of the electromechanical connector with the resin that is molded around it. The tapering of the flange further facilitates fusing of the perimeter of the electrical connector with the resin surrounding it, ensuring a hermetic seal. The tapering of the edge of the flange enhances and improves the likelihood of the fusing. As shown throughout, the tapered flange provides multiple functions. One function is to physically hold the electromechanical connector in place within the plate and the surrounding polymer that is injected around the electromechanical connector. A second function is to create a hermetic seal, which is provided via the tapering of the flange, as described above.

Perforated Flange with Pass-Through Openings

Figure 21B:
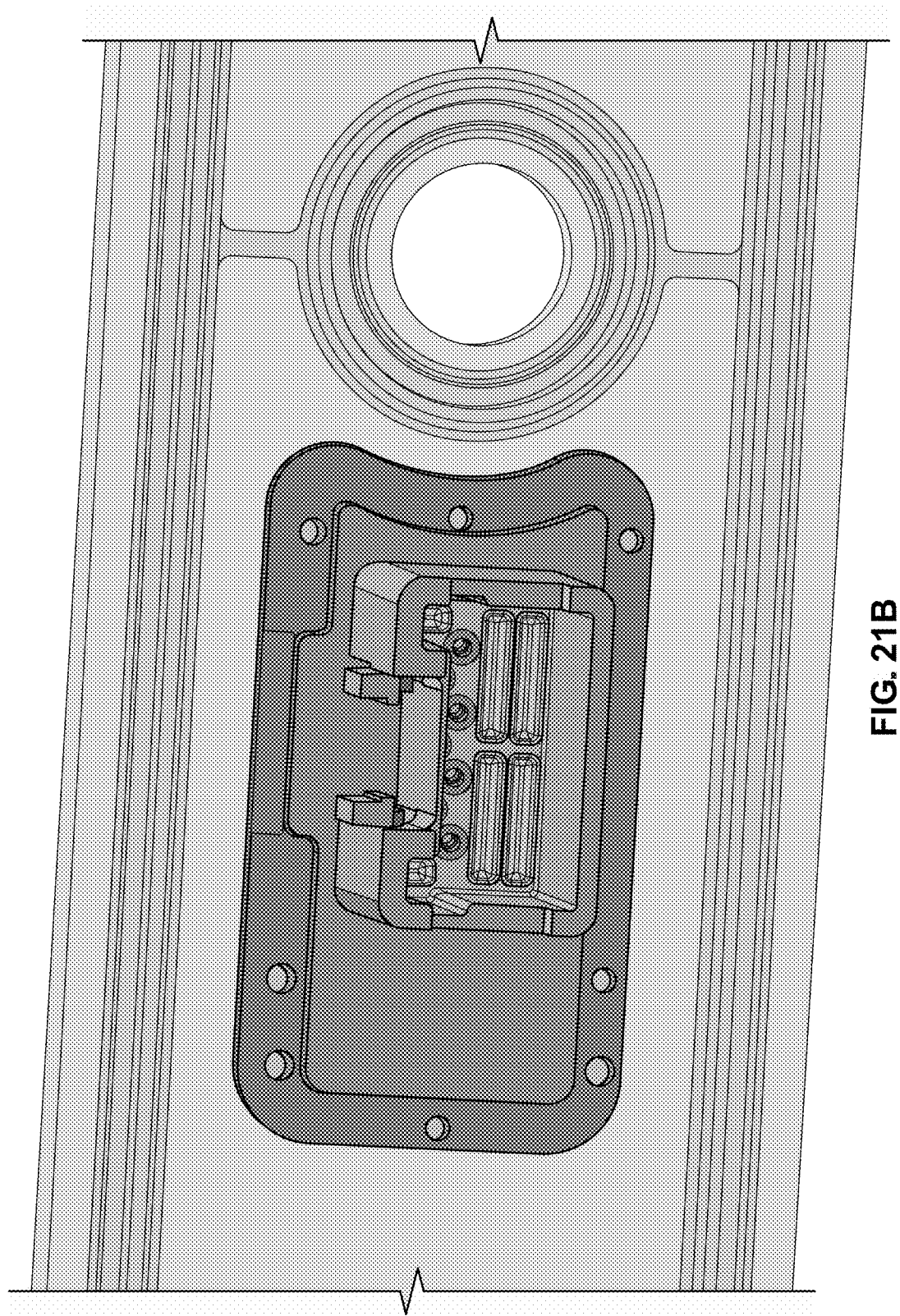

In some embodiments, the electromechanical connector includes perforations or holes. FIGS. 21A and 21B illustrate an embodiment of an electromechanical connector including holes. FIG. 21A illustrates one face of the electromechanical connector, and FIG. 21B illustrates the opposite face of the electromechanical connector. As shown in these examples, holes (2102-2116) are added to the flange of the electromechanical connector. In some embodiments, the holes pass through the electromechanical connector (as shown in FIG. 21B). The use of such holes provides for improved mechanical interlock between the plastic overmold and the molded electromechanical connector (over which the overmolded plastic is injected). For example, the overmolded plastic fills through the holes of the flange, further locking the electromechanical connector to the surrounding overmolded polymer from both faces of the flange. In addition to improving mechanical interlock, the cooling process within the injection molding tool also causes the overmolded plastic to shrink down over whatever portion of the flange that did not melt. For example, the overmold will shrink tightly on the holes. Thus, even if there were some areas of the flange that did not melt, there is the added benefit of mechanical compression from the contraction of the outer overmold, onto the plastic around the holes on the molded electromechanical connector. In this way, the holes through the flange facilitate creating physical retention of the electromechanical connector to the overmolded resin.

In addition to improved mechanical interlock, the use of holes improves the ability for the polymer of the existing mechanical interlock to melt. Similar to the tapering described above, the use of the holes thins out the perimeter of the flange, where taking out material to form the holes reduces the thermal mass in those areas, which improves the ease with which the fusing/bonding occurs at those holes as well. While circular pass-through openings are shown in the examples of FIGS. 21A and 21B, holes or slots of other sizes and shapes within the flange may be used, as appropriate.

Figure 21C:
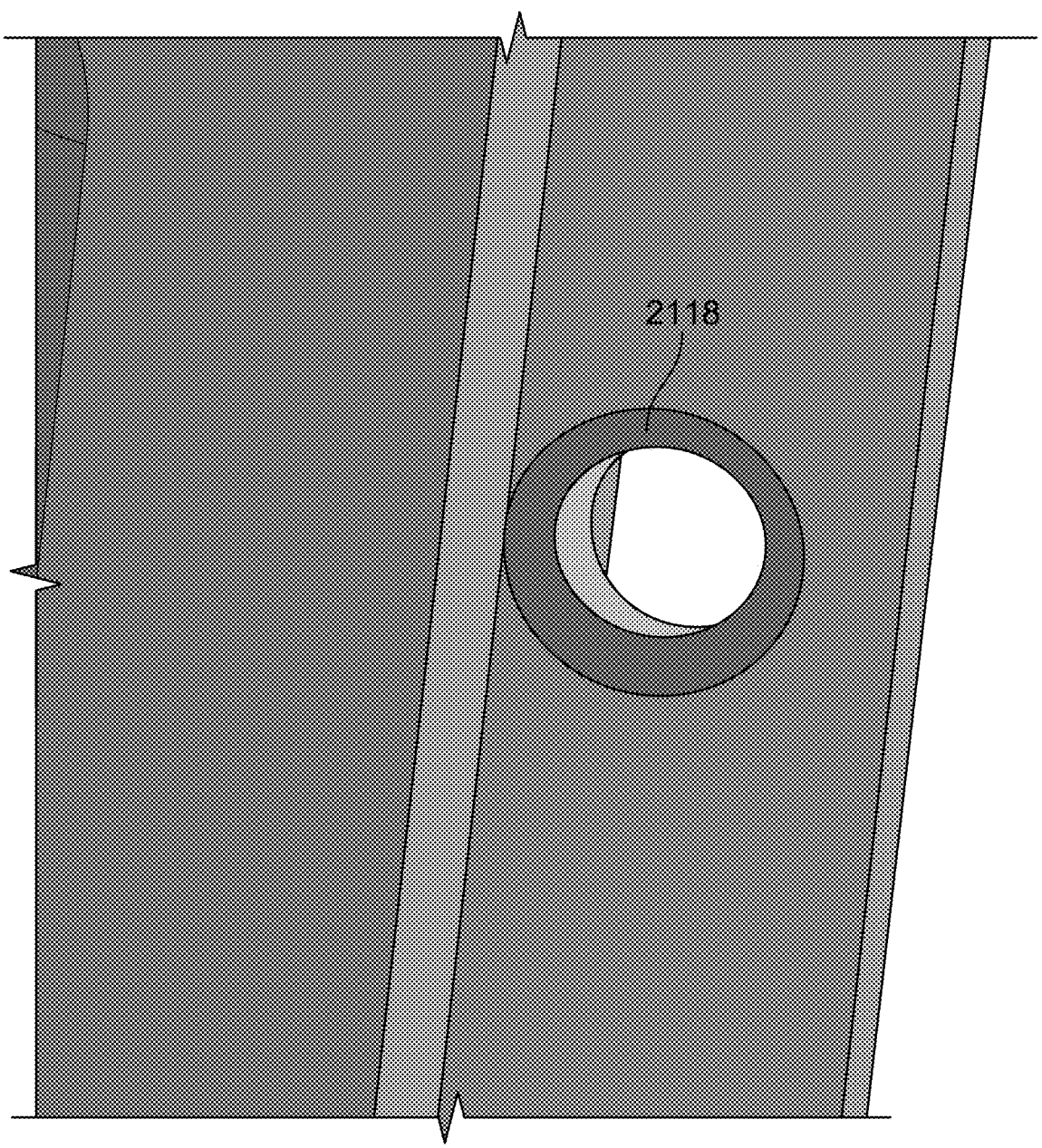
FIG. 21C illustrates an embodiment of a chamfered perforation.

In some embodiments, the holes are chamfered, as shown in the example of FIG. 21C. The chamfering (2118) of a hole effectively adds a thinning process to the hole, similarly to the tapering of the flange described above. For example, the hole may be chamfered to a point to allow for as much thinning as possible to promote fusion of the chamfered material to the overmolded polymer. The tapered holes allow for mechanical interlocking between the material, and where the holes are chamfered and thinnest, a full perimeter seal is promoted as well, as the overmolded plastic melts through the hole.

Figure 22A:
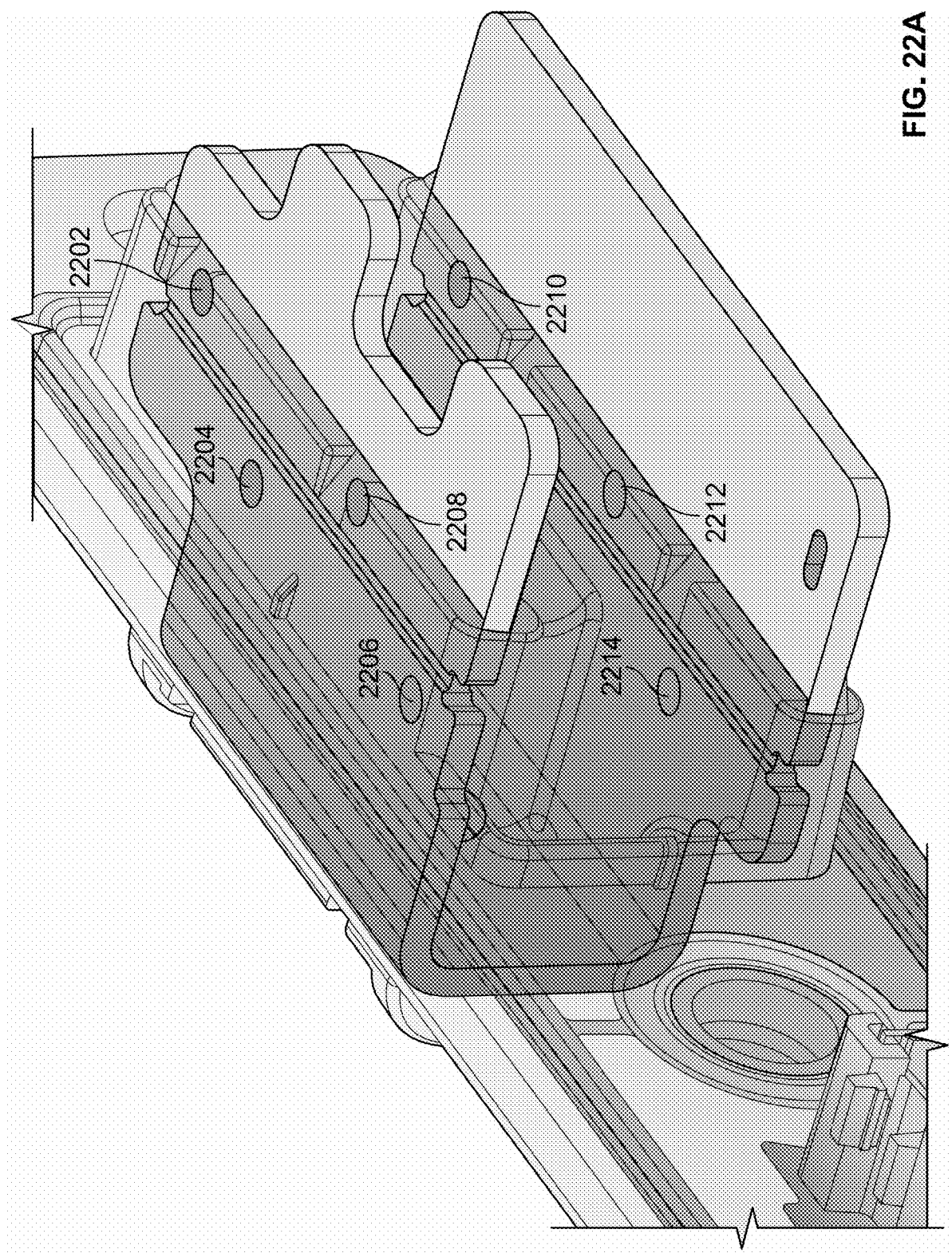
FIGS. 22A-22B illustrate embodiments of perforated power terminals.
Figure 22B:
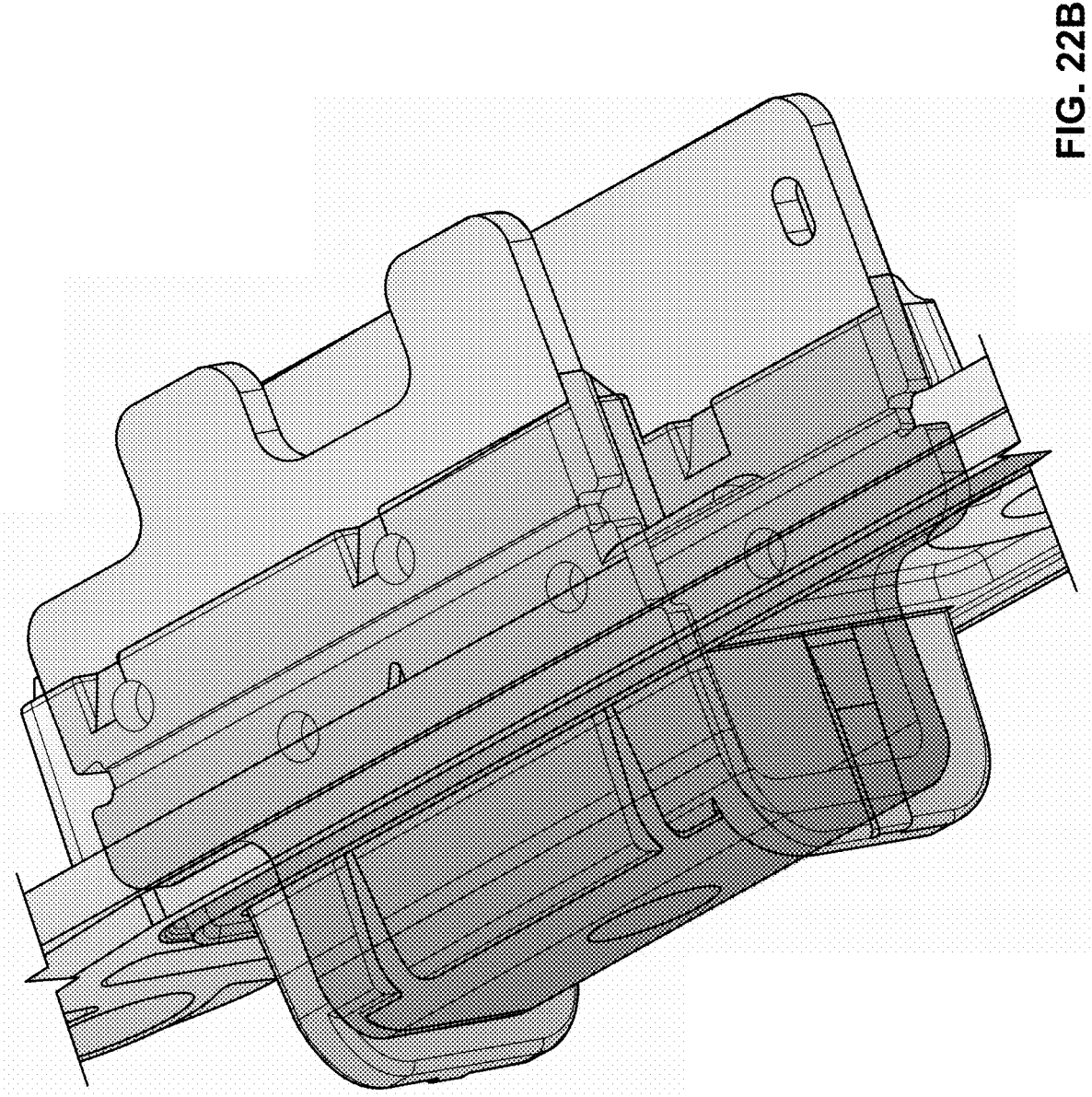

In some embodiments, the perforations described above are similarly applied to other portions of the connector, such as the power terminals, as shown in the examples of FIGS. 22A and 22B. As shown in the examples of FIGS. 22A and 22B, the sheet metal for the power terminals is also perforated with pass-through openings (e.g., openings 2202-2214). This creates an improved seal with the polymer that is overmolded over the metal power terminals, reducing leaks due to higher pressure. While there may not be fusing (because of the two different types of materials, for example), the pass through still allows improved mechanical interlock. Further, the cooling described above allows contraction of the overmolded plastic over the holes through the sheet metal, further improving the mechanical interlock. Without the passthrough holes, the overmold plastic may instead contract away from the surface and perimeter of the terminals, resulting in a higher likelihood of leakage paths. Here, the introduction of the pass-through holes allows the creation of posts or columns of overmolded plastic through the sheet metal during the injection molding process. During cooling, the columns contract, where the contraction inside each of those columns creates compression down on the surface of the sheet metal. While circular pass-through holes are shown in these examples, the geometry of the pass-through holes may be a variety of shapes, as appropriate.

Electromechanical Connector Pins

Figure 23A:
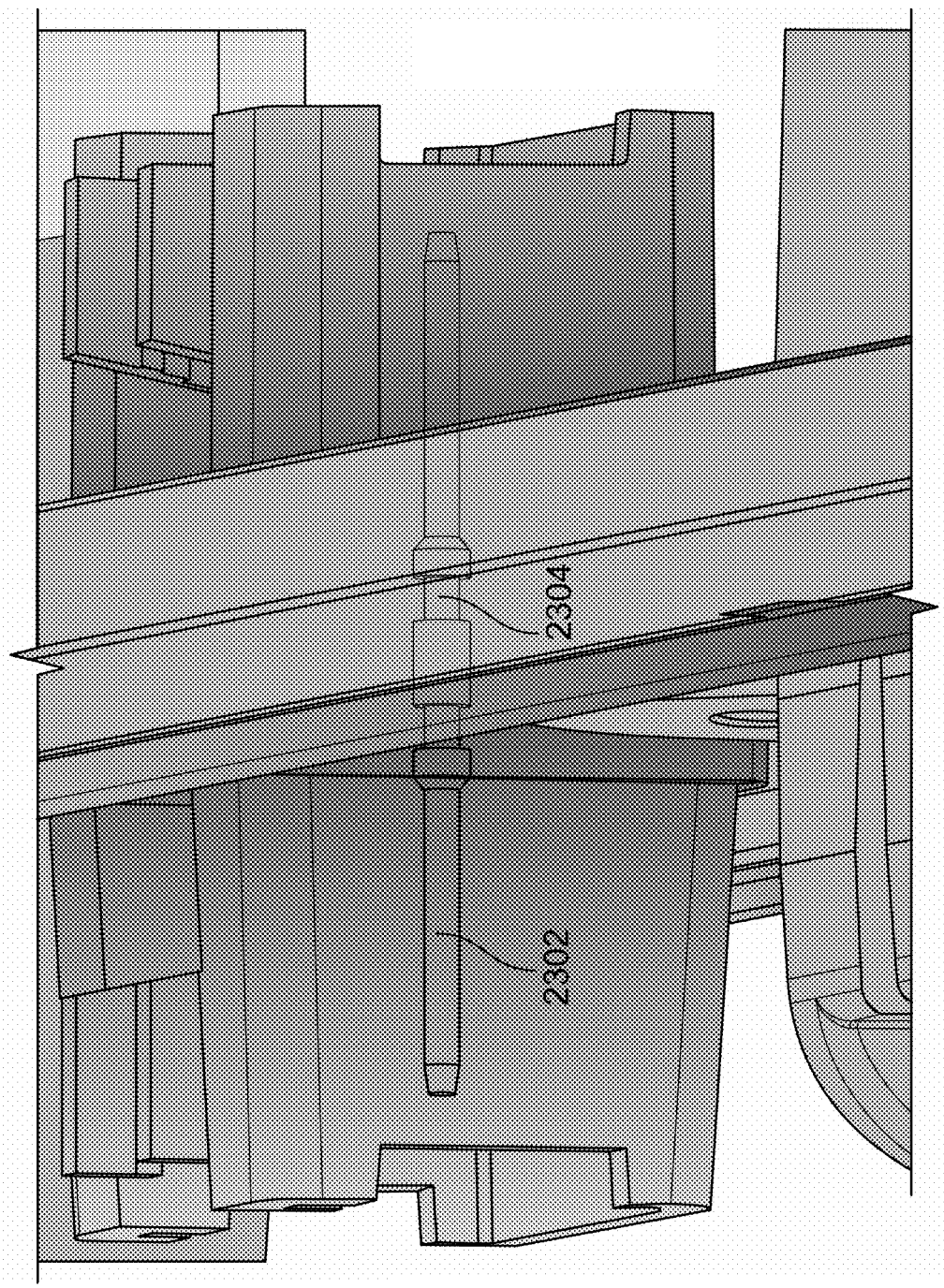
FIGS. 23A-23B illustrate embodiments of pins.
Figure 23B:
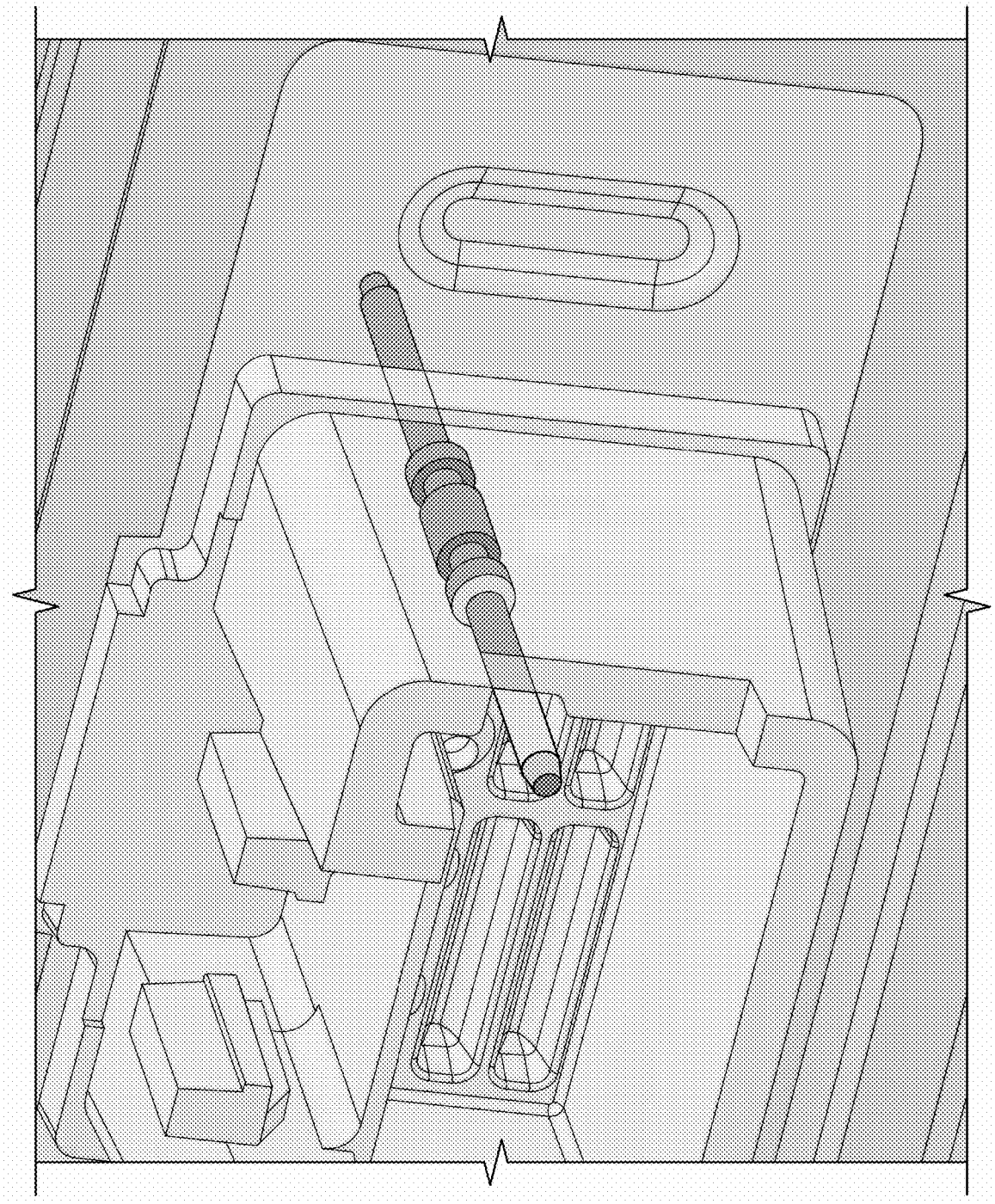

The following are embodiments of the pins of the electromechanical connector. FIG. 23A illustrates an embodiment of a pin. The pin of FIG. 23A is an example of one of the four pins shown at 208 of FIG. 2A. FIG. 23B illustrates an embodiment of a pin. In this example, a profile view of the pin within the electromechanical connector housing is shown.

In the examples of FIGS. 23A and 23B, a pin (2302) inside the electromechanical connector housing is shown. In this example, the pin has mechanically interlocking features that are designed for the overmolding process (during the phase to create the electromechanical connector), such that the pin does not move after it has been molded inside of the electromechanical connector housing. This ensures that during plug mates or de-mates, a user does not accidentally push the pin in one direction or another.

As one example of creating the mechanically interlocking features, the outer surface of the pin is turned down or grooved to create retention grooves on the outer surface of the pin. The retention grooves are one example mechanism of providing the interlocking described above. As shown in the examples of FIGS. 23A and 23B, the retention grooves (e.g., groove 2304) on the pin add a tortuous geometry that makes it difficult for leaking to occur.

In some embodiments, the pin is fabricated to include one or more pass-through holes. Similar to as described above with respect to the embodiment of the tapered flange of the electromechanical connector housing including holes, including a hole in the pin allows a column of polymer to pass through the pin, further interlocking the pin with the surrounding polymer of the electromechanical connector housing. In some embodiments, the hole through the pin is generated by punching through a square wire using a bladed chisel, resulting in creation of an "eye" or retention hole/perforation that provides the ability for the pin to be fully retained by the polymer of the electromechanical connector housing (as the polymer is molded over the pin, the polymer will fill in and pass through the hole(s) of the pin). Various square wire geometries may be used in which an eyehole is opened. Various types of wires may be used. The pins may be square or round. The pin may also be generated when stamping out the square wire. Using such a pin with a mechanically interlocking feature such as an eyehole, an interlocking column of polymer through the pin may be created with the overmolded polymer of the electromechanical connector housing flowing through the channel formed by the retention hole in the pin. When the connector housing cools, this column further constricts, generating a tighter seal around the pin, facilitating long term interlocking.

Using the pin described herein, physical interlocking of the pin with the electromechanical connector housing is provided, along with an improved seal to prevent leakage.

Bolt Embodiments

Figure 24A:
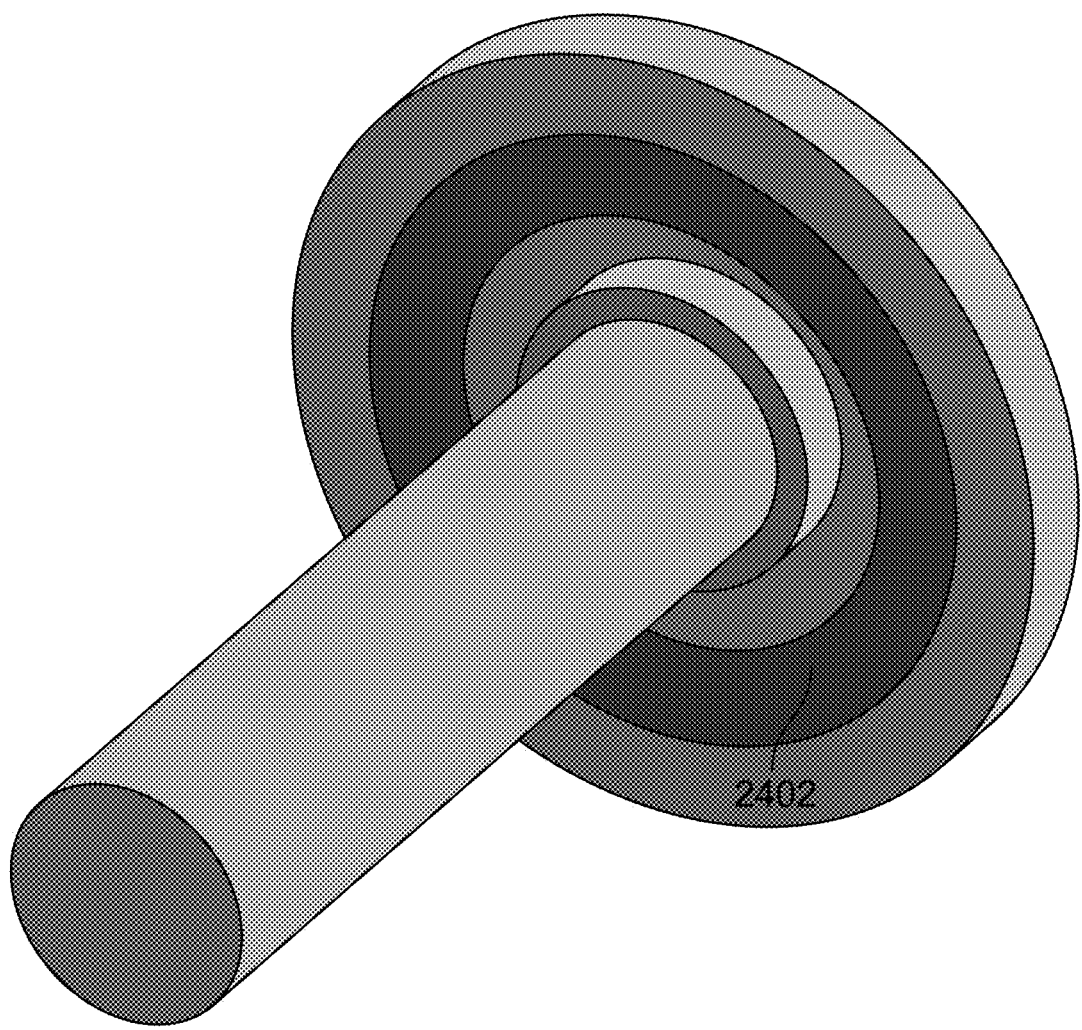
FIGS. 24A-24C illustrate embodiments of a sealing bolt assembly.

Described above are embodiments of using a bolt with a blind nut. Described herein are alternative embodiments of bolts used in conjunction with the connector plate. FIG. 24A illustrates an embodiment of a sealing bolt assembly. In some embodiments, the sealing bolt assembly of FIG. 24A requires less manufacturing processing than the bolt/blind nut described above. In this example of the bolt (where the threads of the bolt are not shown), the gasket (2402) is moved away from the clearance hole.

Figure 24B:
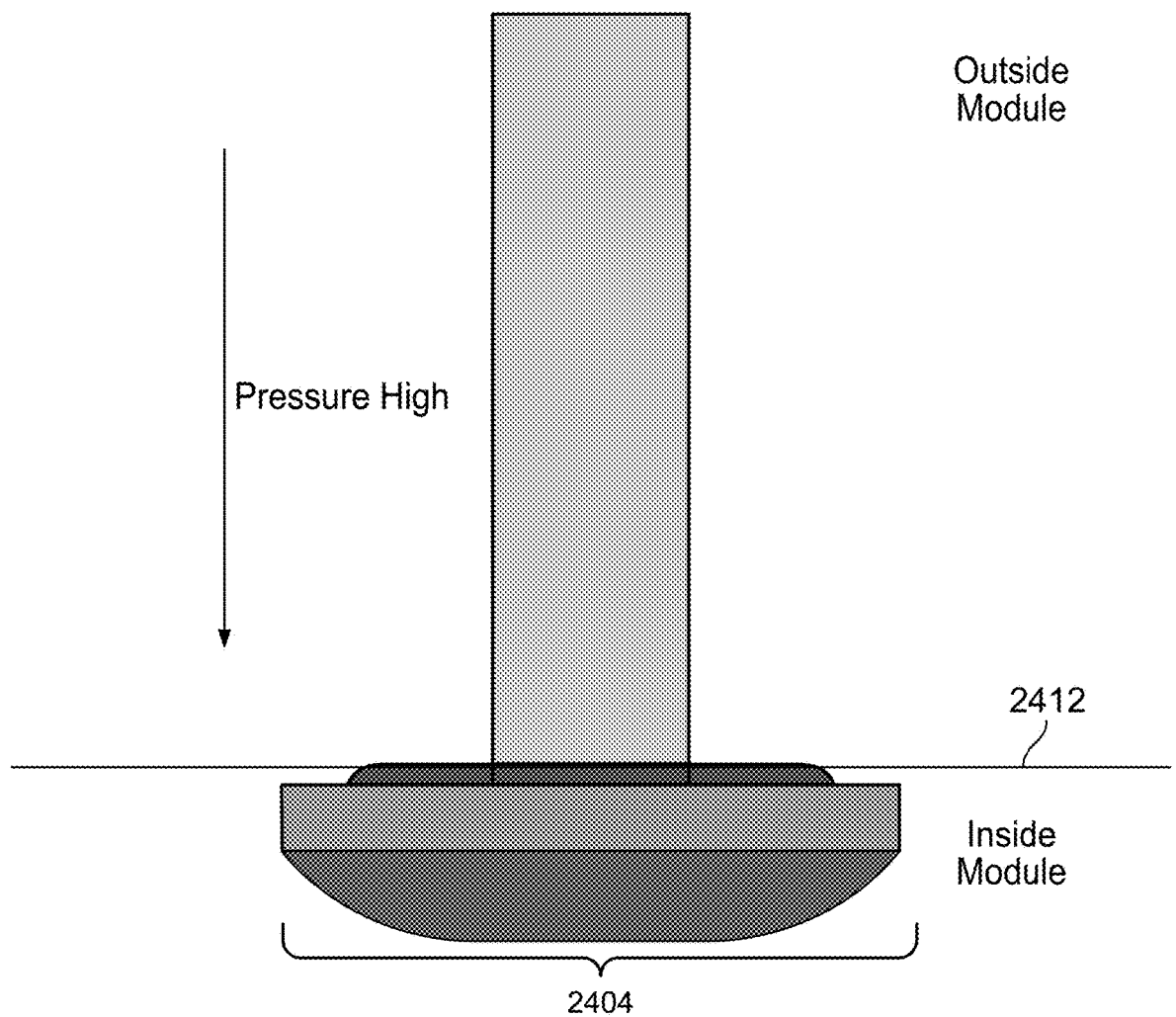

FIG. 24B illustrate an embodiment of a sealing bolt assembly. In this example, the bolts point from the inside of the module out. The module face (on which the connector plate is connected) is shown at 2412. The self-sealing bolt (2404) is designed to prevent pressure from one side of the module to give cause for any fluid to cross the boundary defined by the faces of the enclosure. In this example, with the orientation of the bolt facing outward, the O-ring or gasket is positioned away from the shaft diameter, as shown in the example of FIG. 24A. In this example, an M5 bolt assembly is shown. Other size bolts may be used with the techniques described herein. In some embodiments, the gasket is designed so as to prevent exterior pressure from forcing fluids into the enclosure. In some embodiments, the gasket is designed so as to prevent internal pressure from forcing fluids out of the enclosure. In some embodiments, the gasket is designed to prevent fluids from going either into or out of the enclosure.

Figure 24C:
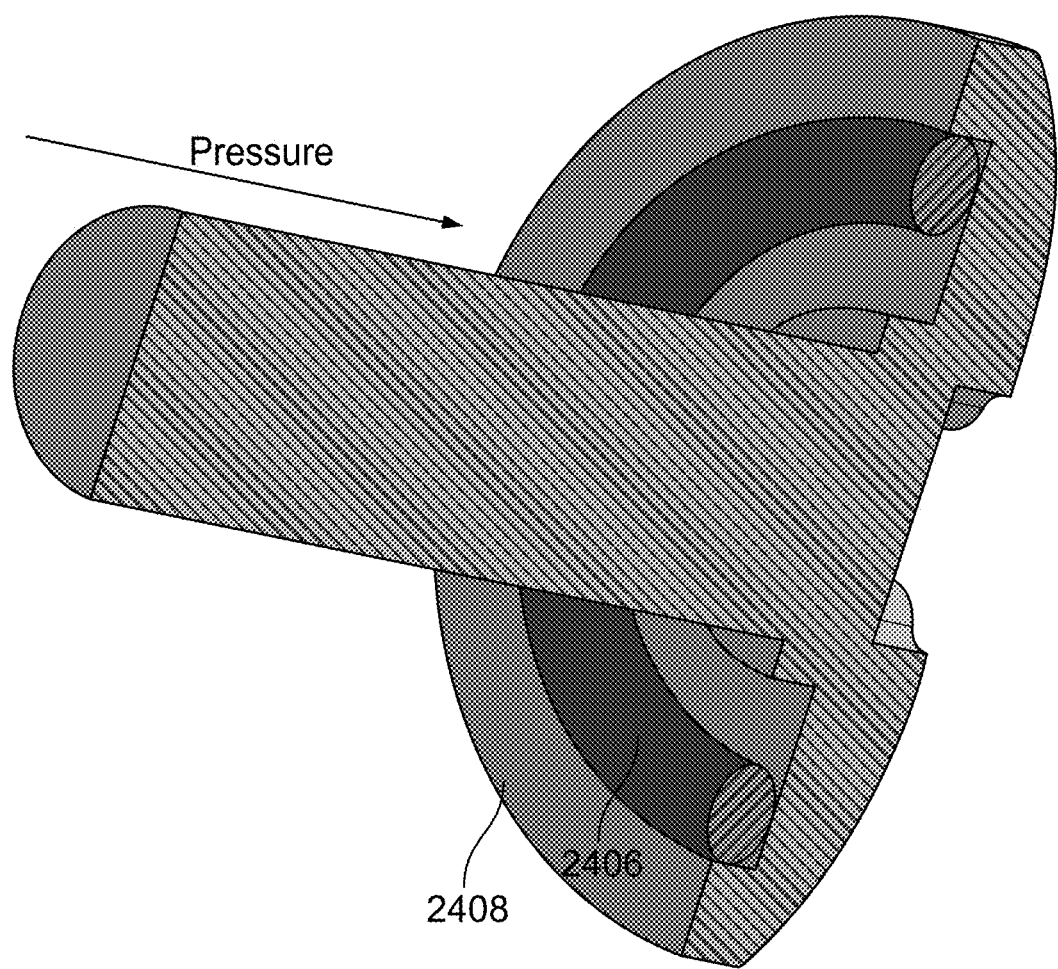

FIG. 24C illustrates an embodiment of a self-sealing bolt assembly. In this example, when external pressure is coming towards the bolt, the O-ring is pushed outwards against the outside edge of the gasket groove. This makes the seal stronger. That is, the higher the pressure from outside the module, the stronger the seal becomes, because the O-ring (2406) is pushed outwards against the outer diameter (2408) of the gasket groove. In this way, air is prevented from entering into the module. In contrast, if the O-ring were on the inner diameter of the gasket groove, and up against the shaft, as is typical in off-the-shelf bolts, the higher pressure would cause the O-ring to deform up against the shaft, resulting in a fluid leakage path into the module.

The use of such a self-sealing assembly allows the bolt to be pointed from inside the module outwards, while having a seal interface that prevents pressure from outside the module entering into the module.

Embodiments of an electromechanical connector include a plate, a gasket that is overmolded over the plate, at least one power connector molded into the plate, and a plurality of pins molded into the plate. In some embodiments, the plate is insert molded around the at least one power connector and the pins. In some embodiments, the gasket is overmolded. In some embodiments, when the plate is installed on a submodule (e.g., bulkhead passthrough of a submodule enclosure that encapsulates a set of battery cells), the gasket provides a seal. Power, signal, and current (e.g., balancing current) may be passed through the connector plate that includes the overmolded gasket seal.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An energy storage module cap comprising:
   a plate;
   a power output terminal about which the plate is molded;
   an electromechanical connector about which the plate is molded, wherein the electromechanical connector comprises a flange that facilitates interlock of the electromechanical connector with the plate that is molded over the electromechanical connector;
   an auxiliary pin about which the electromechanical connector is molded, wherein the plate is molded about the electromechanical connector subsequent to molding of the electromechanical connector about the auxiliary pin; and
   a gasket disposed on the plate.

2. The energy storage module cap of claim 1, comprising a plurality of power output terminals.

3. The energy storage module cap of claim 1, comprising a plurality of auxiliary pins.

4. The energy storage module cap of claim 3, wherein the plurality of auxiliary pins comprises one or more signal pins, one or more sensor pins, or one or more current carrying pins.

5. The energy storage module cap of claim 1, further comprising one or more holes for fasteners.

6. The energy storage module cap of claim 1, further comprising one or more spacers.

7. The energy storage module cap of claim 1, further comprising at least one nut-gasket assembly to engage fasteners through one or more holes.

8. The energy storage module cap of claim 1, wherein the gasket is overmolded onto the plate.

9. The energy storage module cap of claim 1, wherein the gasket is adhered in place.

10. The energy storage module cap of claim 1, wherein the gasket is dispensed in place.

11. The energy storage module cap of claim 1, wherein the gasket comprises a crosslinked or vulcanized polymer.

12. The energy storage module cap of claim 1, wherein the flange is tapered.

13. The energy storage module cap of claim 1, wherein the flange comprises one or more pass-through openings.

14. The energy storage module cap of claim 13, wherein a pass-through opening is chamfered.

15. The energy storage module cap of claim 1, wherein the electromechanical connector is insert molded over the auxiliary pin.

16. The energy storage module cap of claim 1, wherein the auxiliary pin comprises one or more grooves.

17. The energy storage module cap of claim 1, wherein the auxiliary pin comprises a retention opening.

* * * * *